United States Patent
Sasagawa et al.

(10) Patent No.: US 10,799,806 B2
(45) Date of Patent: Oct. 13, 2020

(54) ROBOT

(71) Applicant: Panasonic Intellectual Property Management Co., Ltd., Osaka (JP)

(72) Inventors: Michiko Sasagawa, Osaka (JP); Seiya Higuchi, Osaka (JP); Ryouta Miyazaki, Osaka (JP); Kento Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 285 days.

(21) Appl. No.: 15/905,883

(22) Filed: Feb. 27, 2018

(65) Prior Publication Data

US 2018/0178136 A1 Jun. 28, 2018

Related U.S. Application Data

(63) Continuation of application No. PCT/JP2017/022040, filed on Jun. 15, 2017.

(30) Foreign Application Priority Data

Jul. 27, 2016 (JP) .................................. 2016-147537

(51) Int. Cl.
*A63H 33/00* (2006.01)
*A63H 11/00* (2006.01)
(Continued)

(52) U.S. Cl.
CPC ........... *A63H 33/005* (2013.01); *A63H 3/006* (2013.01); *A63H 3/28* (2013.01); *A63H 11/00* (2013.01);
(Continued)

(58) Field of Classification Search
CPC ........ A63H 11/00; A63H 17/00; A63H 29/08; A63H 29/22; A63H 33/005
See application file for complete search history.

(56) References Cited

U.S. PATENT DOCUMENTS

| 3,696,557 A | * | 10/1972 | Ruppel | ................ A63H 33/005 446/444 |
| 3,722,134 A | * | 3/1973 | Merrill | ................ A63H 33/005 446/462 |

(Continued)

FOREIGN PATENT DOCUMENTS

| JP | 2000-218578 A | 8/2000 |
| WO | 1997/025239 A1 | 7/1997 |

(Continued)

OTHER PUBLICATIONS

International Search Report of PCT application No. PCT/JP2017/022040 dated Jul. 11, 2017.

(Continued)

*Primary Examiner* — Eugene L Kim
*Assistant Examiner* — Alyssa M Hylinski
(74) *Attorney, Agent, or Firm* — Greenblum & Bernstein, P.L.C.

(57) ABSTRACT

In a robot, after a first value indicating acceleration in the up-and-down axis direction output from an acceleration sensor exceeds a certain threshold value, when any of the first value indicating the acceleration in the up-and-down axis direction, a second value indicating the acceleration in the front-and-back axis direction, and a third value indicating the acceleration in the left-and-right axis direction is determined to exhibit variation exceeding a certain width for a fixed period, the robot determines that a housing of the robot is being held by a user.

22 Claims, 35 Drawing Sheets

(51) Int. Cl.
*A63H 17/00* (2006.01)
*A63H 3/00* (2006.01)
*A63H 3/28* (2006.01)
*A63H 29/22* (2006.01)
*A63H 33/26* (2006.01)
*A63H 30/04* (2006.01)
*A63H 29/08* (2006.01)
*G01P 15/18* (2013.01)

(52) U.S. Cl.
CPC .............. *A63H 17/00* (2013.01); *A63H 29/08* (2013.01); *A63H 29/22* (2013.01); *A63H 30/04* (2013.01); *A63H 33/26* (2013.01); *G01P 15/18* (2013.01); *A63H 2200/00* (2013.01)

(56) References Cited

U.S. PATENT DOCUMENTS

| | | | | |
|---|---|---|---|---|
| 5,692,946 A * | 12/1997 | Ku | .................. | A63H 33/005 |
| | | | | 446/456 |
| 5,720,644 A * | 2/1998 | Ku | .................. | A63H 11/00 |
| | | | | 446/175 |
| 6,374,157 B1 * | 4/2002 | Takamura | .................. | B25J 9/1674 |
| | | | | 700/245 |
| 7,258,591 B2 * | 8/2007 | Xu | .................. | A63H 15/06 |
| | | | | 446/273 |
| 9,968,864 B2 * | 5/2018 | Clarke | .................. | G05D 1/0225 |
| 10,168,715 B2 * | 1/2019 | Tsuji | .................. | A63H 33/005 |
| 10,472,008 B2 * | 11/2019 | Rehm | .................. | B60B 19/04 |
| 2011/0166713 A1 * | 7/2011 | Tsuji | .................. | B62K 17/00 |
| | | | | 700/279 |
| 2011/0294397 A1 * | 12/2011 | Tsai | .................. | A63H 33/005 |
| | | | | 446/454 |
| 2012/0168240 A1 * | 7/2012 | Wilson | .................. | G05D 1/0011 |
| | | | | 180/167 |
| 2014/0179197 A1 * | 6/2014 | Bradley | .................. | A63H 3/28 |
| | | | | 446/297 |
| 2015/0224941 A1 * | 8/2015 | Bernstein | .................. | A63H 33/005 |
| | | | | 180/167 |
| 2016/0296851 A1 * | 10/2016 | Udairaj | .................. | A63H 33/26 |
| 2017/0010607 A1 * | 1/2017 | Barlas | .................. | H04N 5/2252 |

FOREIGN PATENT DOCUMENTS

WO 2000/032360 6/2000
WO 2014/182730 A1 11/2014

OTHER PUBLICATIONS

The Extended European Search Report dated Jun. 24, 2019 for the related European Patent Application No. 17833899.2.

* cited by examiner

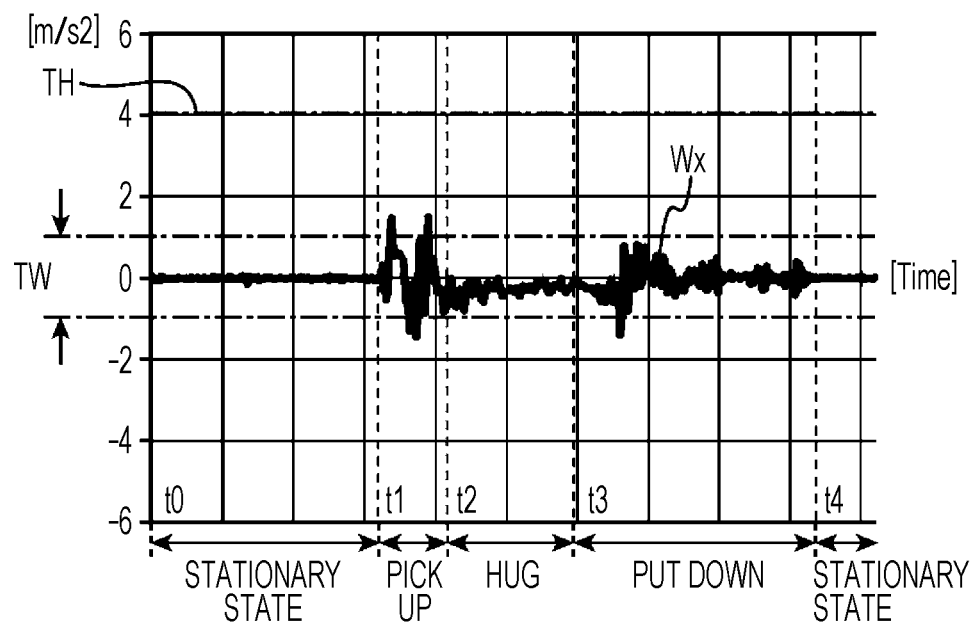
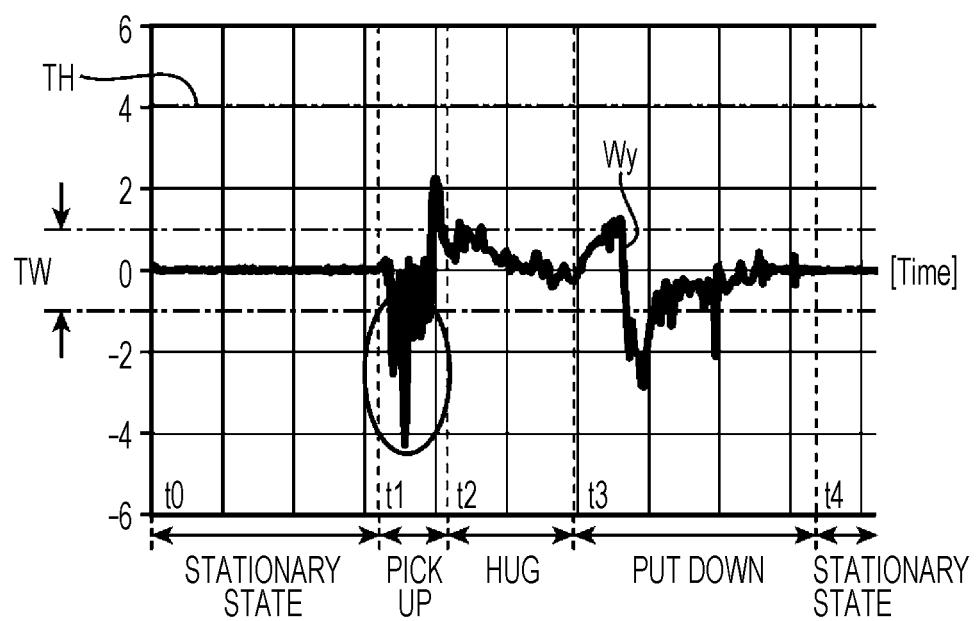

ROBOT

BACKGROUND

1. Technical Field

The present disclosure relates to a robot that determines its own state.

2. Description of the Related Art

Various types of robots have been proposed in the past. International Publication No. 00/032360 discloses a multi-legged traveling robot having four legs (such as page 8, lines 15-17, for example). In International Publication No. 00/032360, the multi-legged traveling robot is provided with an acceleration sensor that detects acceleration in three axis (X axis, Y axis, Z axis) directions, and an angular velocity sensor that detects rotational angular velocity in three angle (R angle, P angle, Y angle) directions (such as page 8, line 26 to page 9, line 8, for example). On the basis of detection results from the acceleration sensor and the angular velocity sensor (such as page 9, lines 5-14, for example), if it is detected that the user has picked up the robot, the robot stops the movement of each of the legs (such as page 10, lines 13-20, for example). With this arrangement, injury to the user is prevented (such as page 6, lines 11-12, for example).

SUMMARY

In the above technology of the related art, further improvement is necessary.

In one general aspect, the techniques disclosed here feature a robot including: a housing; a frame disposed inside the housing; a display, fitted to the frame, that displays at least part of a face of the robot; drive wheels, fitted to the frame, that contact an inner surface of the housing and cause the housing to rotate; a weight driver, fitted to the frame, that causes a weight to move back and forth in a certain direction; an acceleration sensor that senses acceleration in three axis directions, an up-and-down axis direction, a front-and-back axis direction, and a left-and-right axis direction; and a control circuit that determines a state of the housing based on acceleration values sensed in the three axis directions, wherein after a first value indicating acceleration in the up-and-down axis direction output from the acceleration sensor to the control circuit is determined to exceed a certain threshold value, in a case in which any of the first value indicating the acceleration in the up-and-down axis direction, a second value indicating the acceleration in the front-and-back axis direction, and a third value indicating the acceleration in the left-and-right axis direction is determined to exhibit variation exceeding a certain width for a fixed period, the control circuit determines that the housing is being held by a user.

These general and specific aspects may be implemented using a system, a method, and a computer program, and any combination of systems, methods, and computer programs.

According to the above aspect, further improvement may be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 28A is a diagram illustrating an example of an output waveform of an acceleration sensor when hugging a robot from behind;

FIG. 28B is a diagram illustrating an example of an output waveform of an acceleration sensor when hugging a robot from behind;

DETAILED DESCRIPTION (Findings that LED to the Invention of an Aspect According to the Present Disclosure)

As above, International Publication No. 00/032360 discloses a multi-legged traveling robot having four legs, provided with an acceleration sensor and an angular velocity sensor. In International Publication No. 00/032360, two threshold values ($\delta 1$, $\delta 2$) are set, and the variance values of the detection output from the acceleration sensor and the angular velocity sensor are classified into three categories to determine if the robot is in a state of acting on the ground, a state of being picked up, or a state of being put down (such as page 9, lines 5-14, for example).

In contrast, the inventor investigated a robot provided with a spherical housing, in which a pair of drive wheels touch the inner circumferential surface of the housing and cause the housing to rotate. This robot does not have arms or legs, because providing arms and legs would impede rotation. Inside the robot, a frame is provided, and on the frame is fitted a display that displays at least part of the robot's face.

While investigating a robot of this type, the following findings were discovered.

Namely, in the case of attaching an acceleration sensor to the robot, the inventor observed how an output waveform from the acceleration sensor changes when a person picks up the sphere, and inferred the following.

The inventor inferred that the output waveform from the acceleration sensor is different between a case in which a user picks up the robot from the floor and hugs the robot, for example, and a case in which a user picks up the robot from the floor and places the robot on a chair, for example.

Figure 1A:
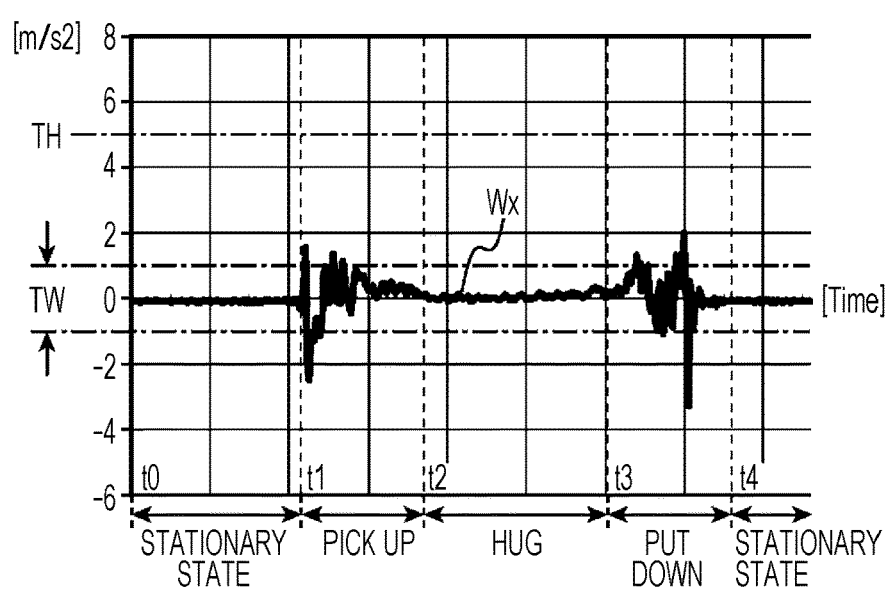
FIG. 1A is a diagram illustrating an example of an output waveform of an acceleration sensor when hugging a robot.
Figure 1B:
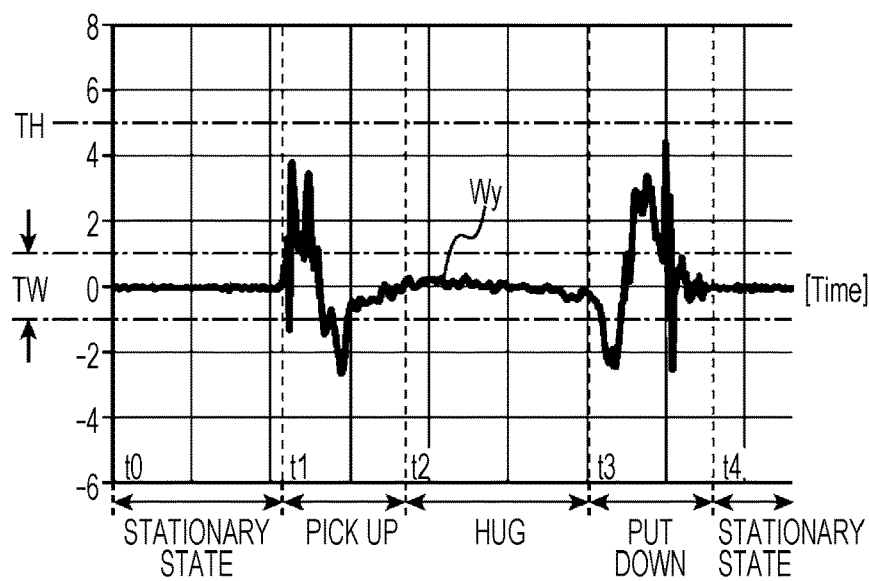
FIG. 1B is a diagram illustrating an example of an output waveform of an acceleration sensor when hugging a robot.
Figure 1C:
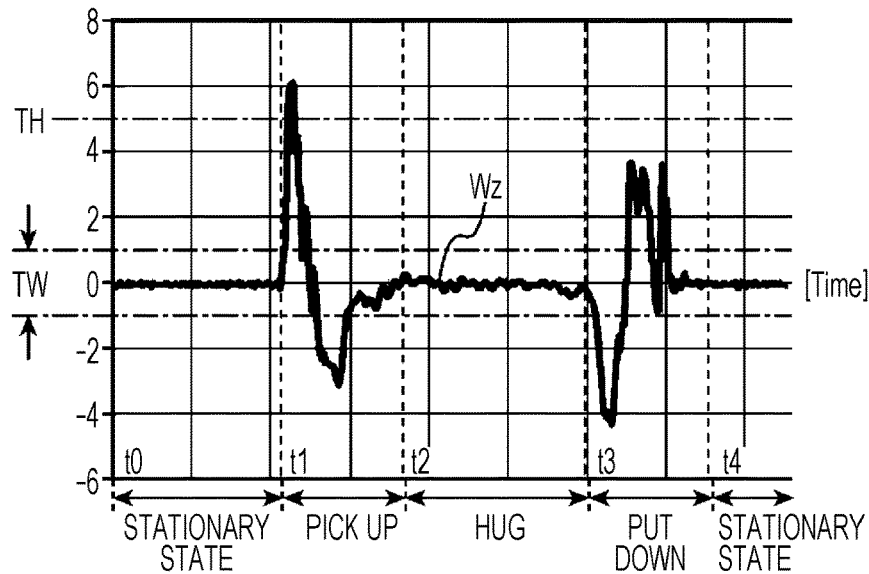
FIG. 1C is a diagram illustrating an example of an output waveform of an acceleration sensor when hugging a robot.

FIGS. 1A to 1C are diagrams illustrating an example of output waveforms of an acceleration sensor when hugging a robot. Suppose that a user picks up the robot from the floor, and hugs (holds) the robot. In this case, the values indicating the acceleration in each of a left-and-right axis (X axis) direction, a front-and-back axis (Y axis) direction, and an up-and-down axis (Z axis) direction output by the acceleration sensor are estimated to change as indicated by the output waveform Wx in FIG. 1A, the output waveform Wy in FIG. 1B, and the output waveform Wz in FIG. 1C. Hereinafter, the left-and-right axis direction will be designated the X axis direction, the front-and-back axis direction will be designated the Y axis direction, and the up-and-down axis direction will be designated the Z axis direction.

As illustrated in FIGS. 1A to 1C, if the robot in a stationary state is picked up from the floor by a user at a time t1, from among the output of the acceleration sensor, at least the value indicating the acceleration in the Z axis direction (an example of a first value) is estimated to change until a certain threshold value TH is exceeded, as indicated by the output waveform Wz.

Additionally, if the user pulls close the robot and hugs the robot, after moving to the user's position, the robot is estimated to sway in accordance with the movement of the user. For this reason, as the output waveforms Wx, Wy, and Wz indicate in the period from time t1 to time t2, in accordance with the robot moving to the user's position, any of the value indicating the acceleration in the Z axis direction, a value indicating the acceleration in the Y axis direction (an example of a second value), and a value indicating the acceleration in the X axis direction (an example of a third value) is estimated to exhibit variation exceeding a certain width TW for a fixed period.

After that, if the robot is hugged by the user, as indicated by the output waveforms Wx, Wy, and Wz in the period from time t2 to time t3 in FIGS. 1A to 1C, each of the values indicating the acceleration in the Z axis direction, the Y axis direction, and the X axis direction is estimated to exhibit variation within the certain width TW in accordance with the motion of the user.

On the other hand, suppose that the robot is picked up from the floor and placed on a chair, for example. Likewise in this case, similarly to the case of hugging the robot, as a result of the user picking up the robot from the floor, the value indicating the acceleration in the Z axis direction is estimated to change until the certain threshold value TH is exceeded. However, if the robot is placed on a chair, for example, the position of the robot remains fixed on the chair. For this reason, the values indicating the acceleration in the Z axis direction, the Y axis direction, and the X axis direction all are estimated to indicate an approximately constant value, similarly to the period from time t0 to time t1 during which the robot is in a stationary state. Thus, similarly to the period from time t1 to time t2, any of the values indicating the acceleration in the Z axis direction, the Y axis direction, and the X axis direction is estimated to exhibit little or no variation exceeding the certain width TW for a fixed period.

In this way, in a case in which the user picks up the robot from the floor and hugs the robot, the findings about how the output waveforms of the acceleration sensor change from the characteristics of the output waveforms of the acceleration sensor are not disclosed in International Publication No. 00/032360, and are recognized as not being known in the related art.

Meanwhile, the robot being investigated by the inventor is a robot having a spherical housing as described earlier, in which a pair of drive wheels touch the inner circumferential surface of the housing and cause the housing to rotate. For this reason, arms, legs, or the like which would impede rotation cannot be provided on the outer circumference of the housing. For this reason, there is a problem in that expressiveness is constrained to the extent that arms, legs, and the like are not included.

The inventor utilized the above findings to determine whether or not a user such as a child is hugging (holding) the robot, and in the case in which the user is hugging the robot, the inventor investigated causing the robot to react to the user in various ways, which thereby led to respective aspects in accordance with the present disclosure.

A robot according to an aspect of the present disclosure includes:
  a housing;
  a frame disposed inside the housing;
  a display, fitted to the frame, that displays at least part of a face of the robot;
  drive wheels, fitted to the frame, that contact an inner surface of the housing and cause the housing to rotate;
  a weight driver, fitted to the frame, that causes a weight to move back and forth in a certain direction;
  an acceleration sensor that senses acceleration in three axis directions, an up-and-down axis direction, a front-and-back axis direction, and a left-and-right axis direction; and
  a control circuit that determines a state of the housing based on acceleration values sensed in the three axis directions, wherein after a first value indicating acceleration in the up-and-down axis direction output from the acceleration sensor to the control circuit is determined to exceed a certain threshold value, when any of the first value indicating the acceleration in the up-and-down axis direction, a second value indicating the acceleration in the front-and-back axis direction, and a third value indicating the acceleration in the left-and-right axis direction is determined to exhibit variation exceeding a certain width for a fixed period, the control circuit determines that the housing is being held by a user.

This aspect is provided with an acceleration sensor, and after a first value indicating acceleration in the up-and-down axis direction output from the acceleration sensor exceeds a certain threshold value, in a case in which any of the first value indicating the acceleration in the up-and-down axis direction, a second value indicating the acceleration of the front-and-back axis direction, and a third value indicating the acceleration in the left-and-right axis direction is determined to exhibit variation exceeding a certain width for a fixed period, it is determined that the housing is being held (hugged) by a user.

With this arrangement, it is possible to distinguish easily between a case in which a user picks up the robot from the floor and hugs the robot, and a case in which a user picks up the robot from the floor, and places the robot on a chair, for example. As a result, in the case of determining that the user has hugged the robot, the robot can be made to react to the user appropriately in various ways.

EMBODIMENTS

Hereinafter, exemplary embodiments of the present invention will be described while referring to the drawings. Note that in the drawings, like signs are used to denote like structural elements.

First Embodiment (Overall Configuration)

Figure 2A:
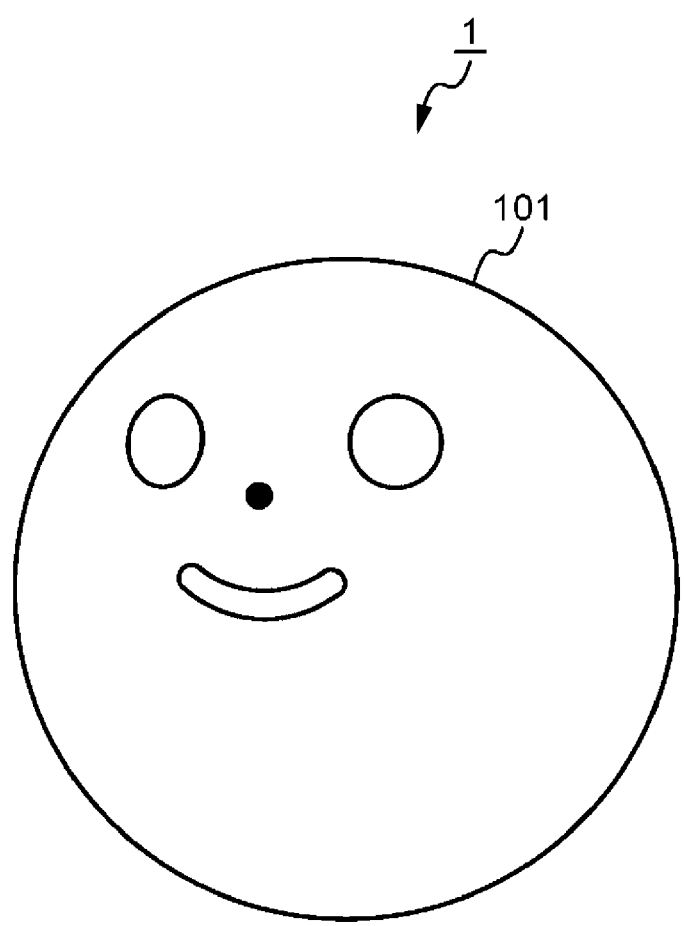
FIG. 2A is an exterior perspective view of a robot according to a first embodiment of the present disclosure.
Figure 2B:
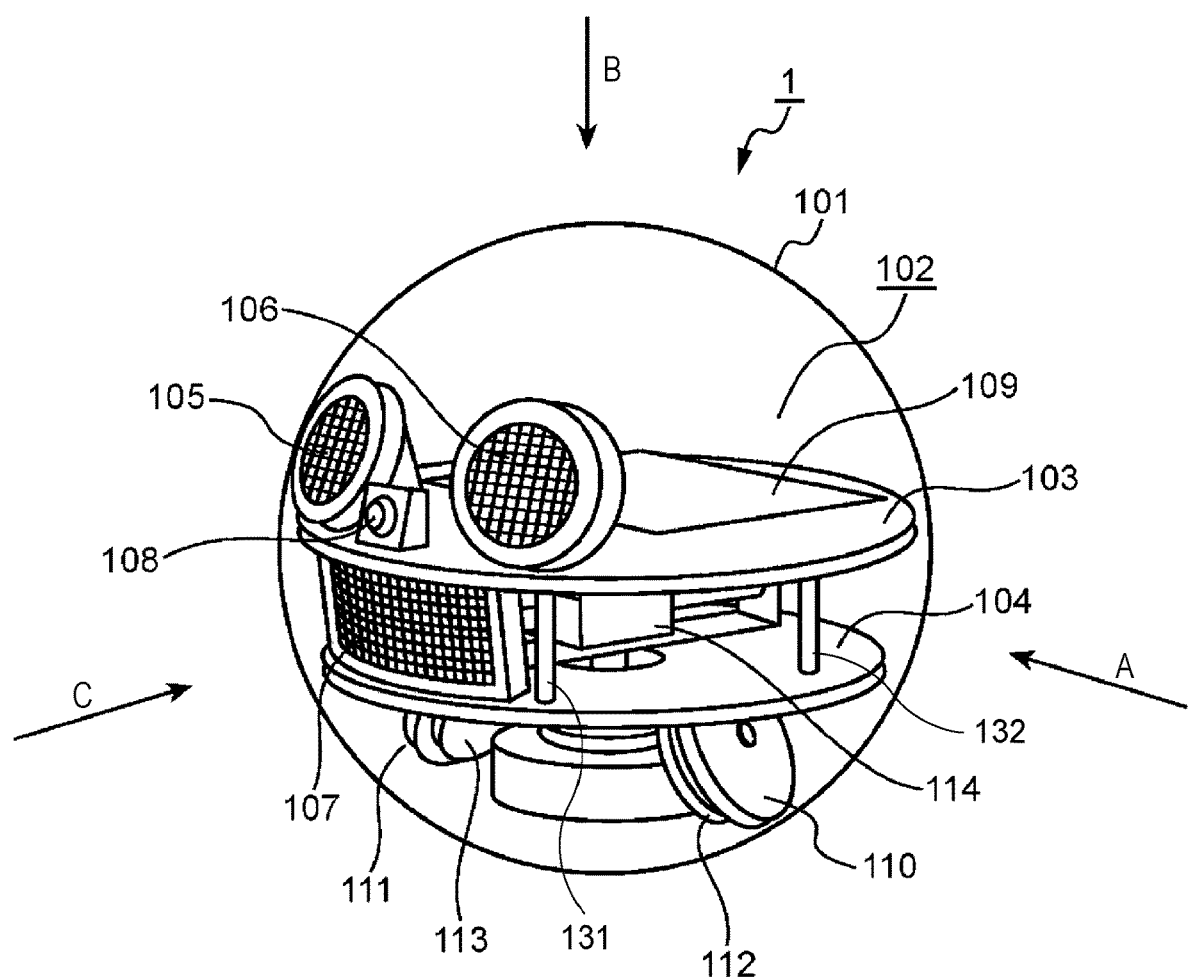
FIG. 2B is an interior perspective view of a robot according to a first embodiment of the present disclosure.

FIG. 2A is an exterior perspective view of a robot 1 according to a first embodiment of the present disclosure. FIG. 2B is an interior perspective view of a robot 1 according to a first embodiment of the present disclosure. As illustrated in FIG. 2A, the robot 1 is provided with a spherical housing 101. The housing 101 is made of a transparent member or a translucent member, for example.

In FIG. 2B, a frame 102 is disposed inside the housing 101. The frame 102 is provided with a first rotating plate 103 (an example of a rotating plate) and a second rotating plate 104. The first rotating plate 103 is disposed above the second rotating plate 104. The first rotating plate 103 and the second rotating plate 104 are connected by connecting shafts 131 and 132, and two connecting shafts not illustrated which face opposite the connecting shafts 131 and 132, respectively.

As illustrated in FIG. 2B, a first display 105 and a second display 106 are fitted on the top face of the first rotating plate 103. Also, a third display 107 is fitted on the top face of the second rotating plate 104. The first display 105, the second display 106, and the third display 107 are made up of multiple light-emitting diodes, for example. The first display 105, the second display 106, and the third display 107 display robot facial expression display information. Specifically, the first display 105, the second display 106, and the third display 107 individually control the lighting up of the multiple light-emitting diodes, and thereby display parts of the face of the robot 1, such as the eyes and the mouth, for example, as illustrated in FIG. 2A. In the example of FIG. 2A, the first display 105 displays an image of a left eye, the second display 106 displays an image of a right eye, and the third display 107 displays an image of a mouth. Additionally, the images of the left eye, right eye, and mouth are transmitted through the housing 101 made of a transparent or translucent member, and are radiated externally.

As illustrated in FIG. 2B, a camera 108 is fitted on the top face of the first rotating plate 103. As illustrated in FIG. 2A, the camera 108 constitutes a part of the face of the robot 1, such as the nose, for example. As illustrated in FIG. 2B, the imaging direction of the camera 108 faces in front of the robot 1. With this arrangement, the camera 108 can image a picture in front of the robot 1.

Hereinafter, the left direction from the C view in FIG. 2B will be designated the left direction or the X direction, while the right direction from the C view in FIG. 2B will be designated the right direction or the −X direction. Also, the left direction from the A view in FIG. 2B will be designated the front direction or the Y direction, while the right direction from the A view in FIG. 2B will be designated the back direction or the −Y direction. Also, the up direction from the A view and the C view in FIG. 2B will be designated the up direction or the Z direction, while the down direction from the A view and the C view in FIG. 2B will be designated the down direction or the −Z direction.

As illustrated in FIG. 2B, a control circuit 109 is fitted on the top face of the first rotating plate 103. The control circuit 109 controls various operations of the robot 1. Details about the control circuit 109 will be described later with reference to FIG. 15.

A first drive wheel 110 and a second drive wheel 111 are respectively fitted on the bottom face of the second rotating plate 104, and touch the inner circumferential surface of the housing 101. Also, the first drive wheel 110 includes a first motor 112 that drives the first drive wheel 110. Similarly, the second drive wheel 111 includes a second motor 113 that drives the second drive wheel 111. In other words, the first drive wheel 110 and the second drive wheel 111 are driven respectively by independent, separate motors. Details about the operation of the robot 1 through the driving of the first drive wheel 110 and the second drive wheel 111 will be described later. The first drive wheel 110 and the second drive wheel 111 constitute a pair of drive wheels.

Figure 3:
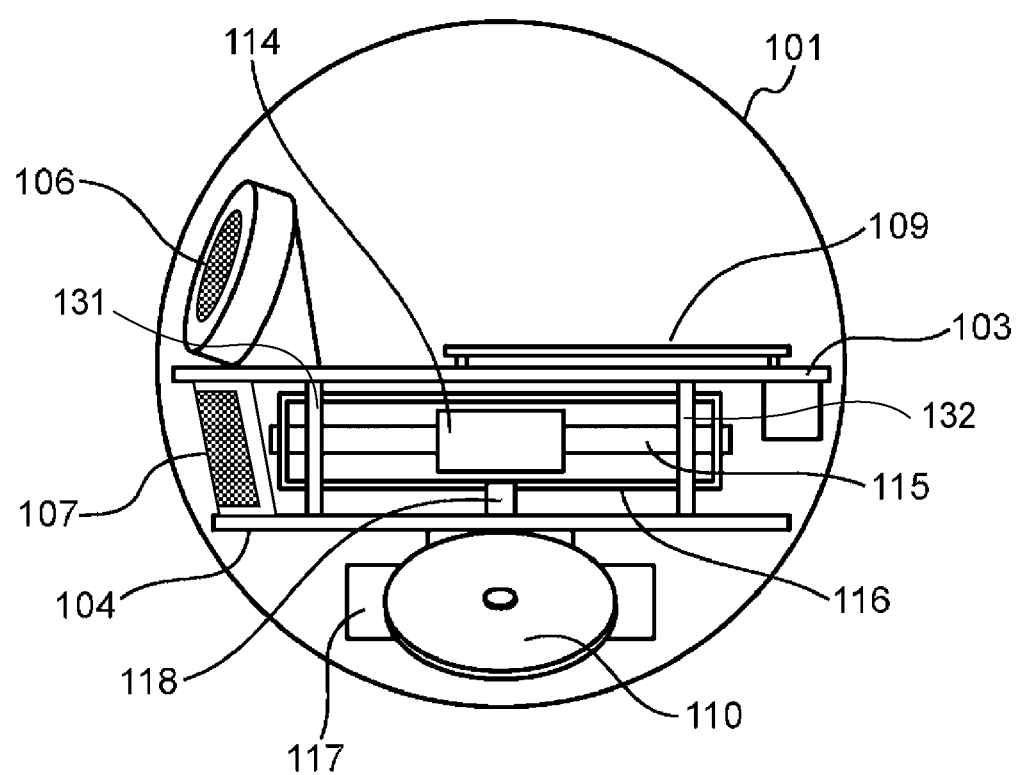
FIG. 3 is an interior lateral view, from the A view in FIG. 2B, of a robot according to a first embodiment of the present disclosure.

FIG. 3 is an interior lateral view, from the A view in FIG. 2B, of the robot 1 according to the first embodiment of the present disclosure. In FIG. 3, a counterweight 114 (an example of a weight) is provided between the first rotating plate 103 and the second rotating plate 104. The counterweight 114 is positioned slightly below the center of the housing 101. For this reason, the center of gravity of the robot 1 is positioned below the center of the housing 101. With this arrangement, operation of the robot 1 can be stabilized.

As illustrated in FIG. 3, as a mechanism that drives the counterweight 114, the robot 1 is provided with a guide shaft 115 that prescribes the movement direction of the counterweight 114, a swing arm 116 that prescribes the position in the rotational direction of the counterweight 114, a rotation motor 117 that causes the swing arm 116 to rotate, a rotating shaft 118 that connects the swing arm 116 and the rotation motor 117, a belt 119 used to drive the counterweight 114 (FIGS. 8A and 8B), a motor pulley 120 that touches the belt 119 (FIGS. 8A and 8B), and a weight driving motor not illustrated that causes the motor pulley 120 to rotate. Note that in this aspect, the driving motor is built into the counterweight 114. Details about the operation of the robot 1 through the driving of the counterweight 114 will be described later.

The rotating shaft 118 extends in a perpendicular direction with respect to a drive shaft between the first drive wheel 110 and the second drive wheel 111. In a front view, the first drive wheel 110 and the second drive wheel 111 are attached at a distance facing the ground. In this case, the drive shaft between the first drive wheel 110 and the second drive wheel 111 is a virtual shaft line that joins the centers of the first drive wheel 110 and the second drive wheel 111 to each other. Note that if the first drive wheel 110 and the second drive wheel 111 are attached parallel in a front view, an actual drive shaft becomes the drive shaft between the first drive wheel 110 and the second drive wheel 111.

The robot 1 additionally is provided with a power source not illustrated. The robot 1 is charged by a charger not illustrated.

Next, operations of the robot 1 using the first drive wheel 110 and the second drive wheel 111 will be described with reference to FIGS. 4 to 6.

Figure 4:
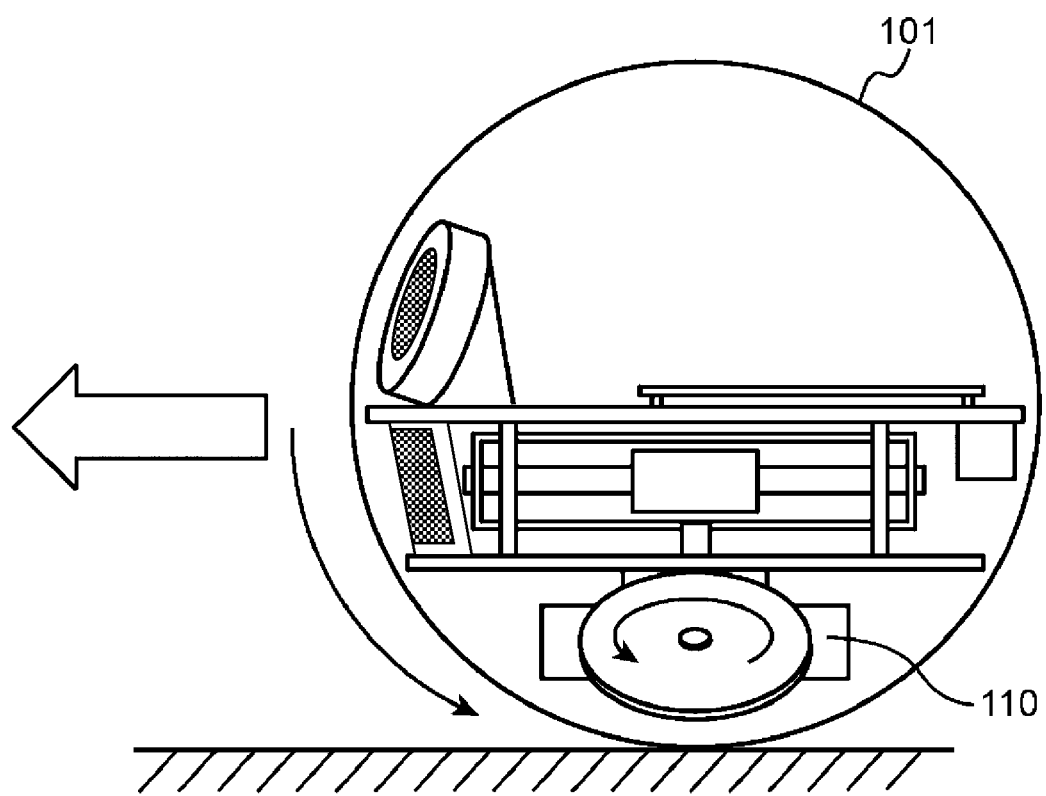
FIG. 4 is a lateral view, from the A view in FIG. 2B, expressing a forward movement operation of a robot according to a first embodiment of the present disclosure.

FIG. 4 is a lateral view, from the A view in FIG. 2B, expressing a forward movement operation of the robot 1 according to the first embodiment of the present disclosure. FIG. 5 is a plan view, from the B view in FIG. 2B, expressing a rotation operation of the robot 1 according to the first embodiment of the present disclosure. FIG. 6 is a perspective view expressing a rotation operation of the robot 1 according to the first embodiment of the present disclosure.

As illustrated in FIG. 4, if the first drive wheel 110 and the second drive wheel 111 are made to rotate in the front direction at the same speed, the motive power causes the housing 101 to rotate in the front direction. With this arrangement, the robot 1 moves forward in the Y direction parallel to the virtual line L1 illustrated in FIG. 5. The virtual line L1 is a straight line that joins the rotating shaft 118 (FIG. 3) or an extension line extending in the longitudinal direction of the rotating shaft 118 (FIG. 3) to the center of the third display 107. Conversely, if the first drive wheel 110 and the second drive wheel 111 are made to rotate in the back direction at the same speed, the robot 1 moves backward in the −Y direction parallel to the virtual line L1 (FIG. 5). Hereinafter, the forward direction (Y direction) of the housing 101 when the first drive wheel 110 and the second drive wheel 111 are made to rotate in the front direction at the same speed will be designated the forward direction by the first drive wheel 110 and the second drive wheel 111. Hereinafter, the backward direction (−Y direction) of the housing 101 when the first drive wheel 110 and the second drive wheel 111 are made to rotate in the back direction at the same speed will be designated the backward direction by the first drive wheel 110 and the second drive wheel 111. Also, the front direction may be designated the forward direction, and the back direction may be designated the backward direction.

Figure 5:
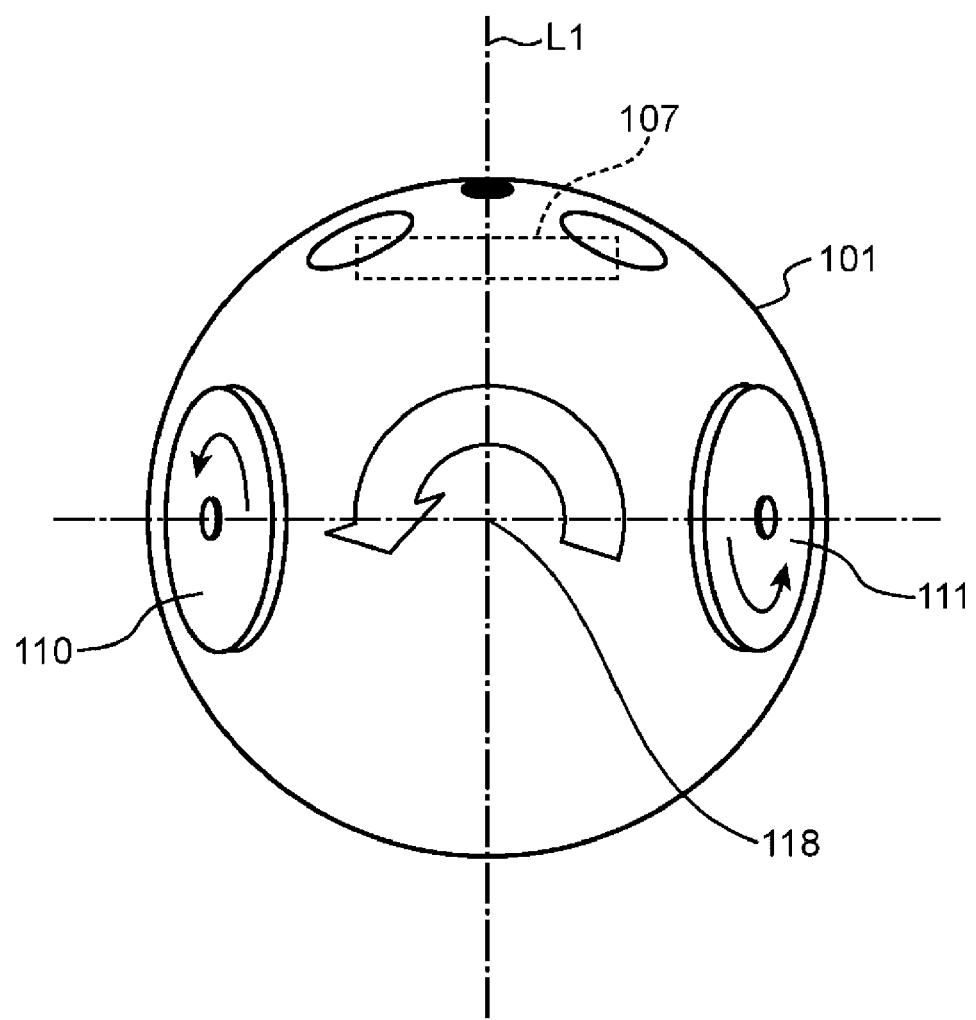
FIG. 5 is a plan view, from the B view in FIG. 2B, expressing a rotation operation of a robot according to a first embodiment of the present disclosure.
Figure 6:
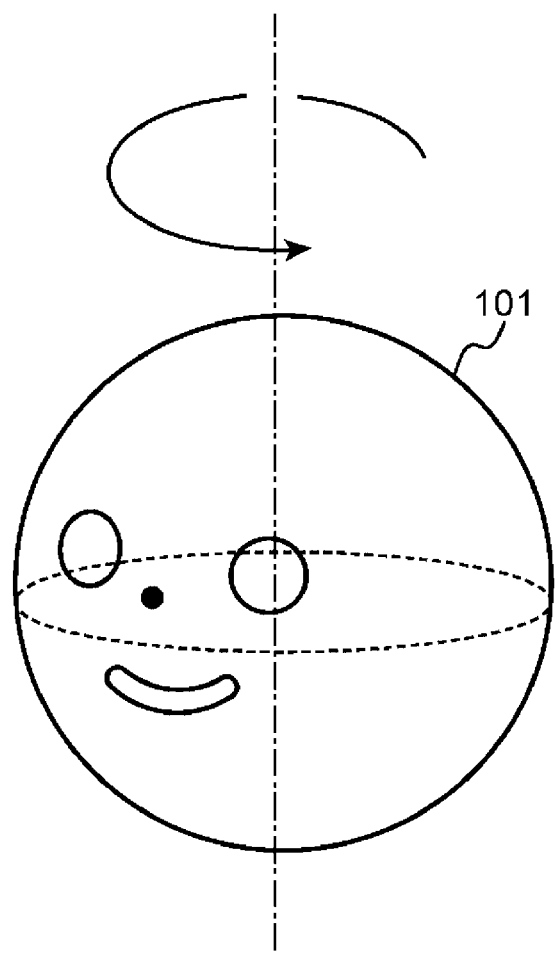
FIG. 6 is a perspective view expressing a rotation operation of a robot according to a first embodiment of the present disclosure.

Also, as illustrated in FIGS. 5 and 6, if the first drive wheel 110 and the second drive wheel 111 are made to rotate in opposite directions of each other, the motive power causes the housing 101 to performs a rotation operation about a vertical axis passing through the center. In other words, the robot 1 rotates in place to the left or to the right. For example, as illustrated in FIGS. 5 and 6, if a first control causing the first drive wheel 110 to rotate in the forward direction and also causing the second drive wheel 111 to rotate in the backward direction is conducted, the robot 1 rotates to the left. Conversely, if a second control causing the first drive wheel 110 to rotate in the backward direction and also causing the second drive wheel 111 to rotate in the forward direction is conducted, the robot 1 rotates to the right. The robot 1 moves by such forward, backward, or rotation operations. Also, if the first control and the second control are switched in alternation, the robot 1 alternately rotates to the left and to the right. With this arrangement, for example, the robot 1 being in an agitated state can be expressed.

Next, basic operations of the robot 1 using the counterweight 114 will be described with reference to FIGS. 7 to 9C.

Figure 7:
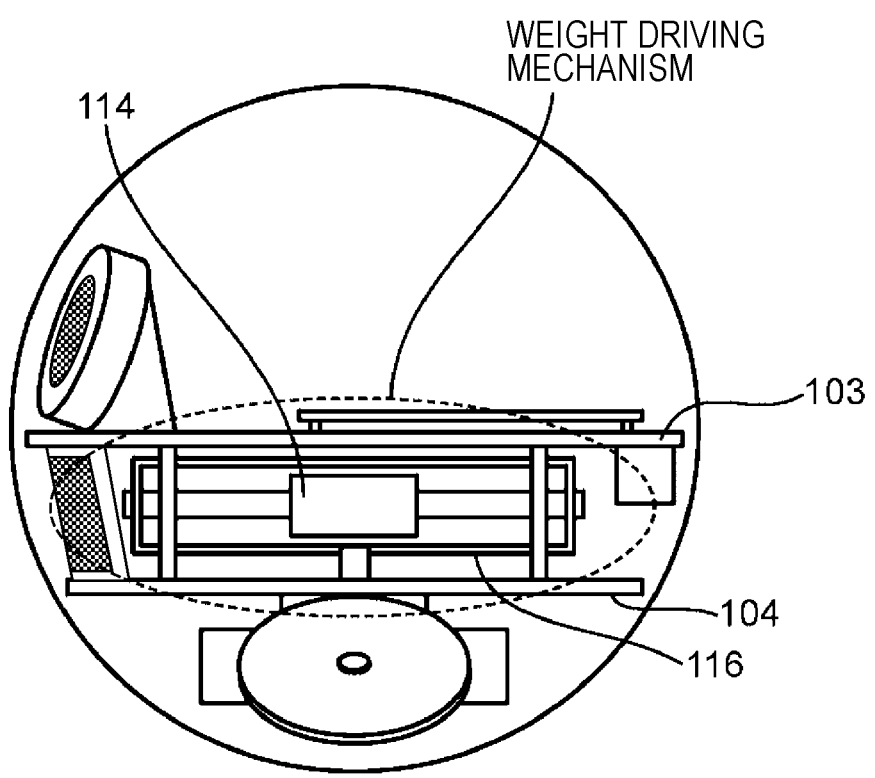
FIG. 7 is a diagram illustrating a counterweight driving mechanism in the lateral view of FIG. 3.
Figure 8A:
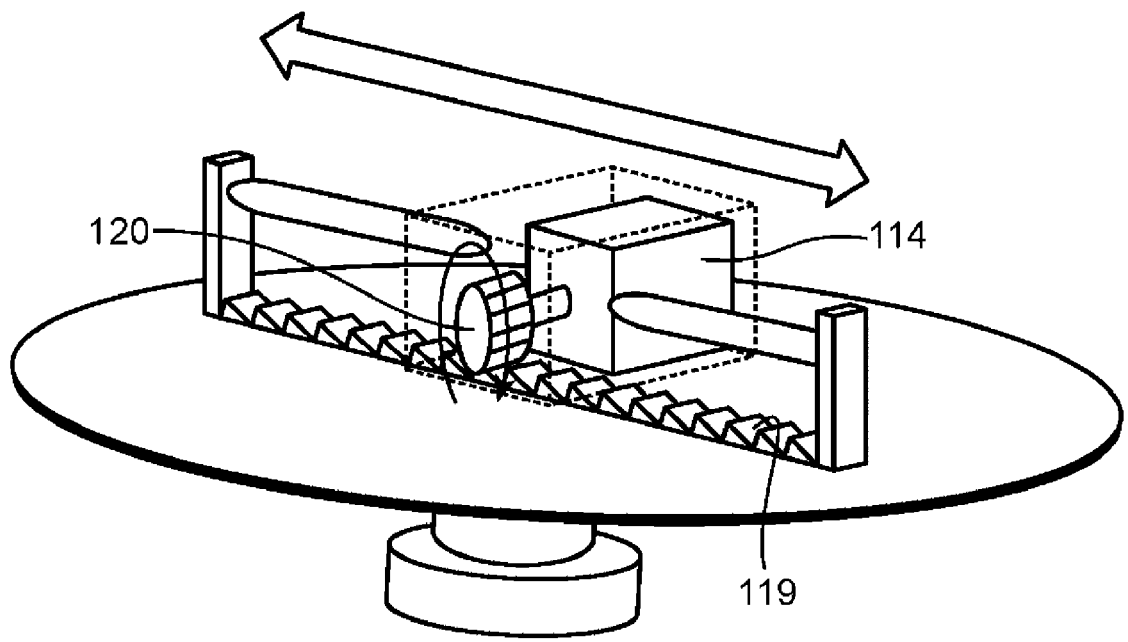
FIG. 8A is a perspective view illustrating an operation of a counterweight driving mechanism when driving a counterweight in a certain linear direction.
Figure 8B:
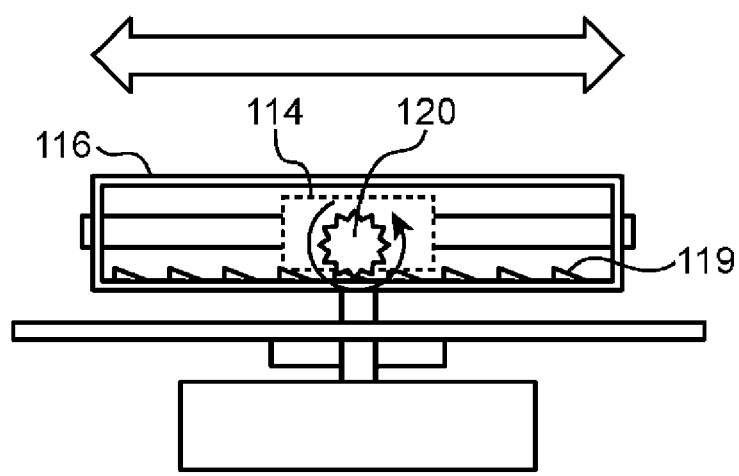
FIG. 8B is a lateral view illustrating an operation of a counterweight driving mechanism when driving a counterweight in a certain linear direction.
Figure 8C:
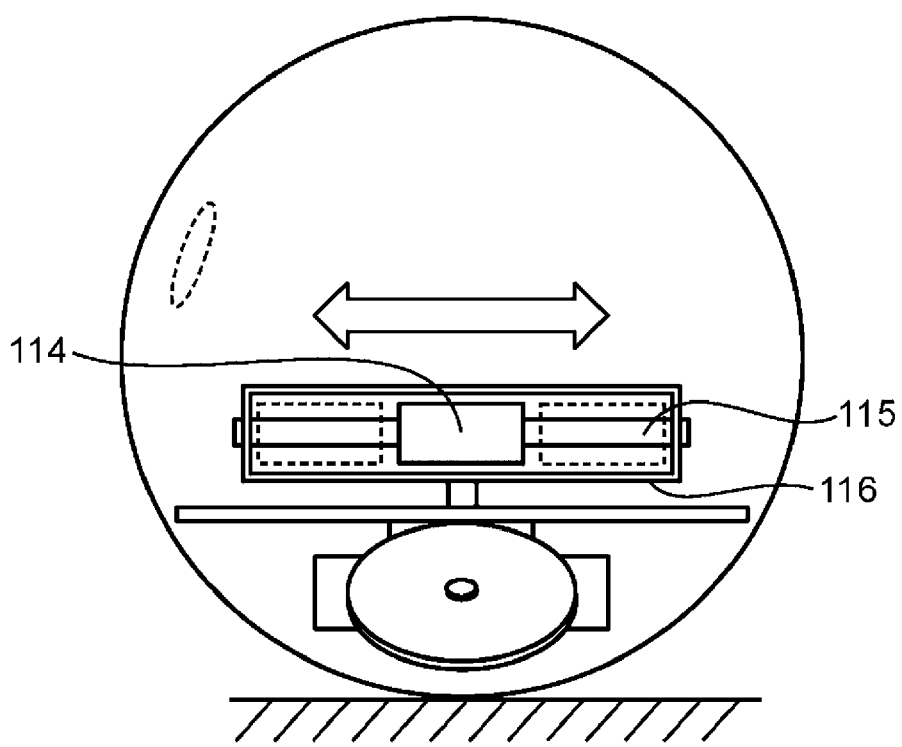
FIG. 8C is a lateral view illustrating a state of a counterweight moving back and forth in a certain linear direction in the lateral view of FIG. 3.
Figure 9A:
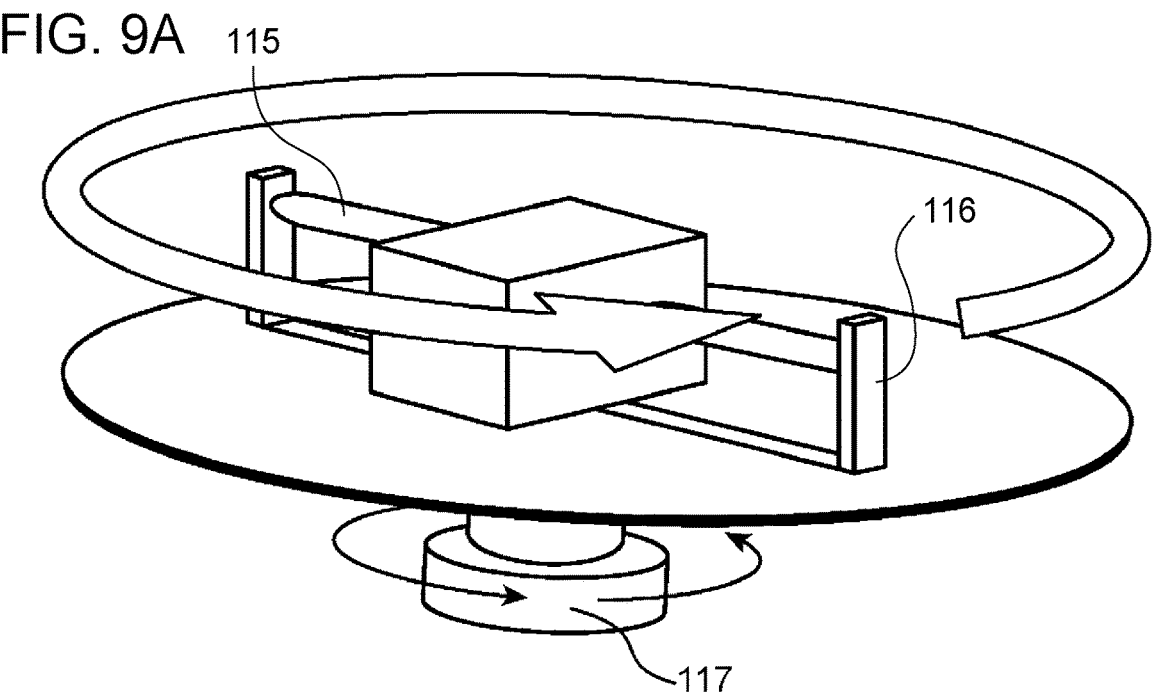
FIG. 9A is a perspective view illustrating an operation of a counterweight driving mechanism when causing a swing arm to rotate.
Figure 9B:
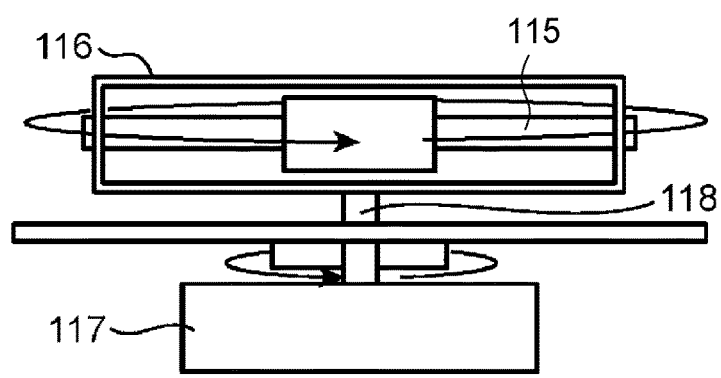
FIG. 9B is a lateral view illustrating an operation of a counterweight driving mechanism when causing a swing arm to rotate.
Figure 9C:
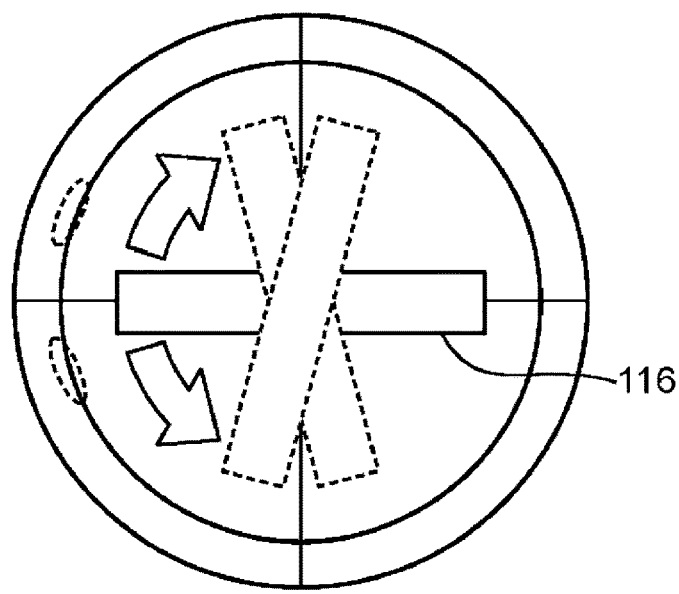
FIG. 9C is a plan view, from the B view in FIG. 2B, illustrating a state of a swing arm rotating in a robot according to a first embodiment of the present disclosure.

FIG. 7 is a diagram illustrating a weight driving mechanism in the lateral view of FIG. 3. FIG. 8A is a perspective view illustrating an operation of the driving mechanism of the counterweight 114 when driving the counterweight 114 in a certain linear direction. FIG. 8B is a lateral view illustrating an operation of the driving mechanism of the counterweight 114 when driving the counterweight 114 in a certain linear direction. FIG. 8C is a lateral view illustrating a state of the counterweight 114 moving back and forth in a certain linear direction in the lateral view of FIG. 3. FIG. 9A is a perspective view illustrating an operation of the driving mechanism of the counterweight 114 when causing the swing arm 116 to rotate. FIG. 9B is a lateral view illustrating an operation of the weight driving mechanism when causing the swing arm 116 to rotate. FIG. 9C is a plan view, from the B view in FIG. 2B, illustrating a state of the swing arm 116 rotating in the robot 1 according to the first embodiment of the present disclosure.

As illustrated in FIG. 7, the middle position of the swing arm 116 is the default position of the counterweight 114. Herein, as an example, the swing arm 116 points in a direction perpendicular to the front face of the robot 1. Note that the swing arm 116 may also point in a direction perpendicular to the left-and-right direction of the robot 1. Hereinafter, for the sake of convenience, the direction perpendicular to the front face of the robot 1 is designated the default direction. In this way, when the counterweight 114 is positioned in the middle of the swing arm 116, the first rotating plate 103 and the second rotating plate 104 are mostly parallel to the plane of travel, and the eyes, noise, and mouth constituting the face of the robot 1, for example, are in a state of pointing in the default direction.

As illustrated in FIGS. 8A and 8B, the weight driving motor not illustrated which is built into the counterweight 114 causes the motor pulley 120 connected to the weight driving motor to rotate. By causing the rotating motor pulley 120 to roll over the belt 119, the counterweight 114 moves inside the swing arm 116. By changing the rotation direction of the motor pulley 120, or in other words, the driving direction of the weight driving motor, inside the swing arm 116, the counterweight 114 moves back and forth in a straight direction.

As illustrated in FIG. 8C, the counterweight 114 moves back and forth in a straight direction inside the swing arm 116, along the guide shaft 115.

As illustrated in FIGS. 9A and 9B, the rotation motor 117 causes the rotating shaft 118 to rotate, thereby causing the swing arm 116 connected to the rotating shaft 118 (FIG. 3) to rotate. With this arrangement, the guide shaft 115 also rotates in the same direction as the swing arm 116.

As illustrated in FIG. 9C, the swing arm 116 and the guide shaft 115 (FIGS. 9A, 9B) can be made to rotate either to the right (clockwise) or to the left (counter-clockwise).

Figure 10:
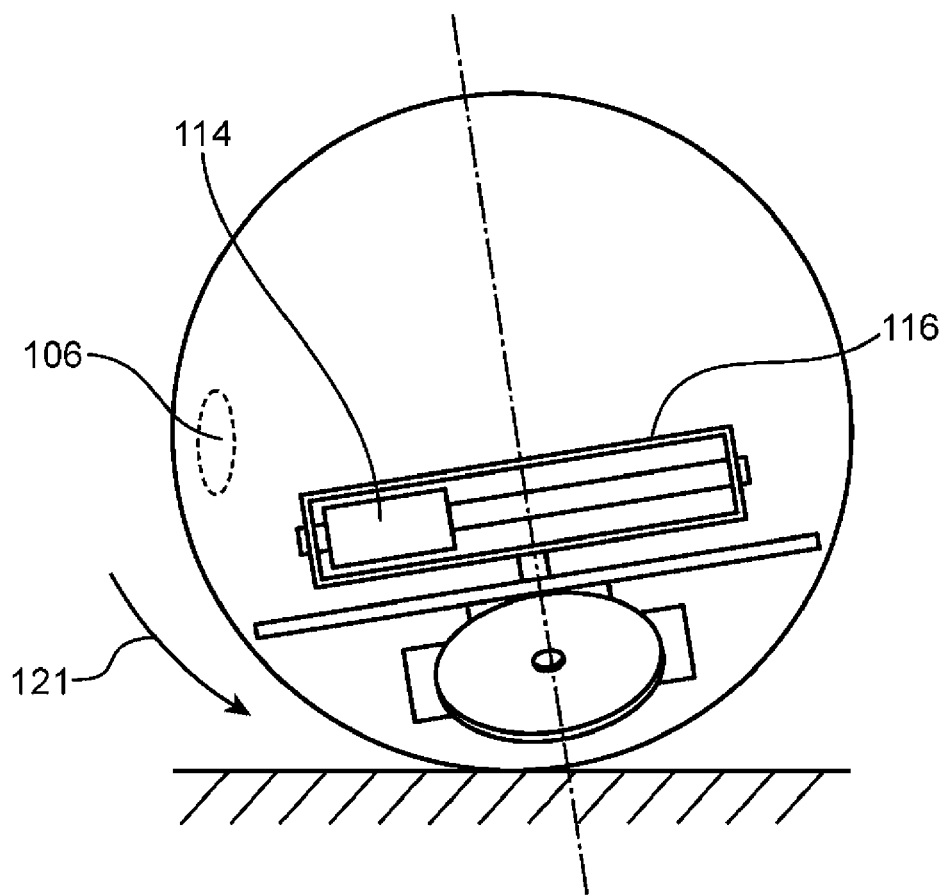
FIG. 10 is a lateral view, from the A view in FIG. 2B, illustrating an attitude of a robot when a counterweight is positioned towards the front.
Figure 11:
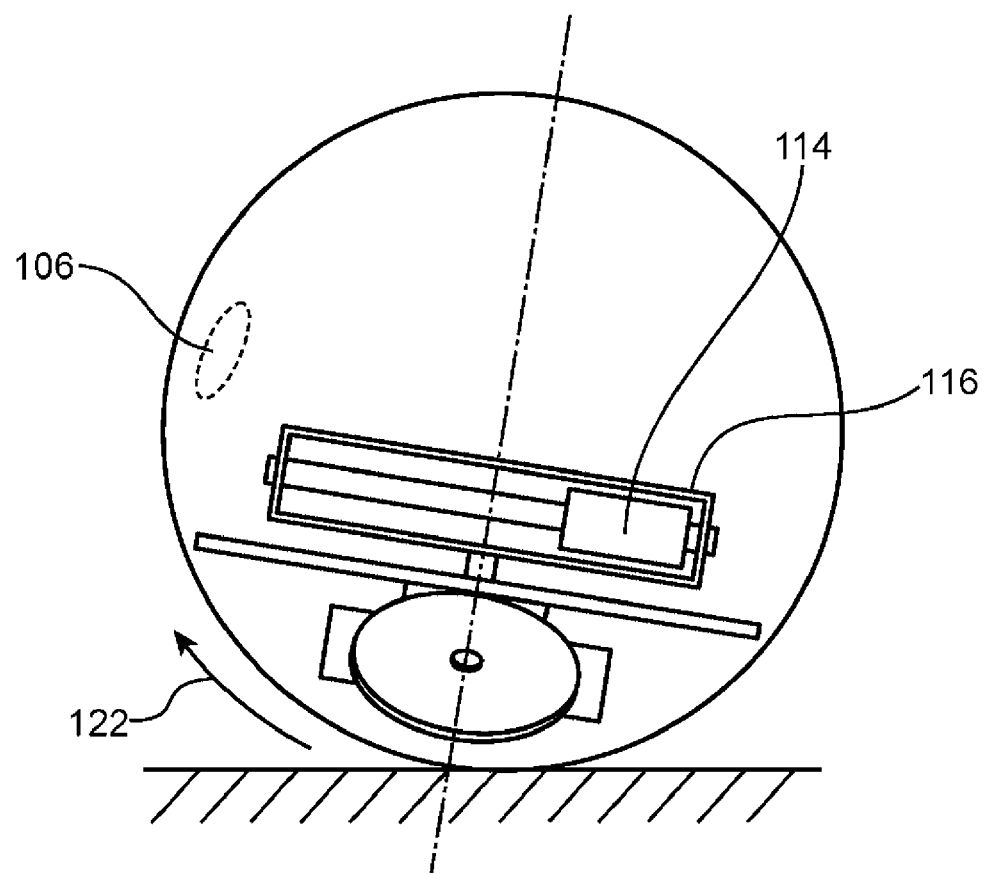
FIG. 11 is a lateral view, from the A view in FIG. 2B, illustrating an attitude of a robot when a counterweight is positioned towards the back.
Figure 12:
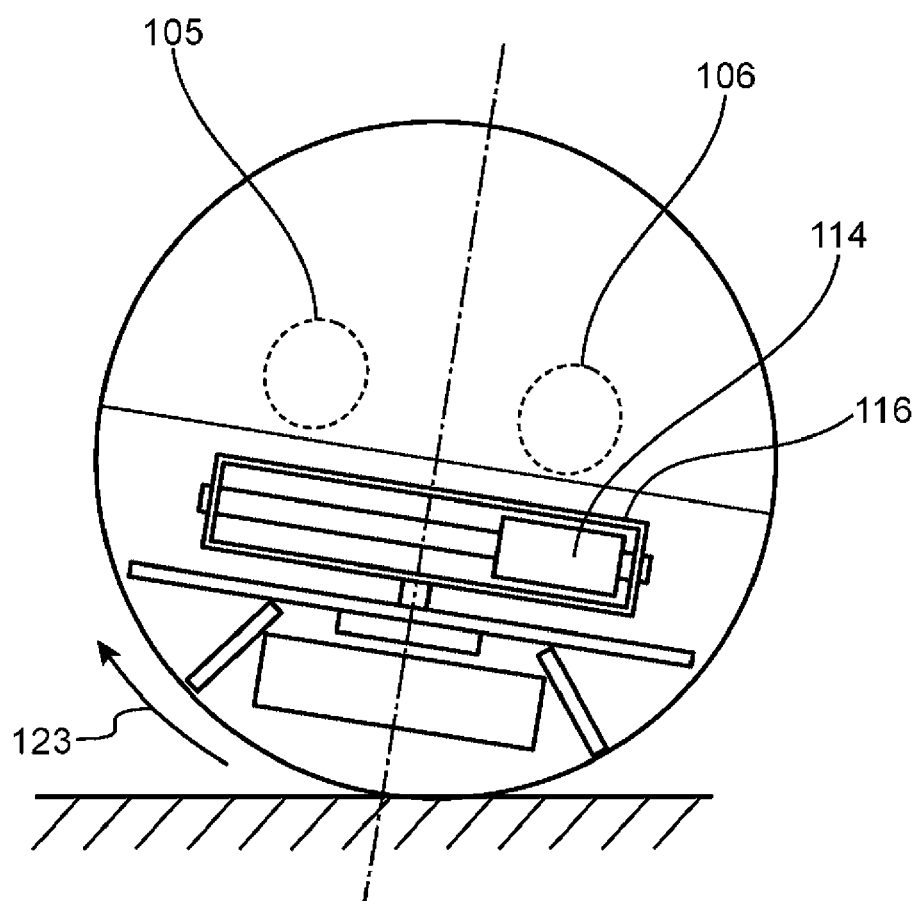
FIG. 12 is a front view, from the C view in FIG. 2B, illustrating an attitude of a robot when a counterweight is positioned towards the right.
Figure 13:
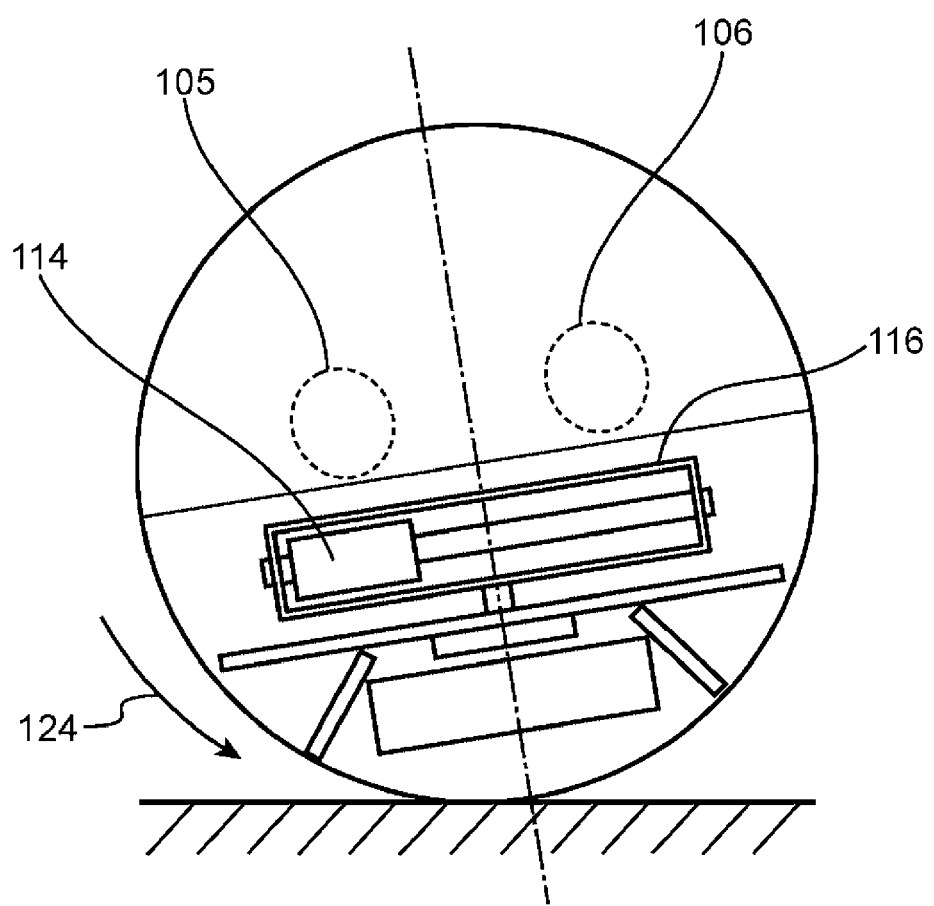
FIG. 13 is a front view, from the C view in FIG. 2B, illustrating an attitude of a robot when a counterweight is positioned towards the left.

In addition, details about operations of the robot 1 using the counterweight 114 will be described with reference to FIGS. 10 to 13. FIG. 10 is a lateral view, from the A view in FIG. 2B, illustrating an attitude of the robot 1 when the counterweight 114 is positioned towards the front. FIG. 11 is a lateral view, from the A view in FIG. 2B, illustrating an attitude of the robot 1 when the counterweight 114 is positioned towards the back. FIG. 12 is a front view, from the C view in FIG. 2B, illustrating an attitude of the robot 1 when the counterweight 114 is positioned towards the right. FIG. 13 is a front view, from the C view in FIG. 2B, illustrating an attitude of the robot 1 when the counterweight 114 is positioned towards the left.

As illustrated in FIG. 10, in a state in which the swing arm 116 is perpendicular to the front face of the robot 1, if the counterweight 114 is moved from the default position to one end of the swing arm 116 (in FIG. 10, the left end), or in other words, towards the front, the robot 1 tilts forward as indicated by the arrow 121. Also, as illustrated in FIG. 11, in a state in which the swing arm 116 is pointing in the default direction perpendicular to the front face of the robot 1, if the counterweight 114 is moved from the default position to the other end of the swing arm 116 (in FIG. 11, the right end), or in other words, towards the back, the robot 1 tilts back as indicated by the arrow 122. Consequently, in the state in which the swing arm 116 is pointing in the default direction, if the counterweight 114 is made to perform a reciprocating operation from one end to the other end inside the swing arm 116, the robot 1 performs a reciprocating operation of tilting forward as indicated by the arrow 121 and tilting back as indicated by the arrow 122. In other words, the robot 1 rotates in the up-and-down direction at a certain angle.

As described above, the first display 105, the second display 106, and the third display 107 represent parts of the face of the robot 1, such as the eyes and mouth, for example. Consequently, by using the counterweight 114 to cause the robot 1 to perform a reciprocating operation of tilting forward and back, a state of the robot 1 being out of breath or sleeping can be expressed, for example.

As illustrated in FIG. 12, in a state in which the swing arm 116 is parallel to the front face of the robot 1, if the counterweight 114 is moved from the default position to one end of the swing arm 116 (in FIG. 12, the right end), or in other words, towards the right, the robot 1 tilts to the right side as indicated by the arrow 123. Also, as illustrated in FIG. 13, in a state in which the swing arm 116 is parallel to the front face of the robot 1, if the counterweight 114 is moved from the default position to the other end of the swing arm 116 (in FIG. 13, the left end), or in other words, towards the left, the robot 1 tilts to the left side as indicated by the arrow 124. Consequently, in the state in which the swing arm 116 is in a parallel state with respect to the front face of the robot 1, if the counterweight 114 is made to perform a reciprocating operation from one end to the other end inside the swing arm 116, the robot 1 performs a reciprocating operation of tilting to the right side as indicated by the arrow 123 and tilting to the left side as indicated by the arrow 124. In other words, the robot 1 rotates in the left-and-right direction at a certain angle.

As described above, the first display 105, the second display 106, and the third display 107 represent parts of the face of the robot 1, such as the eyes and mouth, for example. Consequently, by using the counterweight 114 to cause the robot 1 to perform a reciprocating movement of tilting to the right and to the left, a state of the robot 1 being in a good mood can be expressed, or a state of the robot 1 thinking can be expressed, for example.

Figure 14:
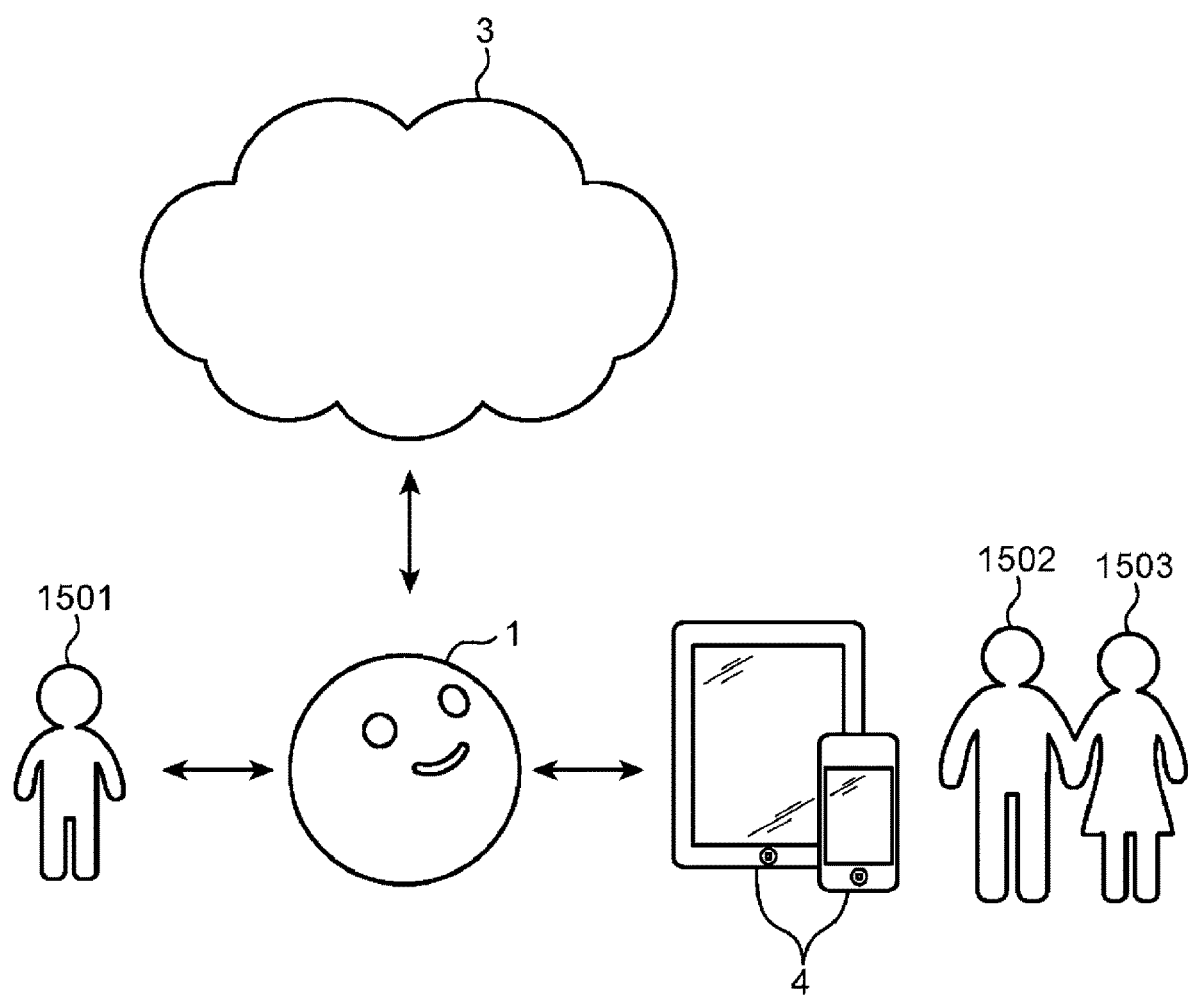
FIG. 14 is a diagram illustrating an example of an overall configuration of a robot system to which is applied a robot according to a first embodiment of the present disclosure.

FIG. 14 is a diagram illustrating an example of an overall configuration of a robot system 1500 to which is applied the robot 1 according to the first embodiment of the present disclosure. The robot system 1500 is provided with a cloud server 3, a mobile terminal 4, and a robot 1. The robot 1 connects to the Internet via Wi-Fi (registered trademark) communication, for example, and connects to the cloud server 3. Also, the robot 1 connects to the mobile terminal 4 via Wi-Fi (registered trademark) communication, for example. A user 1501 is a child, for example, while users 1502 and 1503 are the parents of the child, for example.

On the mobile terminal 4, an application that cooperates with the robot 1 is installed, for example. Through the application, the mobile terminal 4 is able to receive various instructions for the robot 1 from the users 1501 to 1503, and issue such received instructions to the robot 1.

For example, suppose that there is an instruction from the mobile terminal 4 to read a picture book to a child. In this case, the robot 1 starts reciting the picture book and reading to the child. If the robot 1 receives some kind of question from the child while reading the picture book, for example, the robot 1 sends the question to the cloud server 3, receives an answer to the question from the cloud server 3, and voices an utterance indicating the answer.

In this way, the users 1501 to 1503 can treat the robot 1 like a pet, and undertake language learning through interaction with the robot 1.

Also, suppose that while the robot 1 is operating in accordance with an instruction from the user 1501, there is a different instruction from the same user 1501. In such a case, the robot 1 can also use the counterweight 114 to perform a reciprocating movement of tilting to the right and to the left, use the first drive wheel 110 and the second drive wheel 111 to move forward in a direction towards the user 1501, or the like to express a state of being in a good mood. Conversely, suppose that while the robot 1 is operating in accordance with an instruction from the user 1501, there is a different instruction from another user, such as the user 1502 or the user 1503. In such a case, the robot 1 can also use the first drive wheel 110 and the second drive wheel 111 to move backward away from the other user, switch in alternation between the first control and the second control, or the like to express a state of being in a bad mood or an agitated state. Hereinafter, the users 1501 to 1503 will be collectively designated the user 1501.

In this way, since the robot 1 is able to express emotions with respect to the user 1501, the user 1501 can treat the robot 1 like a pet and interact with the robot 1.

Figure 15:
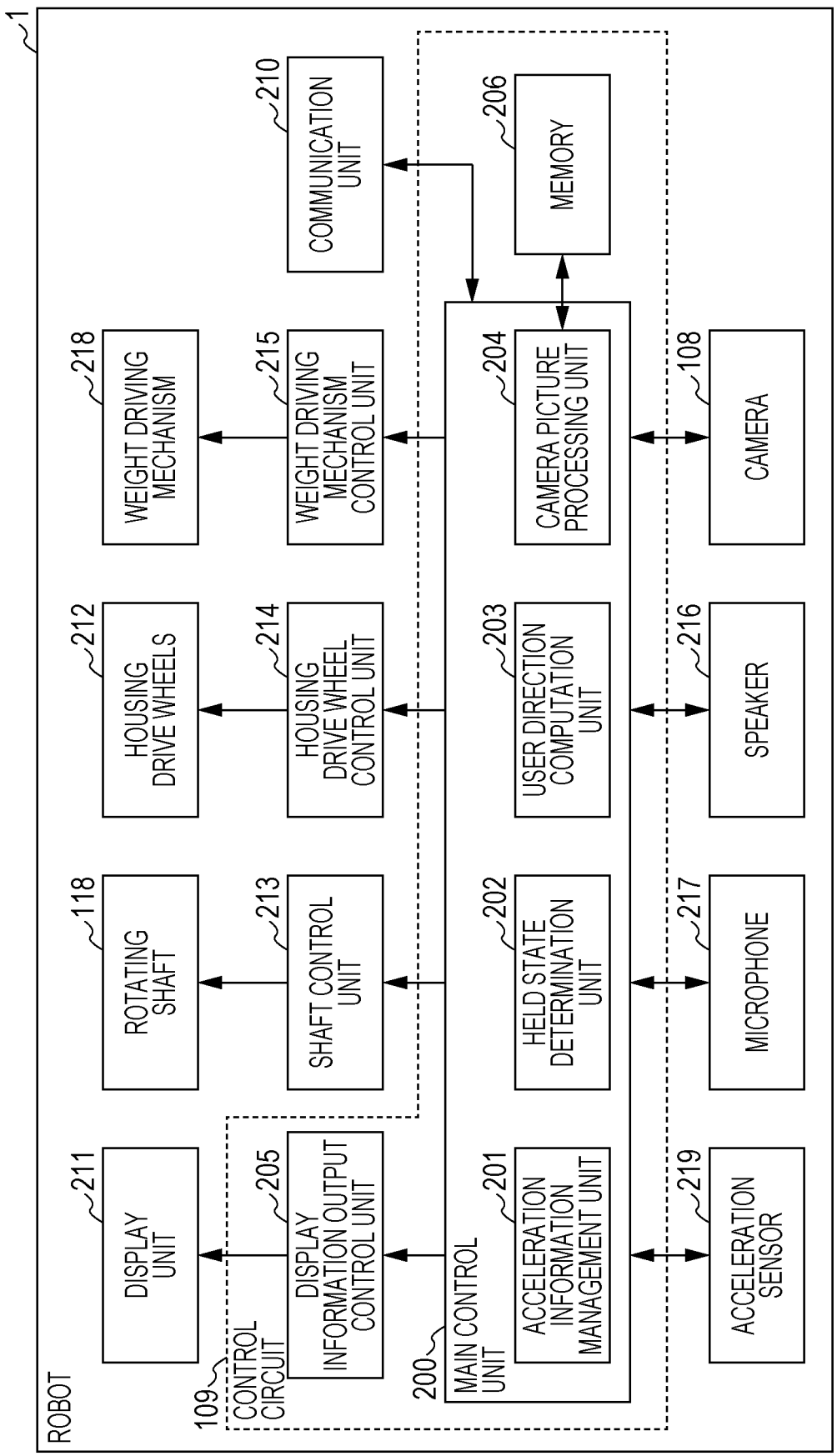
FIG. 15 is a block diagram illustrating a robot according to a first embodiment of the present disclosure.

Next, details about an internal circuit of the robot 1 according to the first embodiment of the present disclosure will be described with reference to FIG. 15. FIG. 15 is a block diagram illustrating the robot 1 according to the first embodiment of the present disclosure.

As illustrated in FIG. 15, the robot 1 is provided with a control circuit 109, a display 211, a shaft control unit 213, a rotating shaft 118, a housing drive wheel control unit 214, housing drive wheels 212, a weight driving mechanism control unit 215, a weight driving mechanism 218, an acceleration sensor 219, a microphone 217, a speaker 216, a camera 108, and a communication unit 210.

The control circuit 109 is made up of a computer that includes components such as memory 206, a main control unit 200 made up of a processor such as a CPU, a display information output control unit 205, and a timer not illustrated that measures time.

The memory 206 is made up of a non-volatile rewritable storage device, for example, and stores information such as a control program of the robot 1.

The main control unit 200 executes the control program of the robot 1 stored in the memory 206. With this arrangement, the main control unit 200 operates as an acceleration information management unit 201, a held state determination unit 202, a user direction computation unit 203, and a camera picture processing unit 204. Details about the acceleration information management unit 201, the held state determination unit 202, the user direction computation unit 203, and the camera picture processing unit 204 will be described later.

The acceleration sensor 219 is attached to the top face of the first rotating plate 103, similarly to the control circuit 109 (FIG. 2B), for example, and in accordance with a command transmitted from the main control unit 200, senses the acceleration in the three axis directions of the up-and-down axis (Z axis) direction (the direction of the arrow B in FIG. 2B), the front-and-back axis (Y axis) direction (the direction of the arrow C in FIG. 2B), and the left-and-right axis (X axis) direction (the direction of the arrow A in FIG. 2B) of the robot 1. The acceleration sensor 219 outputs values indicating the sensed acceleration in the three directions to the main control unit 200. Details about the command will be described later. The acceleration sensor 219 is not limited to the top face of the first rotating plate 103 (FIG. 2B), and may also be attached to the bottom face of the first rotating plate 103 (FIG. 2B), the top or bottom face of the second rotating plate 104 (FIG. 2B), or the like.

The microphone 217 is fitted to the frame 102, converts sound into an electrical signal, and outputs to the main control unit 200. The microphone 217 may be attached to the top face of the first rotating plate 103, or may be attached to the top face of the second rotating plate 104, for example. The main control unit 200 recognizes the presence or absence of speech by the user 1501 from the sound acquired by the microphone 217, and by accumulating speech recognition results in the memory 206, manages the speech recognition results. The main control unit 200 cross-references data for speech recognition stored in the memory 206 to acquired sound, and recognizes the content of an utterance and the user 1501 making the utterance.

The speaker 216 is fitted to the frame 102 so that the output face points towards the front face, and converts an electrical signal of sound into physical vibrations. The main control unit 200, by outputting certain sounds from the speaker 216, causes the robot 1 to speak.

As described in FIG. 2B, the camera 108 images a picture in the front direction (Y direction) of the robot 1, and outputs the image that is imaged (hereinafter, the captured image) to the main control unit 200. The main control unit 200 recognizes the presence, position, and size of a user's face from a captured image acquired from the camera 108, and by accumulating face recognition results in the memory 206, manages the face recognition results.

The main control unit 200 generates commands on the basis of the speech recognition results and face recognition results, and outputs the commands to components such as the display information output control unit 205, the shaft control unit 213, the housing drive wheel control unit 214, the weight driving mechanism control unit 215, and the communication unit 210. Details about the command will be described later.

The display information output control unit 205 displays, on the display 211, facial expression display information of the robot 1 corresponding to a command transmitted from the main control unit 200. The display 211 is made up of the first display 105, the second display 106, and the third display 107 described in FIG. 2B.

The shaft control unit 213 causes the rotating shaft 118 described in FIGS. 9A and 9B to rotate, in accordance with a command transmitted from the main control unit 200. The shaft control unit 213 is made up of the rotation motor 117 described in FIGS. 9A and 9B.

The housing drive wheel control unit 214 causes the housing drive wheels 212 of the robot 1 to operate in accordance with a command transmitted from the main control unit 200. The housing drive wheel control unit 214 is made up of the first motor 112 and the second motor 113 described in FIG. 2B. The housing drive wheels 212 are made up of the first drive wheel 110 and the second drive wheel 111 described in FIG. 2B. The housing drive wheels 212 correspond to an example of a pair of drive wheels.

The weight driving mechanism control unit 215 causes the weight driving mechanism 218 of the robot 1 to operate in accordance with a command transmitted from the main control unit 200. The weight driving mechanism control unit 215 is made up of the weight driving motor not illustrated, which is built into the counterweight 114. The weight driving mechanism 218 is made up of the guide shaft 115, the swing arm 116, the rotation motor 117, the belt 119, the motor pulley 120, and the weight driving motor not illustrated, which were described in FIGS. 3, 8A, and 8B.

The communication unit 210 is made up of a communication device for connecting the robot 1 to the cloud server 3 (FIG. 14). For the communication unit 210, a communication device for wireless LAN such as Wi-Fi (registered trademark) can be adopted, but this is merely one example. The communication unit 210 communicates with the cloud server 3 in accordance with a command transmitted from the main control unit 200.

(Emotion Expression Process)

Figure 16A:
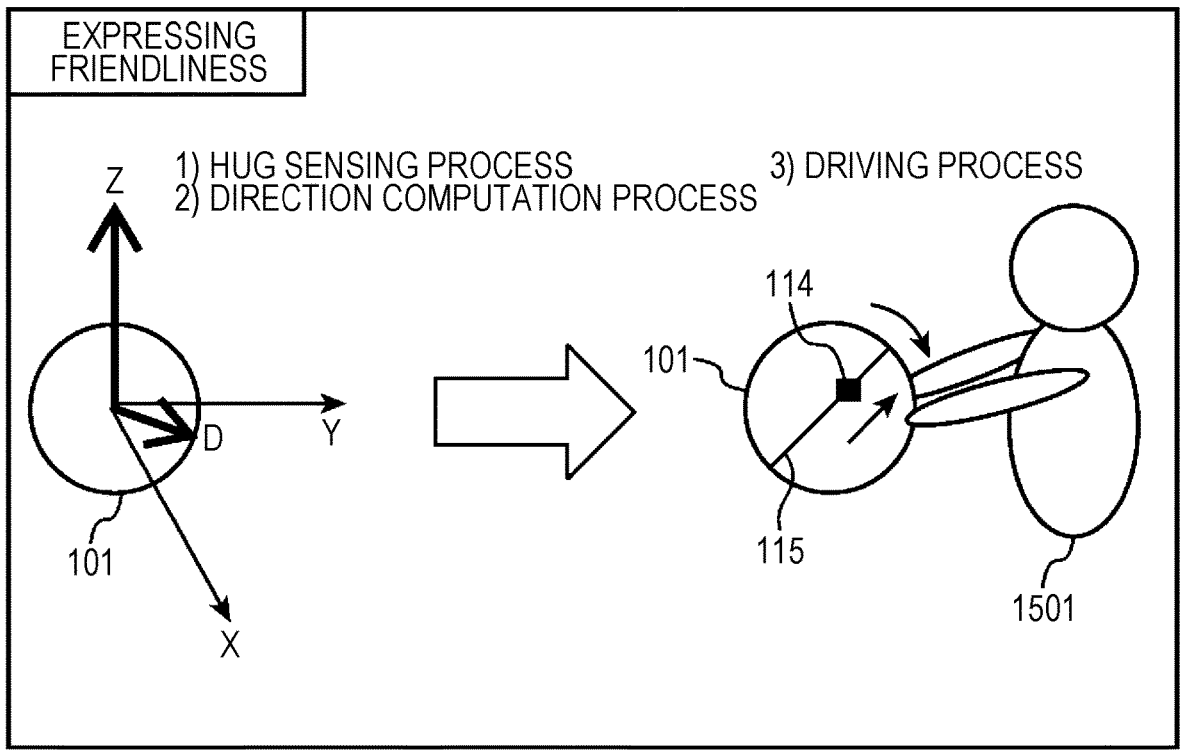
FIG. 16A is a diagram illustrating an overview when a robot is made to express a friendly emotion in an emotion expression process by a robot according to a first embodiment of the present disclosure.
Figure 16B:
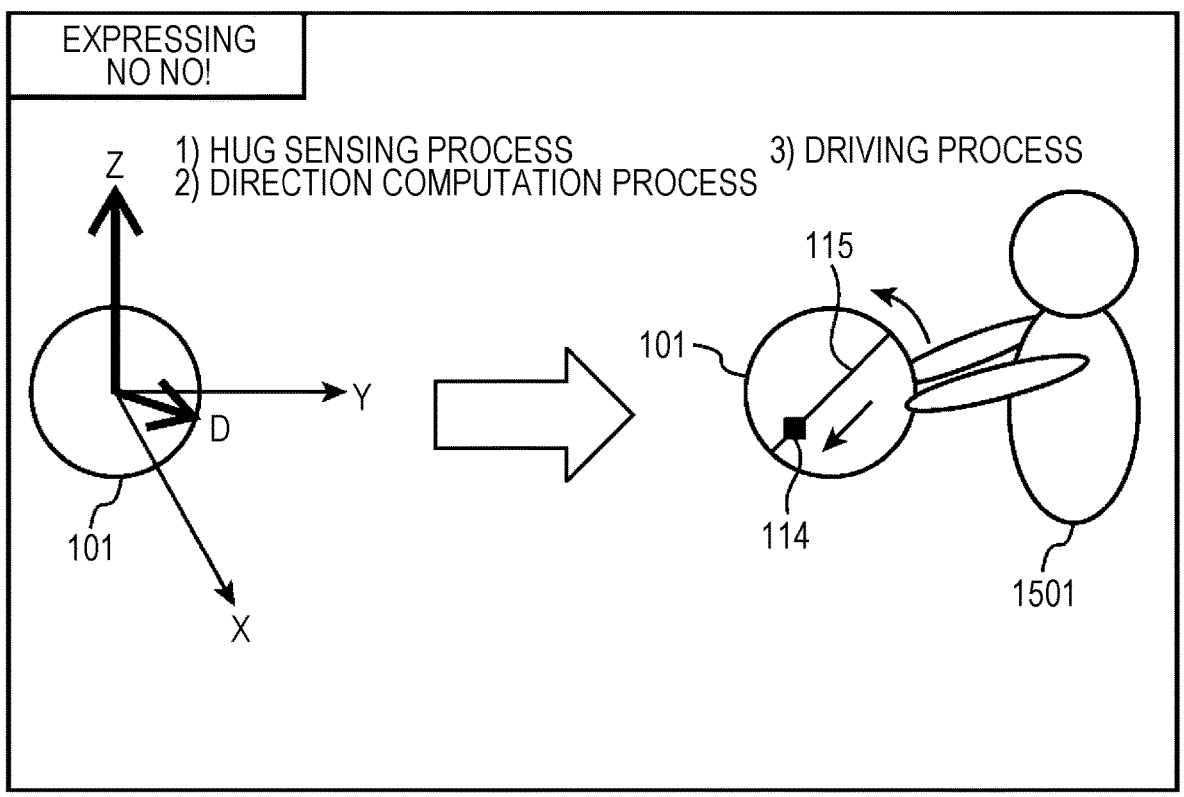
FIG. 16B is a diagram illustrating an overview when a robot is made to express an emotion of being irritated with a user in an emotion expression process by a robot according to a first embodiment of the present disclosure.

Next, an overview of an emotion expression process by the robot 1 according to the first embodiment of the present disclosure will be described using FIGS. 16A and 16B. FIG. 16A is a diagram illustrating an overview when the robot 1 is made to express a friendly emotion in an emotion expression process by the robot 1 according to the first embodiment of the present disclosure. FIG. 16B is a diagram illustrating an overview when the robot 1 is made to express an emotion of being irritated with the user 1501 in an emotion expression process by the robot 1 according to the first embodiment of the present disclosure. The emotion expression process is a process of causing the robot 1 to express an emotion in the case of determining that the robot 1 is being hugged (held) by the user 1501. As illustrated in FIGS. 16A and 16B, in the emotion expression process by the robot 1 according to the first embodiment of the present disclosure, 1) a hug sensing process, 2) a direction computation process, and 3) a driving process are conducted.

In the hug sensing process, movement in the Z axis direction in the case of the robot 1 being picked up is sensed, which triggers the sensing of the robot 1 being hugged.

In the direction computation process, the direction in which the robot 1 is pulled close to the user 1501 when the user 1501 hugs the robot 1, namely a motion direction D of the housing 101 (FIG. 2A) in a plane including the X axis and the Y axis (hereinafter, the XY axis plane), is computed.

In the driving process, after causing the guide shaft 115 (FIGS. 9A, 9B) to point in the motion direction D computed in the direction computation process, the counterweight 114 is moved along the guide shaft 115 in a direction corresponding to an emotion to be expressed by the robot 1 (FIGS. 8C, 10, 11). For example, in the case of causing the robot 1 to express an emotion indicating friendliness towards the user 1501, as illustrated in FIG. 16A, the counterweight 114 is moved along the guide shaft 115 towards the user 1501. On the other hand, in the case of causing the robot 1 to express an emotion indicating irritation with the user 1501 (No No!), as illustrated in FIG. 16B, the counterweight 114 is moved along the guide shaft 115 in the opposite direction away from the user 1501.

In this way, the emotion expression process by the robot 1 according to the first embodiment of the present disclosure is characterized by causing the robot 1 to express an emotion by moving the counterweight 114 in the same direction or the opposite direction of the direction in which the robot 1 is pulled close to the user 1501.

Figure 17:
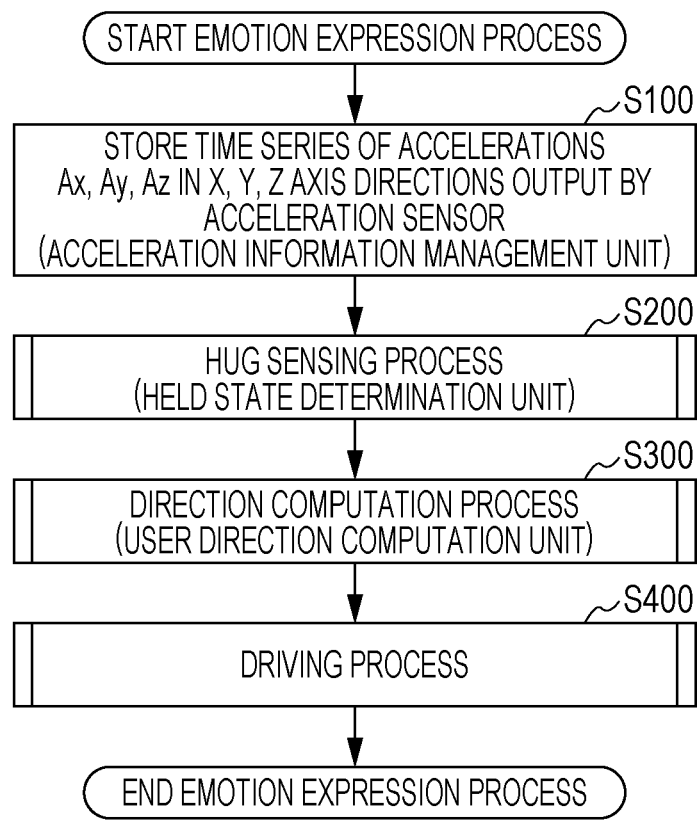
FIG. 17 is a flowchart illustrating an emotion expression process by a robot according to a first embodiment of the present disclosure.

Hereinafter, a process flow of the emotion expression process by the robot 1 according to the first embodiment of the present disclosure will be described using FIG. 17. FIG. 17 is a flowchart illustrating the emotion expression process by the robot 1 according to the first embodiment of the present disclosure.

When the robot 1 is powered on, the main control unit 200 starts the emotion expression process. As illustrated in FIG. 17, when the emotion expression process is started, the acceleration information management unit 201 starts a process of storing, in the memory 206 and in association with the time, a value Ax indicating the acceleration in the X axis direction, a value Ay indicating the acceleration in the Y axis direction, and a value Az indicating the acceleration in the Z axis direction output by the acceleration sensor 219 (hereinafter, the acceleration storage process) (S100).

From S100 onward, the acceleration information management unit 201 continues the acceleration storage process until power to the robot 1 is cut off. Note that the acceleration information management unit 201 may also remove the values Ax, Ay, and Az indicating the acceleration in three directions corresponding to a certain period in the past stored in the memory 206 at a certain timing, such as at power off or periodically. Additionally, in the case in which the cycle at which the acceleration sensor 219 outputs the acceleration in three directions (sampling cycle) is short, values obtained by averaging the output values from the acceleration sensor 219 for each axis over multiple sampling cycles may be stored in the memory 206 and in association with the time as the values indicating the acceleration in three directions. Hereinafter, the value Ax indicating the acceleration in the X axis direction will be abbreviated to the acceleration Ax, the value Ay indicating the acceleration in the Y axis direction will be abbreviated to the acceleration Ay, and the value Az indicating the acceleration in the Z axis direction will be abbreviated to the acceleration Az.

Next, the held state determination unit 202 conducts the hug sensing process (FIGS. 16A, 16B) (S200). Details about the hug sensing process will be described later. Next, the user direction computation unit 203 conducts the direction computation process (FIGS. 16A, 16B) (S300). Details about the direction computation process will be described later. Next, the main control unit 200 conducts the driving process (FIGS. 16A, 16B) (S400), and ends the emotion expression process. Details about the driving process will be described later.

Figure 18:
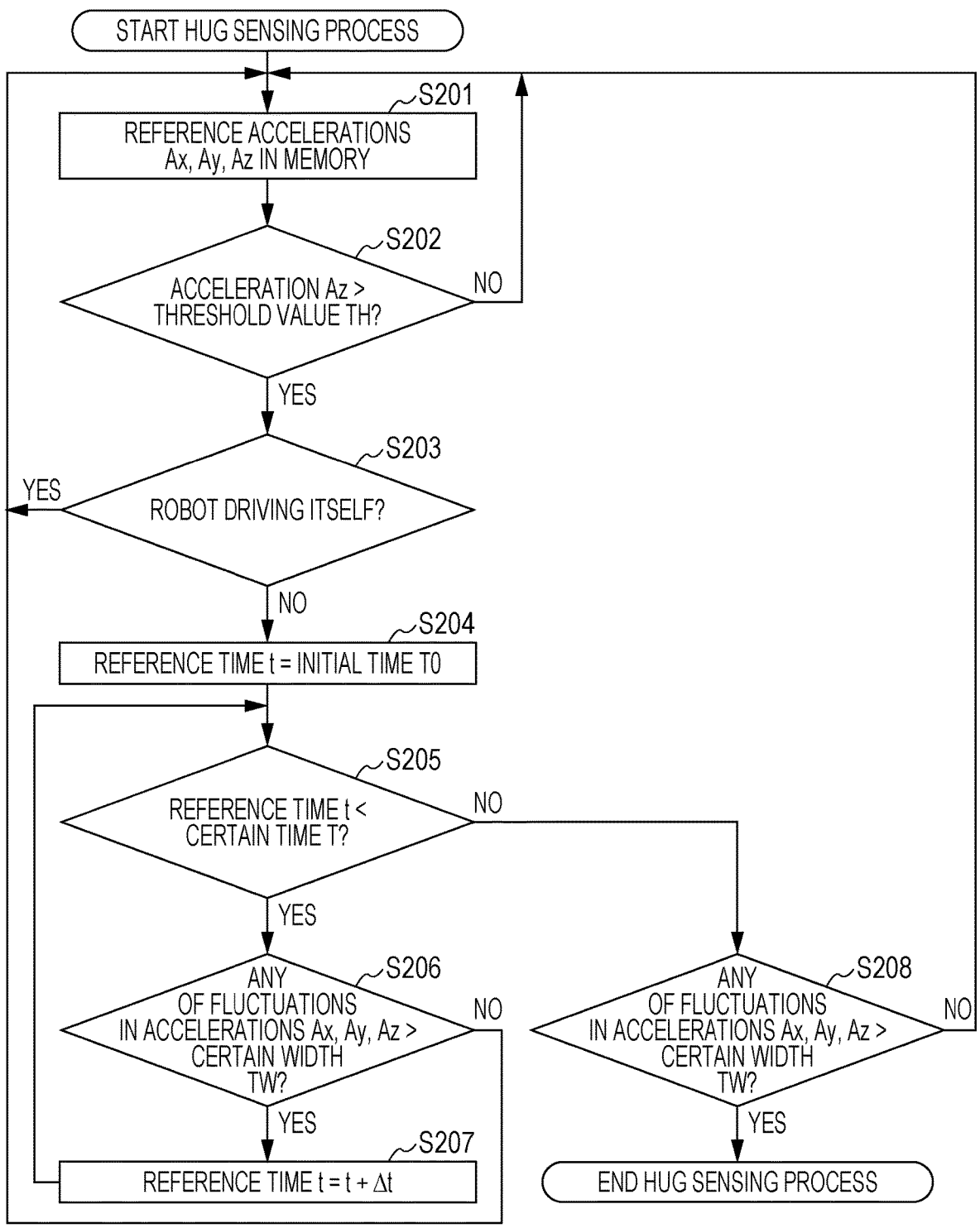
FIG. 18 is a flowchart illustrating details of the hug sensing process illustrated in S200 of FIG. 17 according to a first embodiment of the present disclosure.

Hereinafter, details about the hug sensing process illustrated in S200 of FIG. 17 will be described. FIG. 18 is a flowchart illustrating details of the hug sensing process illustrated in S200 of FIG. 17 according to the first embodiment of the present disclosure.

As illustrated in FIG. 18, when the hug sensing process is started, the held state determination unit 202 references the accelerations Ax, Ay, and Az corresponding to the most recent time stored in the memory 206 (S201). Next, the held state determination unit 202 determines whether or not the referenced acceleration Az exceeds a certain threshold value TH (FIG. 1A) (S202). With this arrangement, the held state determination unit 202 senses whether or not the robot 1 has moved in the Z axis direction.

In the case of determining that the referenced acceleration Az exceeds the threshold value TH (FIG. 1A) (S202, YES), the held state determination unit 202 senses that the robot 1 has moved in the Z axis direction, and conducts S203. On the other hand, in the case of determining that the referenced acceleration Az exceeds the threshold value TH (FIG. 1A) (S202, NO), the held state determination unit 202 senses that the robot 1 has not moved in the Z axis direction. In this case, the held state determination unit 202 returns the process to S201, and conducts the process in S201 and thereafter.

In S203, the held state determination unit 202 determines whether or not the robot 1 is driving itself (S203). For example, the held state determination unit 202 determines that the robot 1 is driving itself in the case in which the main control unit 200 is outputting to the housing drive wheel control unit 214 (FIG. 15) a command for causing the housing drive wheel 212 (FIG. 15) to operate (an example of a driving instruction). On the other hand, the held state determination unit 202 that the robot 1 is not in a state of driving itself in the case in which the command is not being output to the housing drive wheel control unit 214 (FIG. 15). With this arrangement, the held state determination unit 202 distinguishes whether the robot 1 has moved in the Z axis direction by causing the housing drive wheel 212 to operate to start ascending a slope by itself, or the robot 1 has moved in the Z axis direction by being picked up by the user 1501.

In S203, in the case of determining that the robot 1 is driving itself (S203, YES), the held state determination unit 202 senses that the robot 1 is not being picked up by the user 1501. In this case, the robot 1 is not considered to be picked up by the user 1501, and thus the held state determination unit 202 returns the process to S201, and conducts the process in S201 and thereafter. On the other hand, in S203, in the case of determining that the robot 1 is not in a state of driving itself (S203, NO), the held state determination unit 202 senses that the robot 1 is being picked up by the user 1501. In this case, there is a possibility that the robot 1 is being hugged by the user 1501, and thus the held state determination unit 202 conducts the process in S204 and thereafter.

In the process in S204 and thereafter, the held state determination unit 202 determines whether or not, after the acceleration Az exceeded the threshold value TH (FIG. 1A), any of the accelerations Ax, Ay, and Az stored in the memory 206 exhibited variation exceeding a certain width TW (FIGS. 1A to 1C) for a fixed period (hereinafter, the fixed period Td). Subsequently, on the basis of the determination result, the held state determination unit 202 senses whether or not the robot 1 is being hugged (held) by the user 1501.

Specifically, in S204, the held state determination unit 202 sets a reference time t to an initial time T0 (S204). At this point, the reference time t is a parameter indicating a time corresponding to target accelerations Ax, Ay, and Az to be referenced by the held state determination unit 202 from among the accelerations Ax, Ay, and Az stored in the memory 206. The initial time T0 is the time at which the acceleration Az is determined to exceed the threshold value TH (FIG. 1A) in S202.

Subsequently, the held state determination unit 202 determines whether or not the reference time t exceeds a certain time T (S205). Herein, the certain time T is the time at which the fixed period Td has elapsed since the initial time T0 (T=T0+Td).

If the held state determination unit 202 determines that the reference time t does not exceed the certain time T (S205, YES), the held state determination unit 202 determines whether or not any of the fluctuations (variations) in the accelerations Ax, Ay, and Az corresponding to a time from the initial time T0 to the reference time t stored in the memory 206 exceeds the certain width TW (S206). At this point, the fluctuations in the accelerations Ax, Ay, and Az corresponding to a time from the initial time T0 to the reference time t is the standard deviation of the accelerations Ax, Ay, and Az corresponding to a time from the initial time T0 to the reference time t, for example. Note that the fluctuation is not limited to the standard deviation, and may also be the variance or the peak value (maximum value or minimum value) of the accelerations Ax, Ay, Az corresponding to a time from the initial time T0 to the reference time t.

Suppose that the held state determination unit 202 determines that any of the fluctuations in the accelerations Ax, Ay, and Az corresponding to a time from the initial time T0 to the reference time t in S206 exceeds the certain width TW (S206, YES). In this case, the held state determination unit 202 sets the reference time t to the time at which the cycle of outputting the accelerations Ax, Ay, and Az by the acceleration sensor 219 (sampling interval) $\Delta t$ has elapsed ($t=t+\Delta t$) (S207), returns the process to S205, and conducts the process in S205 and thereafter.

On the other hand, suppose that the held state determination unit 202 determines that none of the fluctuations in the accelerations Ax, Ay, and Az corresponding to a time from the initial time T0 to the reference time t in S206 exceeds the certain width TW (S206, NO). In this case, the held state determination unit 202 determines that the fluctuations in all of the accelerations Ax, Ay, Az has converged to within the certain width TH within the fixed period Td from the initial time T0 at which the acceleration Az exceeds the threshold value TH (FIG. 1A) until the certain time T elapses. In this case, the held state determination unit 202 determines that after the robot 1 was picked up from the floor, the robot 1 was placed in a certain place, such as on a chair, for example, and senses that the robot 1 is not being hugged by the user 1501. Subsequently, the held state determination unit 202 returns the process to S201, and conducts the process in S201 and thereafter.

After that, if the held state determination unit 202 determines that the reference time t exceeds the certain time T (S205, NO), similarly to S206, the held state determination unit 202 determines whether or not any of the fluctuations in the accelerations Ax, Ay, and Az corresponding to a time from the initial time T0 to the reference time t stored in the memory 206 exceeds the certain width TW (S208).

Suppose that, in S208, the held state determination unit 202 determines that any of the fluctuations in the accelerations Ax, Ay, and Az exceeds the certain width TW (S208, YES). In this case, the held state determination unit 202 determines that any of the accelerations Ax, Ay, and Az has exceeded the certain width TW in the fixed period Td from the initial time T0 at which the acceleration Az exceeds the threshold value TH (FIG. 1A) until the certain time T elapses. In this case, the held state determination unit 202 determines that the robot 1 is being hugged (held) by the user 1501, and senses that the robot 1 is being hugged by the user 1501. Subsequently, the held state determination unit 202 ends the hug sensing process.

On the other hand, suppose that, in S208, the held state determination unit 202 determines that none of the fluctuations in the accelerations Ax, Ay, and Az exceeds the certain width TW (S208, NO). In this case, the held state determination unit 202 determines that any of the accelerations Ax, Ay, and Az has converged to within the certain width TW within the fixed period Td from the initial time T0 at which the acceleration Az exceeds the threshold value TH (FIG. 1A) until the certain time T elapses. In this case, the held state determination unit 202 determines that after the robot 1 was picked up from the floor, the robot 1 was placed in a certain place, such as on a chair, for example, and senses that the robot 1 is not being hugged by the user 1501. Subsequently, the held state determination unit 202 returns the process to S201, and conducts the process in S201.

Note that in the process of S204 and thereafter, in the case in which the fluctuation in any of the accelerations Ax, Ay, and Az stored in the memory 206 already exceeds the certain width TW before the acceleration Az exceeds the threshold value TH (FIG. 1A), the held state determination unit 202 may also go back to a time at which the fluctuation does not exceed the certain width TW, and confirm whether or not the certain width TW is exceeded in the fixed period Td from that time. In other words, the initial time T0 may also be a time that is a certain amount of time before the time the acceleration Az is determined to exceed the threshold value TH in S202. In this case, in the process in S204 and thereafter, in the case in which any of the fluctuations in the accelerations Ax, Ay, and Az exceeds the certain width TW in the fixed period Td from the initial time T0 that is a certain amount of time before the time at which the acceleration Az exceeds the threshold value TH, the held state determination unit 202 senses that the robot 1 is being hugged. In so doing, the held state determination unit 202 may be made to sense that the robot 1 is being hugged, even in a case in which the user 1501 hugs the robot 1 by picking up the robot 1 after first pulling close the robot 1.

Figure 19:
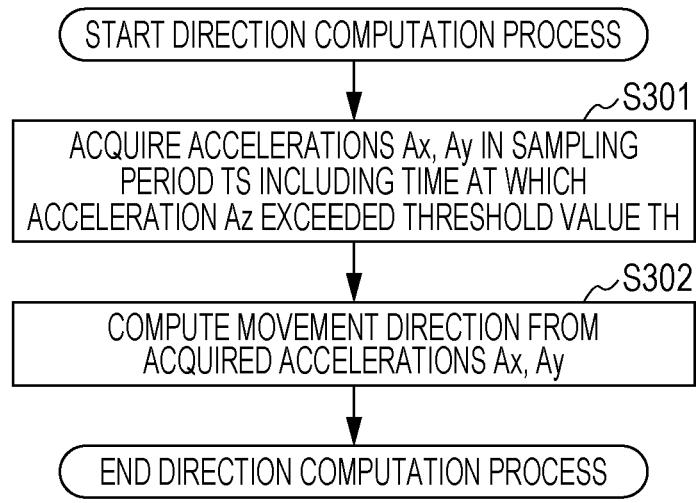
FIG. 19 is a flowchart illustrating details of the direction computation process illustrated in S300 of FIG. 17 according to a first embodiment of the present disclosure.

Next, details about the direction computation process illustrated in S300 of FIG. 17 will be described. FIG. 19 is a flowchart illustrating details of the direction computation process illustrated in S300 of FIG. 17 according to the first embodiment of the present disclosure.

As illustrated in FIG. 19, when the direction computation process is started, the user direction computation unit 203 acquires, from the memory 206, the accelerations Ax and Ay corresponding to a certain sampling period TS that includes the time at which the acceleration Az is determined to exceed the threshold value TH in S202 (FIG. 18) (hereinafter, the pickup determination time) (S301). Subsequently, on the basis of the accelerations Ax and Ay acquired in S301, the user direction computation unit 203 computes a movement direction D of the housing 101 on the XY axis plane (S302), and ends the direction computation process.

Herein, the sampling period TS is decided to be the period from a time a certain period before the pickup determination time until the time at which the fixed period Td has elapsed, for example. In this case, in S302, on the basis of the accelerations Ax and Ay corresponding to the certain sampling period TS before and after the pickup determination time acquired in S301, the user direction computation unit 203 computes the direction in which the housing 101 has moved in the XY axis plane during the certain sampling period TS before and after the pickup determination time. With this arrangement, even in either the case in which the user 1501 picks up the robot 1 first and then pulls close and hugs the robot 1, or the case in which the user 1501 first pulls close the robot 1 and then picks up and hugs the robot 1, the direction in which the housing 101 moves in the XY axis plane as a result of the robot 1 being pulled close by the user 1501 can be computed.

Note that the sampling period TS is not limited to the above, and may also be decided to be a period from the pickup determination time until the time at which the fixed period Td has elapsed. Additionally, the sampling period TS may also be decided to be a period from a time a certain period before the pickup determination time or from the pickup determination time, until a time at which a fixed period different from the fixed period Td has elapsed.

Figure 20:
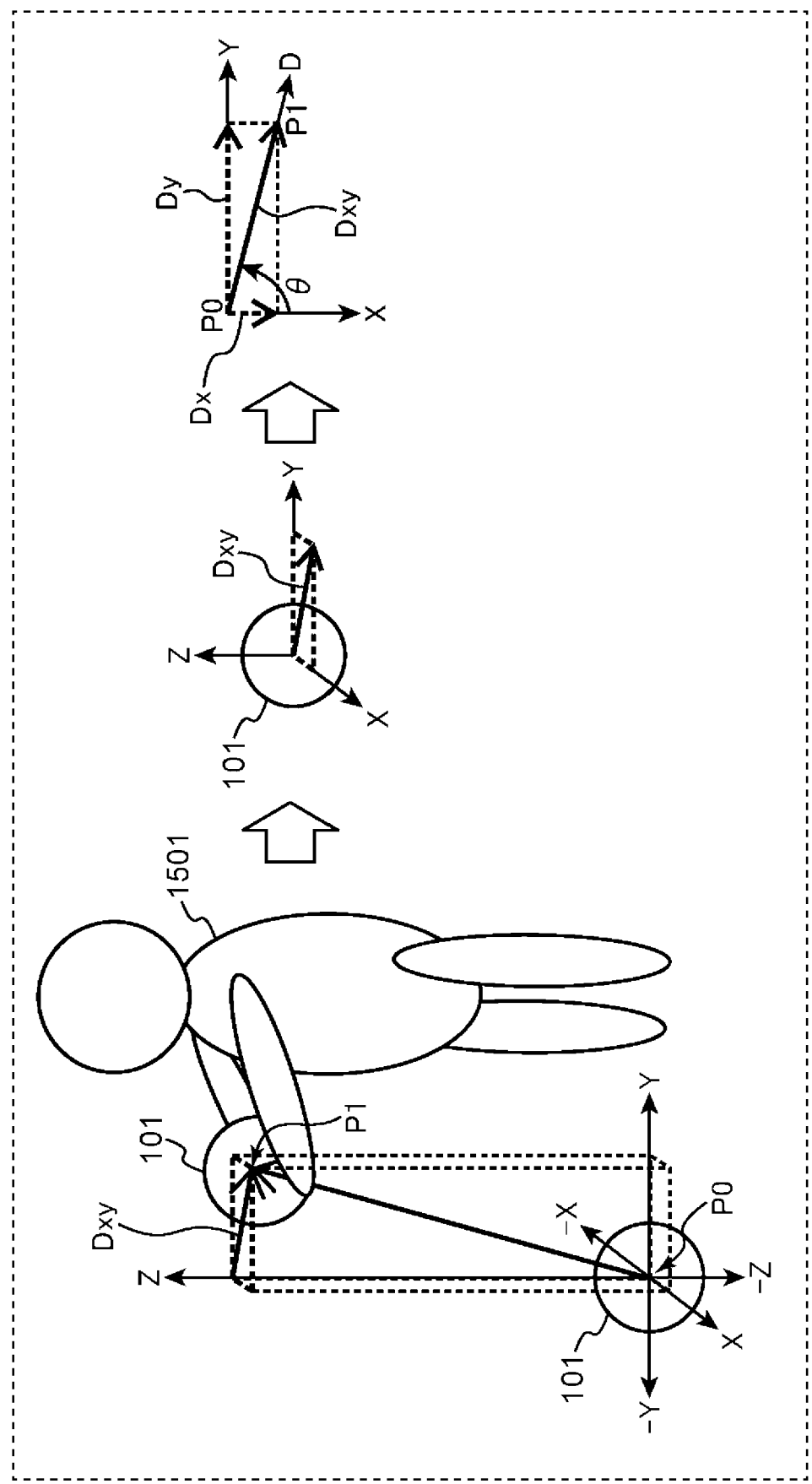
FIG. 20 is a diagram illustrating an example of the housing movement direction computation process in S302 of FIG. 19.

FIG. 20 is a diagram illustrating an example of the process of computing the movement direction D of the housing 101 in S302 of FIG. 19. As illustrated by the left drawing and the center drawing in FIG. 20, in S302, the user direction computation unit 203 computes a vector Dxy expressing the distance and direction by which the housing 101 has moved in the XY axis plane as a result of the housing 101 moving from the position P0 at the start of the sampling period TS to the position P1 at the end of the sampling period TS.

Specifically, the user direction computation unit 203 computes the absolute value of the result of double integration of the acceleration Ax acquired in S301 as the movement distance by which the housing 101 has moved in the X axis direction from the position P0 to the position P1. Also, in the case in which the result of the double integration is a plus (+, positive) value, the user direction computation unit 203 determines that the direction in which the housing 101 has moved in the X axis direction is the X direction (left direction), whereas in the case in which the result of the double integration is a minus (−, negative) value, the user direction computation unit 203 determines that the direction in which the housing 101 has moved in the X axis direction is the −X direction (right direction). With this arrangement, as illustrated in the right drawing in FIG. 20, the user direction computation unit 203 computes a vector Dx expressing the movement distance and direction by which the housing 101 has moved in the X axis direction from the position P0 to the position P1.

Similarly, the user direction computation unit 203 computes the absolute value of the result of double integration of the acceleration Ay acquired in S301 as the movement distance by which the housing 101 has moved in the Y axis direction from the position P0 to the position P1. Also, in the case in which the result of the double integration is a plus (+, positive) value, the user direction computation unit 203 determines that the direction in which the housing 101 has moved in the Y axis direction is the Y direction (front direction), whereas in the case in which the result of the double integration is a minus (−, negative) value, the user direction computation unit 203 determines that the direction in which the housing 101 has moved in the Y axis direction is the −Y direction (back direction). With this arrangement, as illustrated in the right drawing in FIG. 20, the user direction computation unit 203 computes a vector Dy expressing the movement distance and direction by which the housing 101 has moved in the Y axis direction from the position P0 to the position P1.

Next, the user direction computation unit 203 computes a vector obtained by combining the computed vectors Dx and Dy as a vector Dxy expressing the distance and direction by which the housing 101 has moved in the XY axis plane.

Subsequently, the user direction computation unit 203 computes an angle "θ" obtained between the X direction and the vector Dxy in the counter-clockwise direction with reference to the X direction. With this arrangement, the user direction computation unit 203 computes the direction of rotation by the computed angle "θ" in the counter-clockwise direction from the X direction as the movement direction D of the housing 101 in the XY axis plane. Hereinafter, the angle "θ" computed above will be designated the angle θ expressing the movement direction D.

Figure 21:
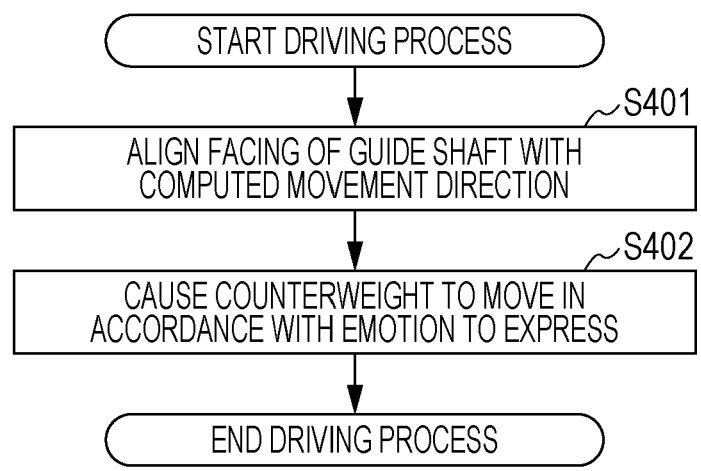
FIG. 21 is a flowchart illustrating details of the driving process illustrated in S400 of FIG. 17 according to a first embodiment of the present disclosure.

Next, details about the driving process illustrated in S400 of FIG. 17 will be described. FIG. 21 is a flowchart illustrating details of the driving process illustrated in S400 of FIG. 17 according to the first embodiment of the present disclosure.

As illustrated in FIG. 21, when the driving process is started, the main control unit 200 aligns the facing of the guide shaft 115 (FIGS. 9A, 9B) with the movement direction D computed in S302 (FIG. 19) (S401).

Figure 22:
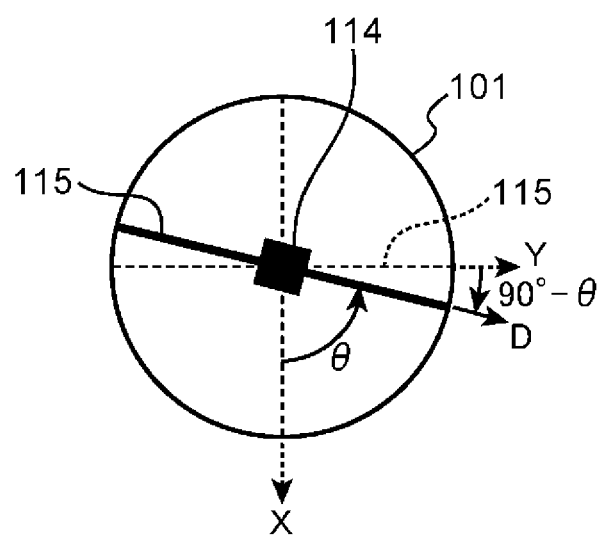
FIG. 22 is a diagram illustrating an example of the process of aligning the facing of a guide shaft with the housing movement direction in S401 of FIG. 21.

FIG. 22 is a diagram illustrating an example of the process of aligning the facing of the guide shaft 115 with the movement direction D of the housing 101 in S401 of FIG. 21. In S401, the main control unit 200 determines that a direction obtained by rotating counter-clockwise from the X direction by the angle θ expressing the movement direction D is the movement direction D of the housing 101, as illustrated in FIG. 22, for example. In addition, the main control unit 200 determines that the Y direction, which is the default direction of the guide shaft 115 indicated by the dashed line in FIG. 22, is the direction obtained by rotating 90 degrees counter-clockwise from the X direction. Subsequently, in the case in which the angle indicating the offset between the Y direction and the movement direction D, that is, the result of subtracting the angle θ expressing the movement direction D from 90 degrees (=90°−θ) is a plus value, the main control unit 200 outputs to the shaft control unit 213 (FIG. 15) a command causing the rotating shaft 118 (FIG. 9B) to rotate clockwise by an angle indicating the absolute value of that result. Note that the shaft control unit 213 (FIG. 15) acquires the rotation rate of the rotation motor 117 (FIGS. 9A, 9B) from an encoder not illustrated provided internally, and causes the rotation motor 117 (FIGS. 9A, 9B) to rotate in the direction indicated by the command until the acquired rotation rate reaches a rotation rate corresponding to the angle indicated by the command. With this arrangement, the facing of the guide shaft 115 indicated by the dashed line facing in the default direction, that is, the Y direction, becomes aligned with the movement direction D. On the other hand, in the case in which the angle indicating the offset (=90°−θ) is a minus value, the main control unit 200 outputs to the shaft control unit 213 (FIG. 15) a command causing the rotating shaft 118 (FIG. 9B) to rotate counter-clockwise even farther, by the amount of an angle indicating the absolute value of the angle indicating the offset (=|90°−θ|). Note that in S401, the method by which the main control unit 200 causes the facing of the guide shaft 115 (FIGS. 9A, 9B) to become aligned with the movement direction D computed in S302 (FIG. 19) is not limited to the above.

Next, the main control unit 200 causes the counterweight 114 to move along the guide shaft 115 in a direction corresponding to an emotion to be expressed by the robot 1 (FIGS. 8A to 8C, 10, 11) (S402).

For example, suppose that while the robot 1 is operating in accordance with an instruction from the user 1501, the same user 1501 as the user 1501 who issued the instruction for the operation hugs the robot 1. In such a case, the main control unit 200 causes the robot 1 to express an emotion indicating friendliness towards the user 1501. Note that it is sufficient for the main control unit 200 to determine whether or not the user 1501 who hugs the robot 1 is the same as the user 1501 who issued the instruction for the operation, on the basis of a speech recognition result or a face recognition result. Conversely, suppose that while the robot 1 is operating in accordance with an instruction from the user 1501, a different user 1501 from the user 1501 who issued the instruction for the operation hugs the robot 1. In such a case, the main control unit 200 causes the robot 1 to express an emotion indicating irritation with the user 1501. Note that the method by which the main control unit 200 decides the emotion to be expressed by the robot 1 is not limited to the above, and the emotion to be expressed by the robot 1 may also be decided by a different method.

Figure 23A:
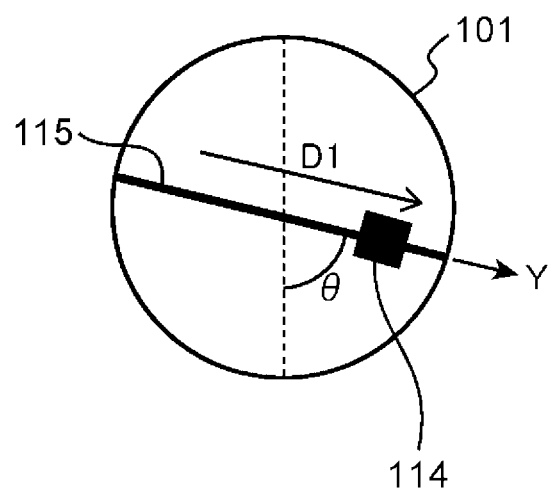
FIG. 23A is a diagram illustrating an example of the counterweight movement process in S402 of FIG. 21.
Figure 23B:
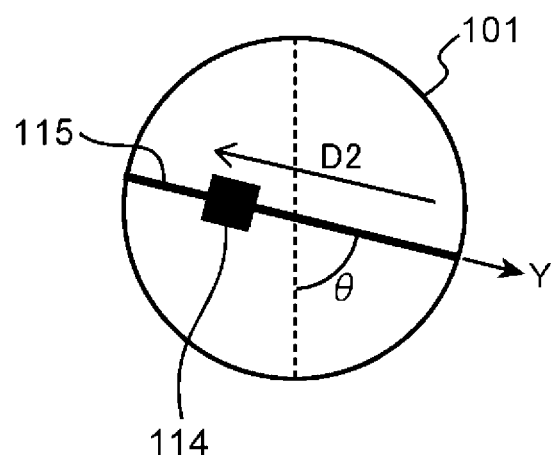
FIG. 23B is a diagram illustrating an example of the counterweight movement process in S402 of FIG. 21.

FIGS. 23A and 23B are diagram illustrating an example of the counterweight 114 movement process in S402 of FIG. 21. For example, in the case of causing the robot 1 to express an emotion indicating friendliness towards the user 1501, the main control unit 200 outputs to the weight driving mechanism control unit 215 (FIG. 15) a command causing the counterweight 114 to move along the guide shaft 115 in the Y direction (front direction) indicated by the arrow D1, as illustrated in FIG. 23A. In response to the command, the weight driving mechanism control unit 215 causes the motor pulley 120 (FIGS. 8A, 8B) to rotate, thereby causing the counterweight 114 to move along the guide shaft 115 in the Y direction (front direction, to the left in FIG. 8C). With this arrangement, the counterweight 114 moves along the guide shaft 115 facing in the same direction as the movement direction D, in the direction in which the robot 1 has been pulled close by the user 1501. In other words, the counterweight 114 moves in a direction going towards the user 1501. As a result, the center of gravity of the robot 1 is shifted towards the user 1501. With this arrangement, the user 1501 can be made to feel the robot 1 coming close to the user 1501 in the arms of the user 1501. In so doing, the main control unit 200 can cause the robot 1 to express friendliness towards the user 1501.

Conversely, in S401, suppose that the main control unit 200 causes the robot 1 to express an emotion indicating irritation with the user 1501 ("No No!"). In this case, the main control unit 200 outputs to the weight driving mechanism control unit 215 (FIG. 15) a command causing the counterweight 114 to move along the guide shaft 115 in the −Y direction (back direction, to the right in FIG. 8C) indicated by the arrow D2 pointing in the opposite direction of the arrow D1, as illustrated in FIG. 23B. In response to the command, the weight driving mechanism control unit 215 causes the motor pulley 120 (FIGS. 8A, 8B) to rotate, thereby causing the counterweight 114 to move along the guide shaft 115 in the −Y direction (back direction, to the right in FIG. 8C). With this arrangement, the counterweight 114 moves along the guide shaft 115 facing in the same direction as the movement direction D, in the opposite direction of the direction in which the robot 1 has been pulled close by the user 1501. In other words, the counterweight 114 moves in a direction going away from the user 1501. As a result, the center of gravity of the robot 1 is shifted away from the user 1501. With this arrangement, the user 1501 can be made to feel the robot 1 trying to pull away from the user 1501 in the arms of the user 1501. In so doing, the main control unit 200 can cause the robot 1 to express irritation with the user 1501.

Note that in the case of anticipating a child as the user 1501, the weight of the counterweight 114 cannot be made too heavy in some cases. Accordingly, in S401, in the case of causing the robot 1 to express an emotion indicating friendliness towards the user 1501, the main control unit 200 may first cause the counterweight 114 to move along the guide shaft 115 in the direction indicated by the arrow D2, and then cause the counterweight 114 to move in the direction indicated by the arrow D1. In this case, even in the case in which the weight of the counterweight 114 cannot be made too heavy, the center of gravity of the robot 1 vigorously shifts towards the user 1501, and the user 1501 can be made to feel the robot 1 coming closer to the user 1501 in the arms of the user 1501.

Similarly, in the case of causing the robot 1 to express an emotion indicating irritation with the user 1501 ("No No!"), the main control unit 200 may first cause the counterweight 114 to move along the guide shaft 115 in the direction indicated by the arrow D1, and then cause the counterweight 114 to move in the direction indicated by the arrow D2. In this case, even in the case in which the weight of the counterweight 114 cannot be made too heavy, the center of gravity of the robot 1 vigorously shifts away from the user 1501, and the user 1501 can be made to feel the robot 1 attempting to pull away from the user 1501 in the arms of the user 1501.

Also, in S401, the main control unit 200 may output to the weight driving mechanism control unit 215 (FIG. 15) a command that sets the rotation speed of the motor pulley 120 (FIGS. 8A, 8B) to a faster-than-normal speed, thereby causing the counterweight 114 to move at a faster-than-normal speed. In this case, even in the case in which the weight of the counterweight 114 cannot be made too heavy, the force of movement of the center of gravity of the robot 1 is strengthened, and the user 1501 can be made to feel more strongly the emotion of the robot 1 with respect to the user 1501.

Second Embodiment

The second embodiment is characterized by causing the 1. Embodiments to express an emotion by driving the first drive wheel 110 and the second drive wheel 111. The overall process of an emotion expression process according to the second embodiment is the same as an emotion expression process according to the first embodiment, but the details of the driving process illustrated in S400 of FIG. 17 are different. Note that in the second embodiment, components which are the same as the first embodiment are denoted with the same signs, and description thereof will be omitted.

Figure 24:
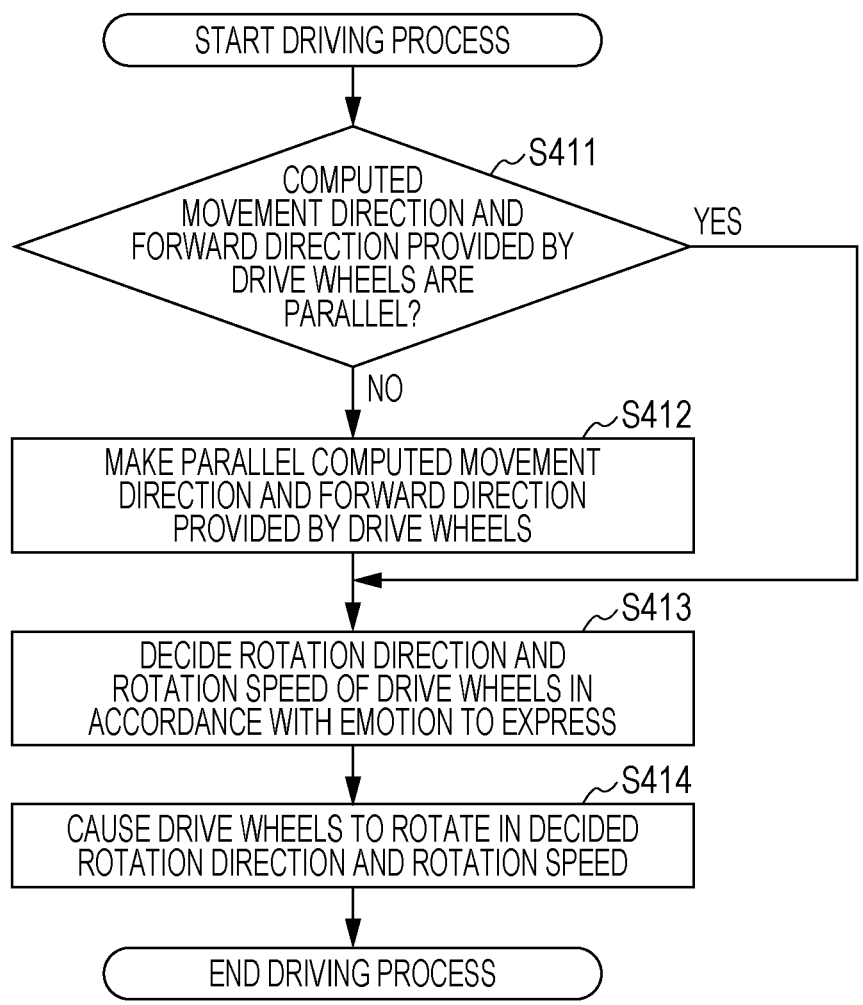
FIG. 24 is a flowchart illustrating details of the driving process illustrated in S400 of FIG. 17 according to a second embodiment of the present disclosure.

FIG. 24 is a flowchart illustrating details of the driving process illustrated in S400 of FIG. 17 according to the second embodiment of the present disclosure. As illustrated in FIG. 24, when the driving process is started, by conducting S411 and S412, the main control unit 200 aligns the forward direction of the housing 101 provided by the first drive wheel 110 and the second drive wheel 111 with the movement direction D computed in S302 (FIG. 19). Next, by conducting S413 and S414, the main control unit 200 causes the housing 101 to move in the movement direction D or in the opposite direction, in accordance with an emotion to be expressed by the robot 1.

Described more specifically, in S411, the main control unit 200 determines whether or not the movement direction D computed in S302 (FIG. 19) and the forward direction of the housing 101 provided by the first drive wheel 110 and the second drive wheel 111 are parallel (S411). Specifically, as described above, the forward direction of the housing 101 provided by the first drive wheel 110 and the second drive wheel 111 is the Y direction. Consequently, in S411, similarly to S401 (FIG. 21), it is sufficient for the main control unit 200 to compute the angle indicating the offset between the Y direction and the movement direction D (=90°−θ) (FIG. 22), and in the case in which the angle indicating the offset (=90°−θ) (FIG. 22) is 0 degrees or −180 degrees, determine that the movement direction D and the forward direction of the housing 101 (Y direction) are parallel.

Note that in S411, the main control unit 200 may determine whether or not the movement direction D and the forward direction of the housing 101 (Y direction) are parallel, while also accounting for error. In other words, if the angle indicating the offset between the Y direction and the movement direction D (=90°−θ) is within the range of an angle α (for example, α=10°) indicating a certain error with reference to 0 degrees or −180 degrees (if 0°−α≤90°−θ≤0°+α or if −180°−α≤90°−θ≤−180°+α), the movement direction D and the forward direction of the housing 101 may be determined to be parallel.

In S411, in the case of determining that the movement direction D computed in S302 (FIG. 19) and the forward direction of the housing 101 provided by the first drive wheel 110 and the second drive wheel 111 are parallel (S411, YES), the main control unit 200 conducts S413.

On the other hand, in the case of determining that the movement direction computed in S302 (FIG. 19) and the forward direction of the housing 101 provided by the first drive wheel 110 and the second drive wheel 111 are not parallel (S411, NO), the main control unit 200 makes the movement direction computed in S302 (FIG. 19) and the forward direction of the housing 101 provided by the first drive wheel 110 and the second drive wheel 111 parallel to each other (S412), and then conducts S413.

S412 may be realized as follows, for example. First, the rotation rate and rotation direction of the first drive wheel 110 and the rotation rate and rotation direction of the second drive wheel 111 necessary to rotate the housing 101 in a certain direction by a certain angle may be determined in advance on the basis of experimental values or the like, and stored in the memory 206.

Figure 25:
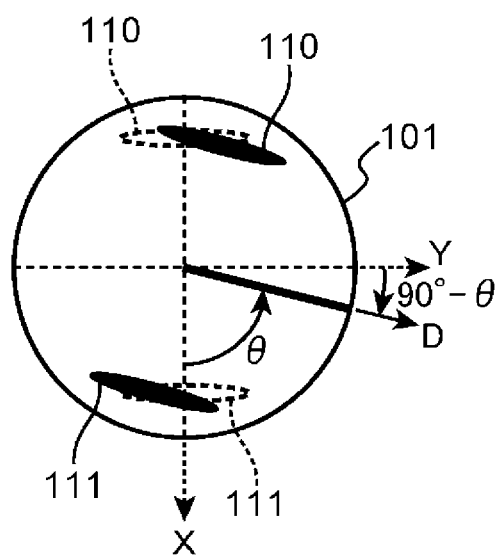
FIG. 25 is a diagram illustrating an example of a process of making the forward direction of a housing parallel to the movement direction with drive wheels in S412 of FIG. 24.

FIG. 25 is a diagram illustrating an example of a process for making the forward direction of the housing 101 provided by the first drive wheel 110 and the second drive wheel 111 parallel to the movement direction D in S412 of FIG. 24. Additionally, in the case in which the angle (=90°−θ) indicating the offset between the Y direction (dashed line) and the movement direction D computed in S411 is a plus value, as illustrated in FIG. 25, for example, it is sufficient for the main control unit 200 to acquire from the memory 206 a rotation rate and a rotation direction for each of the first drive wheel 110 and the second drive wheel 111 necessary to rotate the housing 101 clockwise by an amount equal to the angle (=90°−θ) indicating the offset. Subsequently, it is sufficient for the main control unit 200 to output to the housing drive wheel control unit 214 (FIG. 15) a command that specifies the acquired rotation rate and rotation direction of the first drive wheel 110 and the acquired rotation rate and rotation direction of the second drive wheel 111. In response to the command, it is sufficient for the housing drive wheel control unit 214 (FIG. 15) to cause the first motor 112 (FIG. 2B) to rotate until the first drive wheel 110 rotates at the specified rotation rate in the specified rotation direction, and to cause the second motor 113 (FIG. 2B) to rotate until the second drive wheel 111 rotates at the specified rotation rate in the specified rotation direction. With this arrangement, the forward direction of the housing 101 indicated by the dashed line pointing in the Y direction becomes aligned with the movement direction D. On the other hand, in the case in which the angle (=90°−θ) indicating the offset is a minus value, it is sufficient for the main control unit 200 to acquire from the memory 206 a rotation rate and a rotation direction for each of the first drive wheel 110 and the second drive wheel 111 necessary to rotate the housing 101 counter-clockwise by an amount equal to an angle (=|90°−θ|) indicating the absolute value of the angle indicating the offset. Subsequently, it is sufficient for the main control unit 200 to output to the housing drive wheel control unit 214 (FIG. 15) a command that specifies the acquired rotation rate and rotation direction for each of the first drive wheel 110 and the second drive wheel 111. Note that the method of realizing S412 is not limited to the method described above. For example, the robot 1 may also be provided with an angular velocity sensor that senses the angular velocity when the housing 101 rotates about the Z axis. Additionally, on the basis of the angular velocity sensed by the angular velocity sensor, the main control unit 200 may determine whether or not the housing 101 has rotated by the angle (=90°−θ) indicating the offset.

In S413, the main control unit 200 decides the rotation directions and the rotation speeds of the first drive wheel 110 and the second drive wheel 111, in accordance with an emotion to be expressed by the robot 1 (S413). Subsequently, in S414, the main control unit 200 causes the first drive wheel 110 and the second drive wheel 111 to rotate in the rotation directions at the rotation speeds decided in S413 (S414).

Figure 26A:
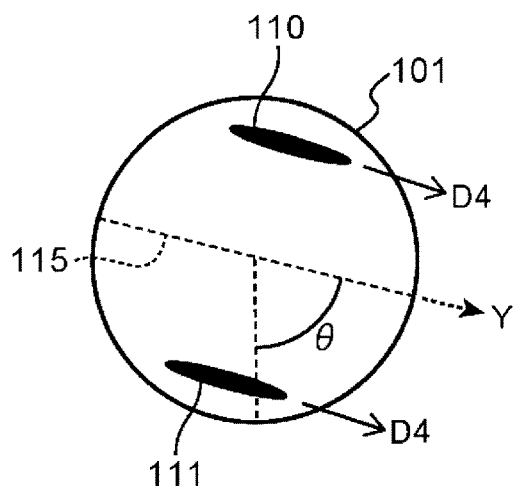
FIG. 26A is a diagram illustrating an example of a drive wheel rotation process according to S413 and S414 of FIG. 24.
Figure 26B:
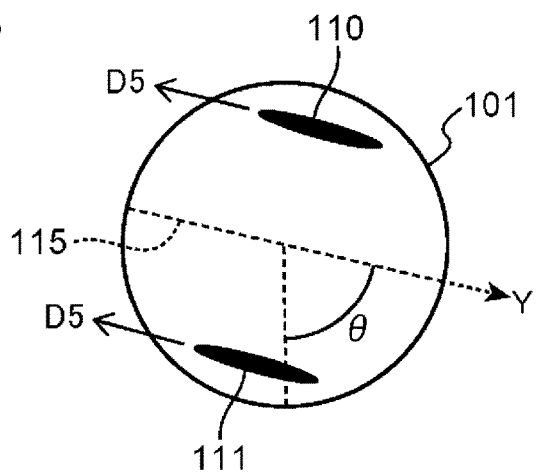
FIG. 26B is a diagram illustrating an example of a drive wheel rotation process according to S413 and S414 of FIG. 24.
Figure 26C:
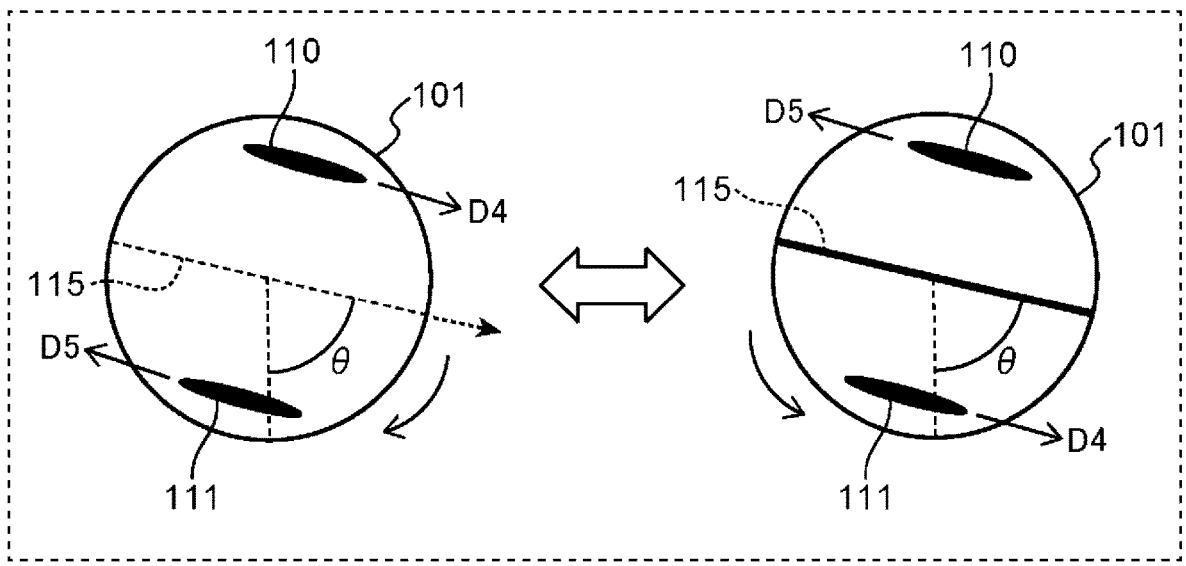
FIG. 26C is a diagram illustrating an example of a drive wheel rotation process according to S413 and S414 of FIG. 24.

FIGS. 26A to 26C is a diagram illustrating an example of a rotation process of the first drive wheel 110 and the second drive wheel 111 according to S413 and S414 in FIG. 24. For example, suppose that the main control unit 200 causes the robot 1 to express an emotion indicating friendliness towards the user 1501. In this case, in S413, the main control unit 200 decides the rotation direction of the first drive wheel 110 and the second drive wheel 111 to be the direction parallel to the Y direction indicated by the arrow D4 (front direction), as illustrated in FIG. 26A. Also, the stronger the degree of emotion of friendliness towards the user 1501 to be expressed by the robot 1, the main control unit 200 sets the rotation speed to a faster speed. Subsequently, in S414, the main control unit 200 outputs to the housing drive wheel control unit 214 (FIG. 15) a command for causing the first drive wheel 110 and the second drive wheel 111 to rotate in the rotation direction decided in S413 at the rotation speed decided in S413. With this arrangement, in response to the command, the housing drive wheel control unit 214 (FIG. 15) causes the first motor 112 (FIG. 2B) and the second motor 113 (FIG. 2B) to rotate at the specified rotation speed in the direction parallel to the Y direction indicated by the arrow D4, thereby causing the housing 101 to move in a straight line in the Y direction (front direction). In this case, suppose that the robot 1 is attempting to advance towards the user 1501 in a state in which the user 1501 is hugging the robot 1. With this arrangement, the user 1501 can be made to feel the robot 1 coming close to the user 1501 in the arms of the user 1501. In so doing, the main control unit 200 can cause the robot 1 to express friendliness towards the user 1501.

Conversely, suppose that the main control unit 200 causes the robot 1 to express an emotion indicating irritation with the user 1501 ("No No!"). In this case, in S413, the main control unit 200 decides the rotation direction of the first drive wheel 110 and the second drive wheel 111 to be the direction parallel to the −Y direction indicated by the arrow D5 (back direction), as illustrated in FIG. 26B. Also, the stronger the degree of emotion of irritation with the user 1501 to be expressed by the robot 1, the main control unit 200 sets the rotation speed to a faster speed. Subsequently, in S414, the main control unit 200 outputs to the housing drive wheel control unit 214 (FIG. 15) a command for causing the first drive wheel 110 and the second drive wheel 111 to rotate in the rotation direction decided in S413 at the rotation speed decided in S413. In response to the command, the housing drive wheel control unit 214 (FIG. 15) causes the first motor 112 (FIG. 2B) and the second motor 113 (FIG. 2B) to rotate at the specified rotation speed in the direction parallel to the −Y direction indicated by the arrow D5, thereby causing the housing 101 to move in a straight line in the −Y direction (back direction). In this case, suppose that the robot 1 is attempting to advance in a direction away from the user 1501 in a state in which the user 1501 is hugging the robot 1. With this arrangement, the user 1501 can be made to feel the robot 1 trying to pull away from the user 1501 in the arms of the user 1501. In so doing, the main control unit 200 can cause the robot 1 to express irritation with the user 1501.

Note that in the case of anticipating a child as the user 1501, when the first drive wheel 110 and the second drive wheel 111 are made to rotate, the load on the user 1501 increases. For this reason, in S414, the main control unit 200 may also output to the housing drive wheel control unit 214 (FIG. 15) a command for causing the first drive wheel 110 and the second drive wheel 111 to rotate intermittently in the rotation direction decided in S413 at the rotation speed decided in S413. With this arrangement, in response to the command, the housing drive wheel control unit 214 (FIG. 15) may cause the first motor 112 (FIG. 2B) and the second motor 113 (FIG. 2B) to rotate intermittently at the specified rotation speed in the direction parallel to the front direction or the back direction, thereby causing the housing 101 to move in a straight line in the Y direction (front direction) or the −Y direction (back direction). In this case, the load on the user 1501 can be reduced.

In addition, in the case of causing the robot 1 to express an emotion indicating irritation with the user 1501 ("No No!"), to additionally cause the robot 1 to express an emotion indicating irritation with being hugged, the main control unit 200 may also conduct the first control and the second control in alternation. In other words, in the first control, as illustrated in FIG. 26C, in S413, after deciding the rotation direction of the first drive wheel 110 to the direction (front direction) parallel to the Y direction indicated by the arrow D4, and deciding the rotation direction of the second drive wheel 111 to be the direction (back direction) parallel to the −Y direction indicated by the arrow D5, S414 is conducted to thereby cause the housing 101 to rotate clockwise. In the second control, conversely from the first control, in S413, after deciding the rotation direction of the first drive wheel 110 to the direction (back direction) parallel to the −Y direction indicated by the arrow D5, and deciding the rotation direction of the second drive wheel 111 to be the direction (front direction) parallel to the Y direction indicated by the arrow D4, S414 is conducted to thereby cause the housing 101 to rotate counter-clockwise. In this case, the robot 1 attempts to move around to the left and right in the arms of the user 1501. With this arrangement, the user 1501 can be made to feel the robot 1 being in an agitated state in the arms of the user 1501. In so doing, the main control unit 200 can cause the robot 1 to express irritation with being hugged.

Third Embodiment

The third embodiment is characterized by determining, on the basis of an image captured by the camera 108, whether or not the robot 1 being hugged by the user 1501 has been sensed correctly in the hug sensing process of S200 (FIG. 17). The overall process of the emotion expression process according to the third embodiment is the same as the emotion expression process according to the second embodiment, but the details of the direction computation process illustrated in S300 of FIG. 17 are different. Note that in the third embodiment, components which are the same as the second embodiment are denoted with the same signs, and description thereof will be omitted.

Figure 27:
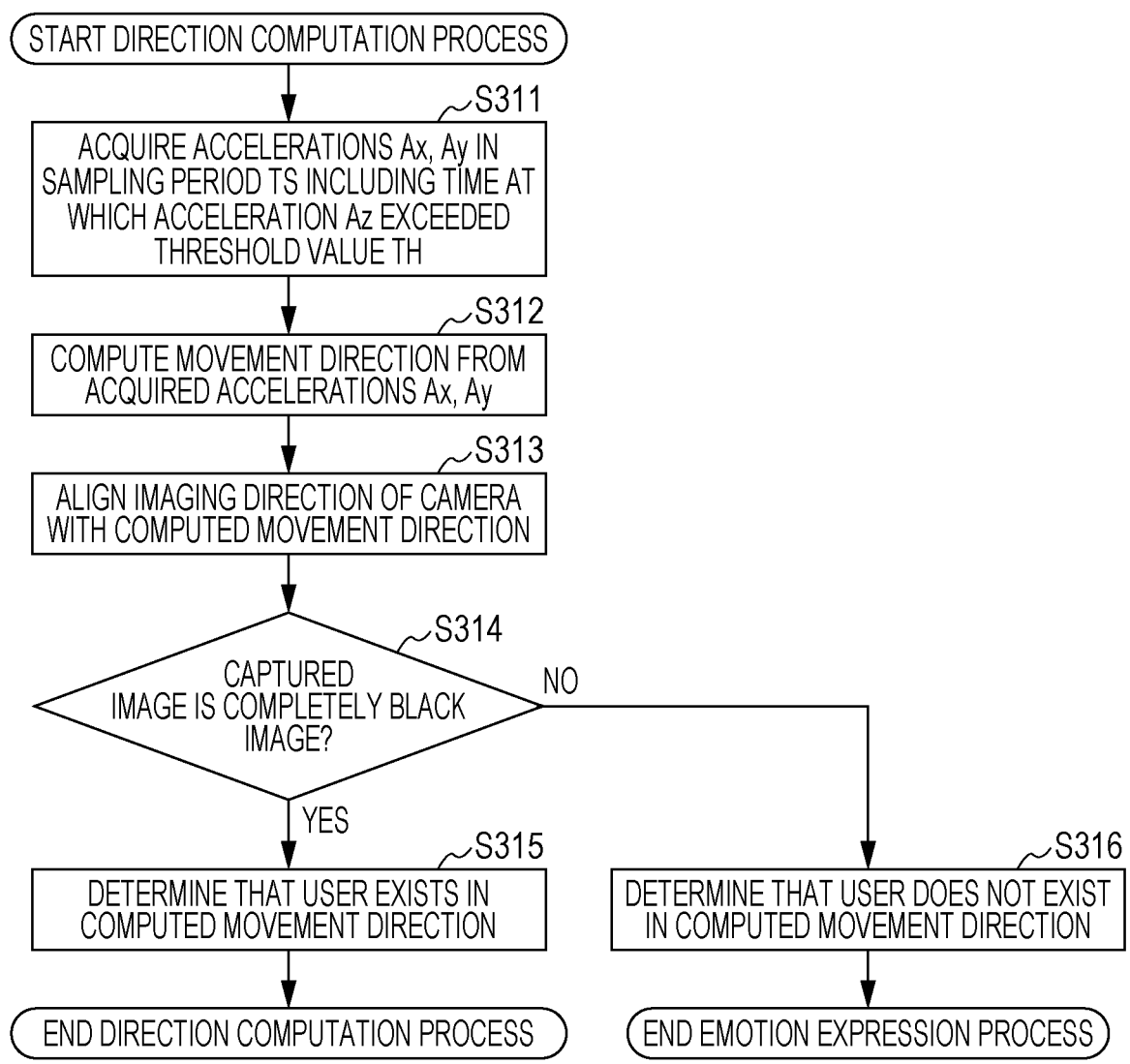
FIG. 27 is a flowchart illustrating details of the direction computation process illustrated in S300 of FIG. 17 according to a third embodiment of the present disclosure.

FIG. 27 is a flowchart illustrating details of the direction computation process illustrated in S300 of FIG. 17 according to the third embodiment of the present disclosure. As illustrated in FIG. 27, when the direction computation process is started, the user direction computation unit 203 conducts S311 having the same content as S301 (FIG. 19) (S311), and then conducts S312 having the same content as S302 (FIG. 19) (S312), and thereby computes the movement direction D of the housing 101.

Next, the user direction computation unit 203 aligns the imaging direction of the camera 108 with the movement direction D computed in S312 (S313). As described in FIG. 2B, the imaging direction of the camera 108 points in the Y direction, which is the forward direction of the housing 101 provided by the first drive wheel 110 and the second drive wheel 111. For this reason, in S313, the user direction computation unit 203 conducts the same processes as S411 and S412 (FIG. 24), and aligns the forward direction of the housing 101 provided by the first drive wheel 110 and the second drive wheel 111 with the movement direction D. With this arrangement, the user direction computation unit 203 aligns the imaging direction of the camera 108 with the movement direction D.

Next, the camera picture processing unit 204 (FIG. 15) causes the camera 108 to perform imaging, and determines whether or not the image that is captured (hereinafter, the captured image) is an image close to completely black (hereinafter, a completely black image) (S314). For example, in S314, the camera picture processing unit 204 processes the captured image into a monochrome image. Subsequently, in the case in which the number of pixels expressing a black color included in the processed captured image is equal to or greater than a certain number of pixels close to the total number of pixels in the captured image, the camera picture processing unit 204 determines that the captured image is a completely black image (S314, YES), whereas in the case of being less than the certain number of pixels, the camera picture processing unit 204 determines that the captured image is not a completely black image (S314, NO). Note that the method by which the camera picture processing unit 204 determines whether or not the captured image is a completely black image in S314 is not limited to the above.

In the case in which the movement direction D computed in S312 indicates the direction in which the robot 1 is pulled close by the user 1501, the image depicting the movement direction D by the camera 108 is thought to be a completely black image obtained when imaging the user 1501 at close range. For this reason, in the case of determining in S314 that the captured image is a completely black image (S314, YES), the user direction computation unit 203 determines that the user 1501 exists in the movement direction D computed in S312 (S315). In this case, the user direction computation unit 203 determines that the robot 1 being hugged by the user 1501 has been sensed correctly in the hug sensing process of S200 (FIG. 17), additionally determines that the movement direction D has been computed appropriately in S312, and ends the direction computation process.

On the other hand, in the case of determining in S314 that the captured image is not a completely black image (S314, NO), the user direction computation unit 203 determines that the user 1501 does not exist in the computed movement direction D (S316). In this case, the user direction computation unit 203 determines that the robot 1 being hugged by the user 1501 has been sensed incorrectly in the hug sensing process of S200 (FIG. 17), additionally determines that the movement direction D has not been computed appropriately in S312 as a result of the incorrect sensing, and ends the emotion expression process without conducting the driving process of S400 (FIG. 17).

According to this aspect, a captured image from the camera 108 is also taken into consideration to determine whether or not the robot 1 is being held by the user 1501, and thus the robot 1 being hugged by the user 1501 can be determined more accurately.

Fourth Embodiment

The fourth embodiment is characterized by aligning the facing of the display 211 (FIG. 15) with the movement direction D in the case of determining that the display 211 (FIG. 15) is facing in the opposite direction of the movement direction D of the housing 101 computed in the direction computation process illustrated in S300 of FIG. 17.

Figure 28C:
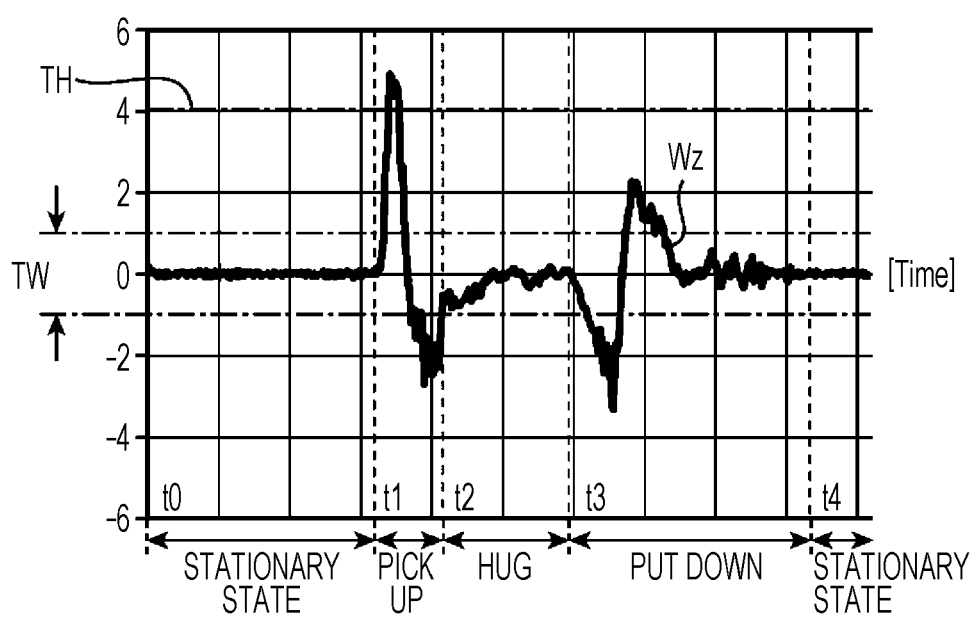
FIG. 28C is a diagram illustrating an example of an output waveform of an acceleration sensor when hugging a robot from behind.
Figure 29:
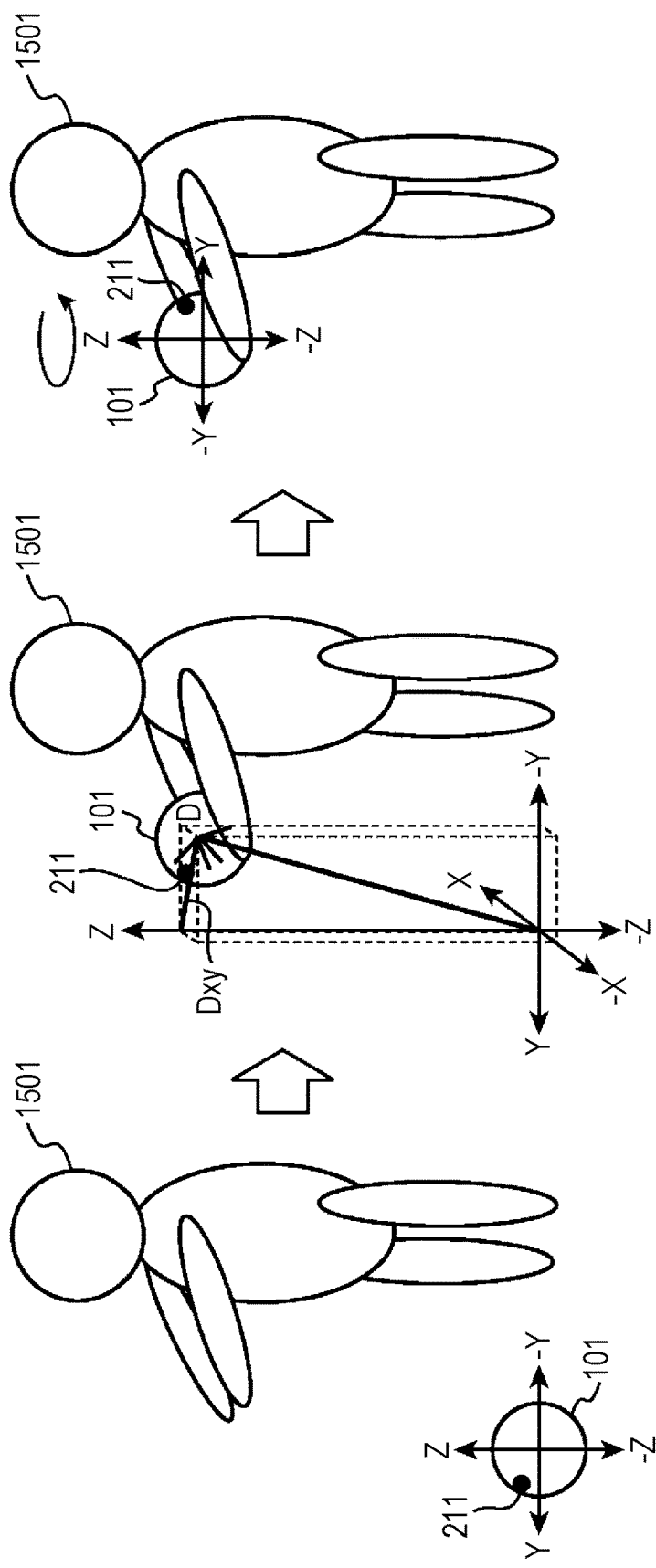
FIG. 29 is a diagram illustrating an overview of an emotion expression process by a robot according to a fourth embodiment of the present disclosure.

FIGS. 28A to 28C are diagrams illustrating examples of the output waveform of the acceleration sensor 219 when hugging the robot 1 from behind. FIG. 29 is a diagram illustrating an overview of an emotion expression process by the robot 1 according to the fourth embodiment of the present disclosure. Suppose that the user 1501 hugs the robot 1 from behind while the display 211 is in a state of facing in the opposite direction from the user 1501. In this case, the accelerations Ax, Ay, and Az are estimated to change as indicated by the output waveform Wx in FIG. 28A, the output waveform Wy in FIG. 28B, and the output waveform Wz in FIG. 28C, respectively.

As illustrated in FIGS. 28A to 28C, if the robot 1 in a stationary state is picked up from the floor by the user 1501 at time t1, similarly to FIGS. 1A to 1C, at least the acceleration Az is estimated to change until a certain threshold value TH is exceeded, as indicated by the output waveform Wz. Additionally, suppose that the user 1501 pulls close and hugs the robot 1 while the display 211 is in a state of facing in the opposite direction of the direction facing towards the user 1501. In this case, in accordance with the robot 1 moving in the back direction to the position of the user 1501, the acceleration Ay is estimated to exhibit variation in the back direction, that is, the −Y direction, exceeding a certain width TW for a fixed period, as indicated by the output waveform Wy in the circled part of FIG. 28B.

Accordingly, in the emotion expression process by the robot 1 according to the fourth embodiment of the present disclosure, in the case in which the robot 1 is hugged from behind (the back direction) by the user 1501 in a state in which the display 211 is facing in the opposite direction of the direction facing towards the user 1501, as illustrated by the left drawing in FIG. 29, similarly to the second embodiment, after conducting 1) a hug sensing process, 2) a direction computation process is conducted, thereby computing the movement direction D of the housing 101 in the XY axis plane, as illustrated by the center drawing in FIG. 29. Furthermore, in the emotion expression process according to the fourth embodiment of the present disclosure, as described in FIG. 28B, in the case of 3) determining that the computed movement direction D is the −Y direction, the display 211 is determined to be facing in the opposite direction of the movement direction D, that is, the direction facing towards the user 1501. Subsequently, in the case of making this determination, as illustrated by the right drawing in FIG. 29, 4) a driving process is conducted in a state with the display 211 facing in the computed movement direction D.

Figure 30:
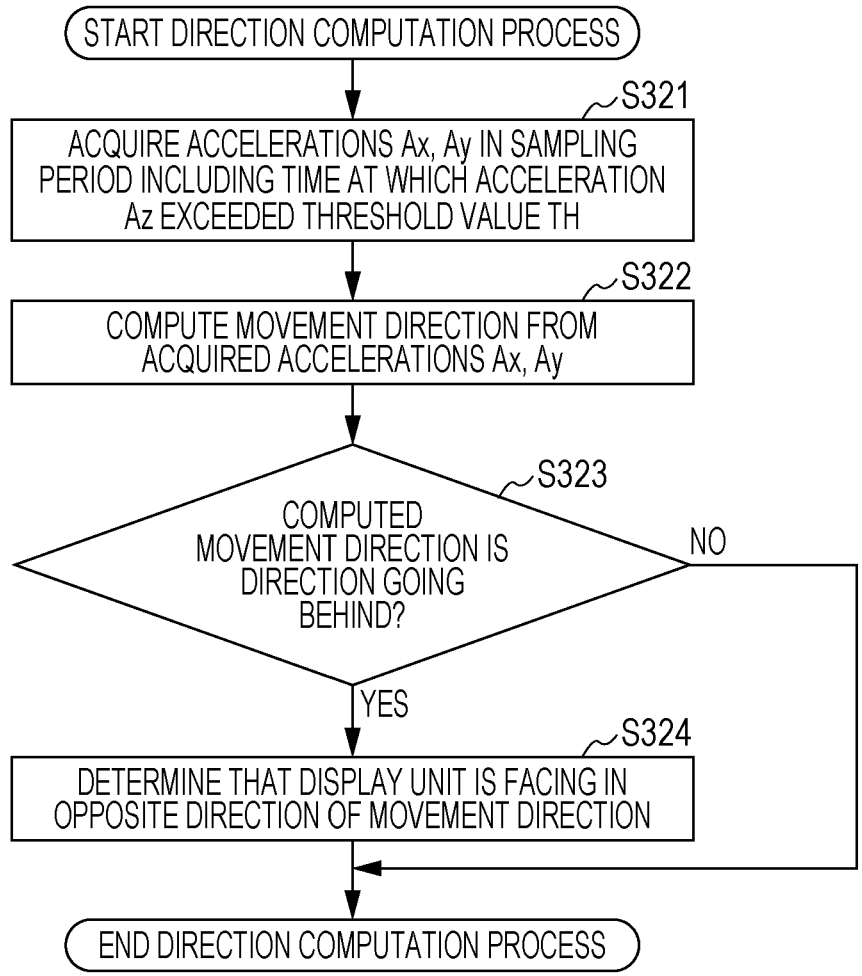
FIG. 30 is a flowchart illustrating details of the direction computation process illustrated in S300 of FIG. 17 according to a fourth embodiment of the present disclosure.

The overall process of the emotion expression process according to the fourth embodiment is the same as the emotion expression process according to the second embodiment, but the details of the direction computation process illustrated in S300 of FIG. 17 are different. Note that in the fourth embodiment, components which are the same as the second embodiment are denoted with the same signs, and description thereof will be omitted. FIG. 30 is a flowchart illustrating details of the direction computation process illustrated in S300 of FIG. 17 according to the fourth embodiment of the present disclosure.

As illustrated in FIG. 30, when the direction computation process is started, the user direction computation unit 203 conducts S321 having the same content as S301 (FIG. 19) (S321), and then conducts S322 having the same content as S302 (FIG. 19) (S322), and thereby computes the movement direction D of the housing 101.

Next, the user direction computation unit 203 determines whether or not the movement direction D of the housing 101 computed in S322 is facing in the direction going behind the robot 1, that is, the −Y direction (S323). Subsequently, in the case of determining in S323 that the movement direction D is facing in the direction going behind the robot 1 (−Y direction (S323, YES), the user direction computation unit 203 determines that the display 211 is facing in the opposite direction of the movement direction D, that is, the direction facing towards the user 1501 (S324), and then ends the direction computation process.

Specifically, as described with regard to S302 using FIGS. 19 and 20, in S322 which is the same as S302, the user direction computation unit 203 computes, from the results of respectively double-integrating the accelerations Ax and Ay acquired in S321, vectors Dx and Dy that express the distance and the direction moved by the housing 101 in the X axis direction and the Y axis direction, respectively, and from these computes a combined vector Dxy.

At this point, suppose that the vector Dxy computed in S322 is pointing in the X direction and the Y direction, as illustrated in the right drawing in FIG. 20. In this case, in S323, since the vector Dy indicating the Y axis direction component of the vector Dxy computed in S322 is pointing in the Y direction, the user direction computation unit 203 determines that the movement direction D of the housing 101 is not pointing in the −Y direction (S323, NO). In this case, the user direction computation unit 203 determines that the display 211 is facing in the movement direction D, and ends the direction computation process.

Figure 31:
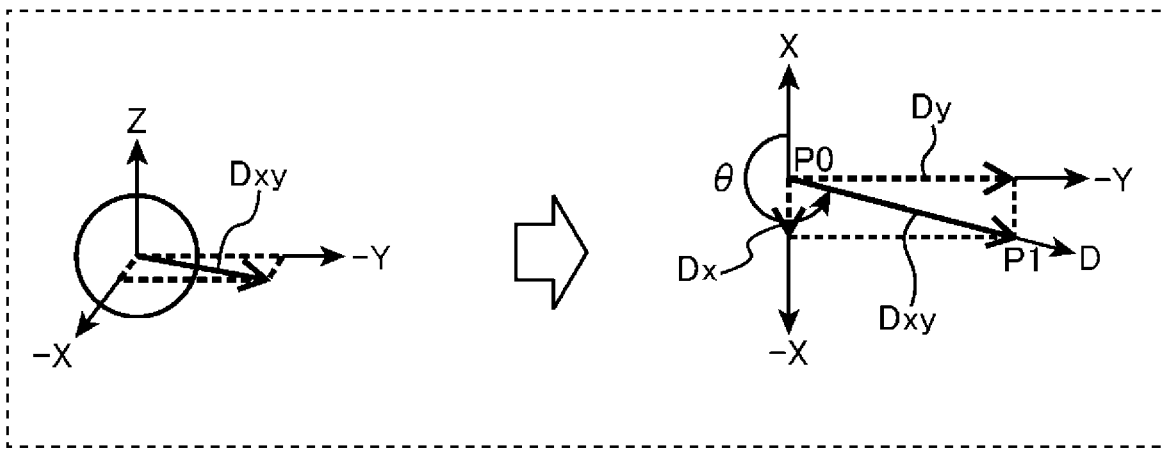
FIG. 31 is a diagram illustrating an example of the housing movement direction determination process in S323 of FIG. 30.

FIG. 31 is a diagram illustrating an example of the process of determining the movement direction D of the housing 101 in S323 of FIG. 30. On the other hand, suppose that the vector Dxy computed in S322 is pointing in the −X direction and the −Y direction, as illustrated in FIG. 31. In this case, in S323, since the vector Dy indicating the Y axis direction component of the vector Dxy computed in S322 is pointing in the −Y direction, the user direction computation unit 203 determines that the movement direction D of the housing 101 is pointing in the −Y direction (S323, YES). In this case, the user direction computation unit 203 determines that the display 211 is facing in the opposite direction of the movement direction D, that is, the direction facing towards the user 1501 (S324), and then ends the direction computation process.

In other words, in S323, the user direction computation unit 203 determines whether or not the vector Dy (FIGS. 20, 31) indicating the change in the acceleration Ay during the sampling period TS before and after the acceleration Az exceeds the certain threshold value TH (FIG. 1A) is pointing in the −Y direction in the case in which the display direction of the display 211 is taken to be the Y direction.

After the direction computation process ends, the main control unit 200 conducts the driving process illustrated in S400 (FIG. 17) in accordance with the process flow illustrated in FIG. 24, similarly to the second embodiment. In the case in which S324 is conducted in the direction computation process, or in other words, in the case of determining that the display 211 is facing in the opposite direction of the movement direction D, in S411 and S412 (FIG. 24), the main control unit 200 aligns the Y direction, that is, the forward direction of the housing 101 provided by the first drive wheel 110 and the second drive wheel 111, with the movement direction D computed in S322.

Figure 32:
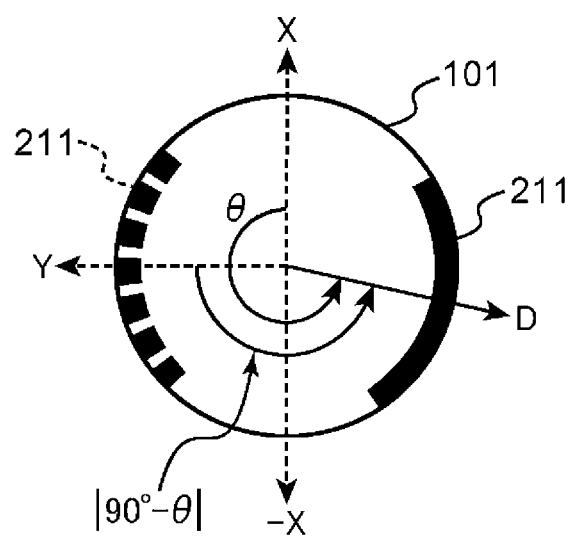
FIG. 32 is a diagram illustrating an example of the position of a display in a case of conducting S412 of FIG. 24 in a fourth embodiment of the present disclosure.

FIG. 32 is a diagram illustrating an example of the position of the display 211 in a case of conducting S412 of FIG. 24 in the fourth embodiment of the present disclosure. In the case in which S324 is conducted, the angle θ expressing the movement direction D becomes greater than 180 degrees, as illustrated in FIG. 31. Even in this case, in S412 described above, the main control unit 200 determines that a direction obtained by rotating counter-clockwise from the X direction by the angle θ expressing the movement direction D is the movement direction D, as illustrated in FIG. 32, for example. In addition, the main control unit 200 determines that the Y direction, that is, the forward direction of the housing 101 provided by the first drive wheel 110 and the second drive wheel 111, is the direction obtained by rotating 90 degrees counter-clockwise from the X direction. Subsequently, since the angle indicating the offset between the Y direction and the movement direction D, that is, the result of subtracting the angle θ expressing the movement direction D from 90 degrees (90°−θ) is a minus value, the main control unit 200 outputs to the housing drive wheel control unit 214 (FIG. 15) a command causing the housing 101 to rotate counter-clockwise by an angle indicating the absolute value of that result (=|90°−θ|). With this arrangement, the Y direction, that is, the forward direction of the housing 101 provided by the first drive wheel 110 and the second drive wheel 111, becomes aligned with the movement direction D. As described in FIG. 2B, the display 211 faces in the Y direction, that is, the forward direction of the housing 101. For this reason, if the Y direction, that is, the forward direction of the housing 101 is aligned with the movement direction D, the facing of the display 211 which faces in the Y direction also becomes aligned with the movement direction D.

As described above, according to this aspect, in the case of determining that the display 211 is facing in the opposite direction of the movement direction D of the housing 101, the main control unit 200 causes the first drive wheel 110 and the second drive wheel 111 to rotate, thereby aligning the facing of the display 211 with the movement direction of the housing 101. With this arrangement, even if the user 1501 hugs the robot 1 in the case in which the robot 1 is moving on the floor facing in the opposite direction of the user 1501, the face of the robot 1 can be made to face towards the user 1501 due to the rotation of the first drive wheel 110 and the second drive wheel 111.

(Modification 1)

Figure 33:
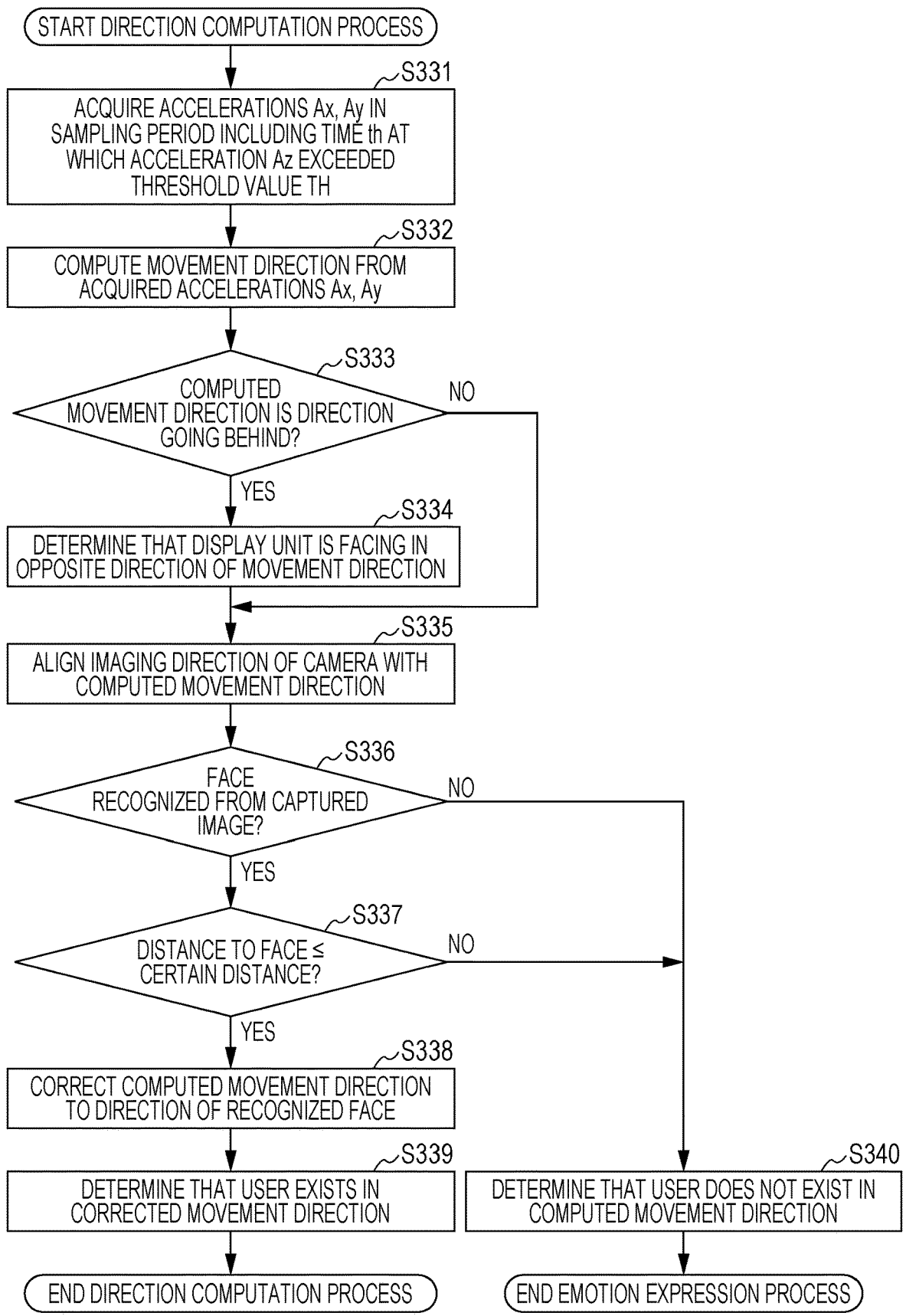
FIG. 33 is a flowchart illustrating a modification of the details of the direction computation process illustrated in S300 of FIG. 17 according to a fourth embodiment of the present disclosure.

The direction computation process illustrated in S300 of FIG. 17 according to the fourth embodiment may also be realized by the process flow illustrated in FIG. 33 instead of the process flow illustrated in FIG. 30. Hereinafter, the process flow of the direction computation process illustrated in FIG. 33 will be described in detail. FIG. 33 is a flowchart illustrating a modification of the details of the direction computation process illustrated in S300 of FIG. 17 according to the fourth embodiment of the present disclosure.

The direction computation process illustrated in FIG. 33 is characterized by determining, on the basis of an image captured by the camera 108, whether or not the robot 1 being hugged by the user 1501 has been sensed correctly in the hug sensing process of S200 (FIG. 17), and in addition, correcting the movement direction D of the housing 101 computed in the direction computation process illustrated in FIG. 30 on the basis of a result of recognizing the face of the user 1501 from a captured image from the camera 108. In FIG. 33, S331, S332, S333, and S334 are the same as S321, S322, S323, and S324 in FIG. 30, and thus description thereof will be omitted.

As illustrated in FIG. 33, after computing the movement direction D of the housing 101 in S332, the user direction computation unit 203 aligns the imaging direction of the camera 108 (FIG. 2B) with the computed movement direction D of the housing 101 (S335). As described in FIG. 2B, the imaging direction of the camera 108 points in the Y direction, which is the forward direction of the housing 101 provided by the first drive wheel 110 and the second drive wheel 111. For this reason, in S335, the user direction computation unit 203 conducts the same processes as S411 and S412 (FIG. 24), and aligns the forward direction of the housing 101 provided by the first drive wheel 110 and the second drive wheel 111 with the movement direction D. With this arrangement, the user direction computation unit 203 aligns the imaging direction of the camera 108 with the movement direction D of the housing 101.

Next, the camera picture processing unit 204 (FIG. 15) causes the camera 108 to perform imaging, and recognizes the presence or absence of the face of the user 1501 from the captured image from the camera 108. In the case in which the face of the user 1501 is not recognized by the camera picture processing unit 204 (S336, NO), the user direction computation unit 203 determines that the user 1501 does not exist in the movement direction D of the housing 101 computed in S332 (S340). In this case, the user direction computation unit 203 determines that the robot 1 being hugged by the user 1501 has been sensed incorrectly in the hug sensing process of S200 (FIG. 17), additionally determines that the movement direction D of the housing 101 has not been computed appropriately as a result of the incorrect sensing, and ends the emotion expression process without conducting the driving process of S400 (FIG. 17).

On the other hand, in the case of successfully recognizing the face of the user 1501 from the captured image from the camera 108 (S336, YES), the camera picture processing unit 204 additionally recognizes the size of the face, and on the basis of a comparison result between the recognized size of the face and the size of the captured image, determines whether or not the distance from the camera 108 to the face is less than or equal to a certain distance (S337). Note that the certain distance is predetermined to be a distance considered to be the distance from the camera 108 to the position of the face of the user 1501 in the case in which the robot 1 is being hugged by the user 1501.

In S337, in the case of determining that the distance from the camera 108 to the face is not less than or equal to the certain distance (S337, NO), the user direction computation unit 203 determines that the user 1501 does not exist in the movement direction D of the housing 101 computed in S332 (S340), and ends the emotion expression process without conducting the driving process of S400 (FIG. 17).

For example, in some cases, the user 1501 picks up the robot 1 from the floor, then forcefully places the robot 1 on a chair or the like and goes away. In this case, after moving in the Z axis direction, the robot 1 rolls in the X axis direction or the Y axis direction on the chair, thereby creating the risk of incorrectly sensing that the robot 1 is being hugged by the user 1501 in the hug sensing process of S200 (FIG. 17). In this case, although there is a risk of the face of the user 1501 going away from the chair being included in the captured image from the camera 108, the distance from the camera 108 to the face of the user 1501 is longer than the certain distance, and thus in S337, the distance from the camera 108 to the face is determined not to be less than or equal to the certain distance (S337, NO). In other words, in the case in which the user 1501 picks up the robot 1 from the floor, then forcefully places the robot 1 on a chair or the like and goes away, the user direction computation unit 203 is able to determine that the robot 1 being hugged by the user 1501 has been sensed incorrectly in the hug sensing process of S200 (FIG. 17), determine that the movement direction D of the housing 101 has not been computed appropriately as a result, and end the emotion expression process without conducting the driving process of S400 (FIG. 17).

On the other hand, suppose that in S337, the distance from the camera 108 to the face is determined to be less than or equal to the certain distance (S337, YES). In this case, the user direction computation unit 203 corrects the movement distance D of the housing 101 computed in S332 to a direction pointing from the position of the camera 108 towards the position of the recognized face (hereinafter, the direction of the recognized face) (S338). In this case, the user direction computation unit 203 treats the movement direction of the housing 101 as having been corrected appropriately, determines that the user 1501 exists in the corrected movement direction (S339), and ends the direction computation process.

Note that S338 may be realized as follows. The user direction computation unit 203 may cause the camera picture processing unit 204 to recognize the position of the face of the user 1501. Also, the user direction computation unit 203 may cause the camera picture processing unit 204 to compute a direction and an angle indicating the offset from the imaging direction of the camera 108 and the direction of the recognized face, on the basis of factors such as the distance between the position of the face of the user 1501 and a certain position (for example, the center) in the captured image from the camera 108. Subsequently, the user direction computation unit 203 may correct the movement direction D in the direction indicating the offset by the angle indicating the offset.

According to this aspect, a captured image from the camera 108 is also taken into consideration to determine whether or not the robot 1 is being held by the user 1501, and thus the robot 1 being held by the user can be determined more accurately. Also, in the case of determining that the robot 1 is being held by the user 1501, the direction in which the robot 1 is pulled close to the user 1501 can be computed accurately on the basis of a captured image from the camera 108.

(Modification 2)

In the driving process illustrated in S400 of FIG. 17 according to the first embodiment, in S402 (FIG. 21), the main control unit 200 causes the counterweight 114 to move along the guide shaft 115 in a direction corresponding to an emotion to be expressed by the robot 1. Also, in the driving process illustrated in S400 of FIG. 17 according to the second to fourth embodiments, in S413 and S414 (FIG. 24), the main control unit 200 causes the first drive wheel 110 and the second drive wheel 111 to rotate in a direction corresponding to an emotion to be expressed by the robot 1. Accordingly, in S402 (FIG. 21) or S413 and S414 (FIG. 24), the main control unit 200 additionally may change the facial expression of the robot 1 to be displayed on the display 211, in accordance with the emotion to be expressed by the robot 1.

Figure 34A:
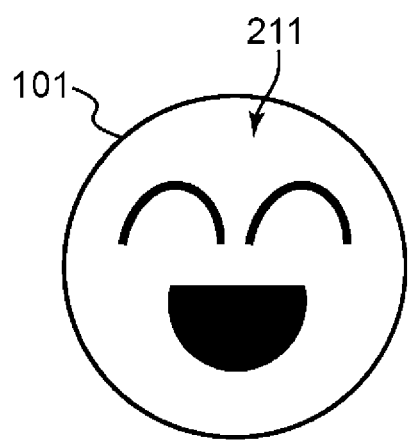
FIG. 34A is a diagram illustrating an example of changing a facial expression to be displayed on a display 211 in S402 of FIG. 21 and in S413 and S414 of FIG. 24.
Figure 34B:
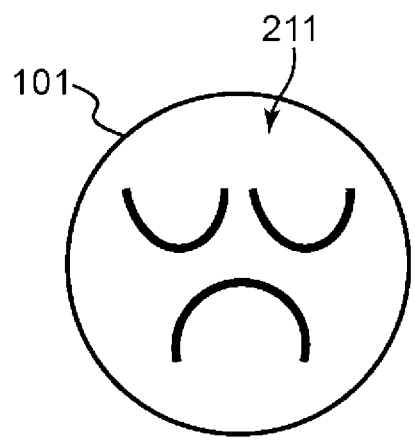
FIG. 34B is a diagram illustrating an example of changing a facial expression to be displayed on a display 211 in S402 of FIG. 21 and in S413 and S414 of FIG. 24.

FIGS. 34A and 34B are diagrams illustrating an example of changing a facial expression to be displayed on the display 211 in S402 of FIG. 21 and in S413 and S414 of FIG. 24. For example, in S402 (FIG. 21) or in S413 and S414 (FIG. 24), in the case of causing the robot 1 to express an emotion of friendliness towards the user 1501, the main control unit 200 may cause the display 211 to display a smiling facial expression as illustrated in FIG. 34A. On the other hand, in the case of causing the robot 1 to expression an emotion of irritation with the user 1501, the main control unit 200 may cause the display 211 to display a facial expression indicating a bad mood as illustrated in FIG. 34B.

According to this aspect, by changing the facial expression to be displayed by the display 211, the emotions of the robot 1 can be expressed more clearly.

(Modification 3)

In the respective embodiments described above, as illustrated in FIG. 2B, the camera 108, as well as the first display 105, the second display 106, and the third display 107 constituting the display 211, are attached to the first rotating plate 103. Also, although the robot 1 is provided with a function of causing the swing arm 116 to rotate separately as illustrated in FIGS. 9A to 9C, the robot 1 is not provided with a function of causing the first rotating plate 103 to rotate separately.

For this reason, in S313 of FIG. 27 according to the third embodiment and in S335 of FIG. 33 according to Modification 1, the same processes as S411 and S412 (FIG. 24) are conducted, and the forward direction of the housing 101 provided by the driving of the first drive wheel 110 and the second drive wheel 111 is changed, thereby aligning the imaging direction of the camera 108 with the movement direction D of the housing 101. Also, in the fourth embodiment, in S411 and S412 (FIG. 24), the forward direction of the housing 101 provided by the driving of the first drive wheel 110 and the second drive wheel 111 and the facing of the display 211 are aligned with the movement direction D of the housing 101.

However, the robot 1 may also be provided with a rotation driving mechanism that causes the first rotating plate 103 to rotate separately, and in S313 of FIG. 27 according to the third embodiment or in S335 of FIG. 33 according to Modification 1, by using the rotation driving mechanism to rotate the first rotating plate 103, the imaging direction of the camera 108 may be aligned with the movement direction D of the housing 101. Also, in S411 and S412 (FIG. 24) according to the fourth embodiment, the forward direction of the housing 101 provided by the first drive wheel 110 and the second drive wheel 111 may be aligned with the movement direction D of the housing 101, while in addition, the first rotating plate 103 may be made to rotate using the rotation driving mechanism, thereby aligning the facing of the display 211 with the movement direction D of the housing 101.

Figure 35:
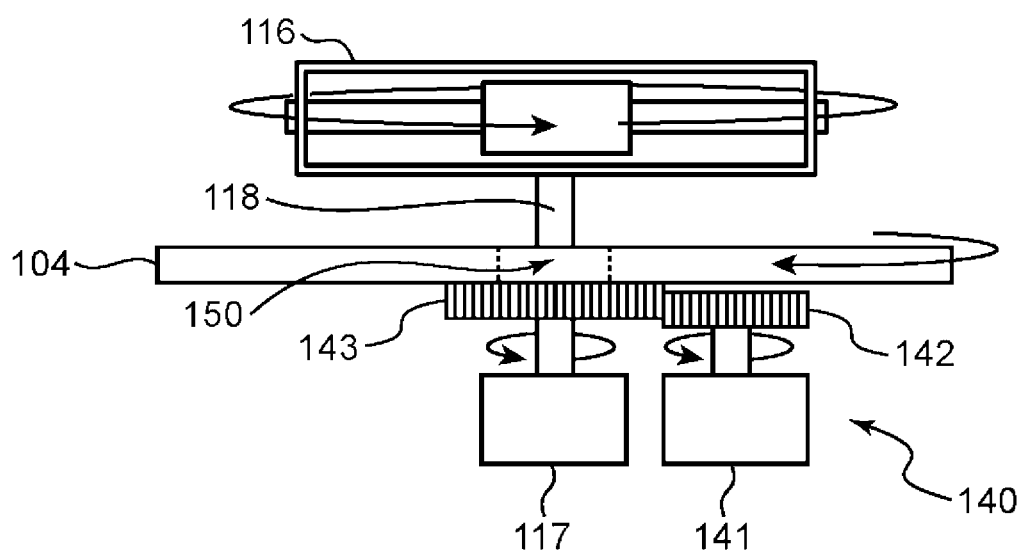
FIG. 35 is a diagram illustrating an example of a rotation driving mechanism of a first rotating plate and a second rotating plate.

The rotation driving mechanism may be configured as follows, for example. FIG. 35 is a diagram illustrating an example of a rotation driving mechanism of the first rotating plate 103 and the second rotating plate 104. As illustrated in FIG. 35, a hollow part 150 larger than the diameter of the rotating shaft 118 may be provided in the second rotating plate 104, and a fifth gear 143 having a similar hollow part may be attached below the second rotating plate 104. Additionally, a rotation motor 141 including a motor pulley 142 that engages with the fifth gear 143 may be provided, and the rotation motor 141 may be used to rotate the motor pulley 142 independently of the rotation of the rotating shaft 118 by the rotation motor 117. With this arrangement, by causing the fifth gear 143 to rotate and causing the second rotating plate 104 to rotate independently of the rotation of the rotating shaft 118, the first rotating plate 103 connected to the second rotating plate 104 (FIG. 2B) may be made to rotate. Note that the configuration of the rotation driving mechanism is not limited to the configuration illustrated in FIG. 35, and may also be another configuration.

(Modification 4)

In the respective embodiments and modifications described above, the front-and-back axis direction is taken to be the Y axis direction and the left-and-right axis direction is taken to be the X axis direction, but instead, the front-and-back axis direction may be taken to be the X axis direction and the left-and-right axis direction may be taken to be the Y axis direction. In other words, the left direction from the A view in FIG. 2B may be taken to be the front direction or the X direction, the right direction from the A view in FIG. 2B may be taken to be the back direction or the −X direction, the left direction from the C view in FIG. 2B may be taken to be the left direction or the Y direction, the right direction from the C view in FIG. 2B may be taken to be the right direction or the −Y direction.

In this case, the default direction of the guide shaft 115 (FIGS. 9A, 9B) becomes the X direction. For this reason, in S401 (FIG. 21), the main control unit 200 may output to the shaft control unit 213 (FIG. 15) a command causing the rotating shaft 118 (FIG. 9B) to rotate counter-clockwise by the amount of the angle θ expressing the movement direction D, which indicates the offset between the X direction and the movement direction D. Also, the forward direction provided by the first drive wheel 110 and the second drive wheel 111 becomes the X direction. For this reason, in S412 (FIG. 24), the main control unit 200 may output to the housing drive wheel control unit 214 (FIG. 15) a command specifying a rotation rate and a rotation direction for each of the first drive wheel 110 and the second drive wheel 111 required to cause the housing 101 to rotate counter-clockwise by the amount of the angle θ expressing the movement direction D, which indicates the offset between the X direction and the movement direction D.

Overview of Embodiments of Present Disclosure

A robot according to an aspect of the present disclosure includes:

a housing;

a frame disposed inside the housing;

a display, fitted to the frame, that displays at least part of a face of the robot;

drive wheels, fitted to the frame, that contact an inner surface of the housing and cause the housing the rotate;

a weight driver, fitted to the frame, that causes a weight to move back and forth in a certain direction;

an acceleration sensor that senses acceleration in three axis directions, an up-and-down axis direction, a front-and-back axis direction, and a left-and-right axis direction; and a control circuit that determines a state of the housing based on acceleration values sensed in the three axis directions, wherein after a first value indicating acceleration in the up-and-down axis direction output from the acceleration sensor to the control circuit is determined to exceed a certain threshold value, when any of the first value indicating the acceleration in the up-and-down axis direction, a second value indicating the acceleration in the front-and-back axis direction, and a third value indicating the acceleration in the left-and-right axis direction is determined to exhibit variation exceeding a certain width for a fixed period, the control circuit determines that the housing is being held by a user.

This aspect is provided with an acceleration sensor, and after a first value indicating acceleration in the up-and-down axis direction output from the acceleration sensor exceeds a certain threshold value, in a case in which any of the first value indicating the acceleration in the up-and-down axis direction, a second value indicating the acceleration of the front-and-back axis direction, and a third value indicating the acceleration in the left-and-right axis direction is determined to exhibit variation exceeding a certain width for a fixed period, it is determined that the housing is being held by a user.

With this arrangement, it is possible to distinguish easily between a case in which a user picks up the robot from the floor and hugs the robot, and a case in which a user picks up the robot from the floor, and places the robot on a chair, for example. As a result, in the case of determining that the user has hugged the robot, the robot can be made to react to the user appropriately in various ways.

Also, in the above aspect, for example, after the first value indicating the acceleration in the up-and-down axis direction is determined to exceed the certain threshold value, when any of the first value indicating the acceleration in the up-and-down axis direction, the second value indicating the acceleration in the front-and-back axis direction, and the third value indicating the acceleration in the left-and-right axis direction is determined to exhibit variation that has converged to within the certain width for the fixed period, the control circuit may determine that the housing has been placed in a certain location after moving in the up-and-down direction.

According to this aspect, after the first value indicating the acceleration in the up-and-down direction exceeds the certain threshold value, in a case in which any of the first value indicating the acceleration in the up-and-down direction, the second value indicating the acceleration of the front-and-back axis direction, and the third value indicating the acceleration in the left-and-right axis direction is determined to exhibit variation that has converged to within the certain width for the fixed period, it is determined that the housing has been placed in a certain location after moving in the up-and-down axis direction.

With this arrangement, it is possible to distinguish more accurately between a case in which a user picks up the robot from the floor and hugs the robot, and a case in which a user picks up the robot from the floor, and places the robot on a chair, for example.

Also, in the above aspect, for example, after the first value indicating acceleration in the up-and-down axis direction is determined to exceed the certain threshold value, even when any of the first value indicating the acceleration in the up-and-down axis direction, the second value indicating the acceleration in the front-and-back axis direction, and the third value indicating the acceleration in the left-and-right axis direction is determined to exhibit variation exceeding the certain width for the fixed period, when a drive instruction is output to the drive wheels, the control circuit may determine that the housing is not being held by a user.

The output values from the acceleration sensor are volatile values. For this reason, in a case of making a determination only by the output values from the acceleration sensor, there may be a risk of incorrect determination. For example, the accuracy of the determination can also be raised by sampling the output values from the acceleration sensor over a longer period. However, this causes the determination to take time.

On the other hand, in the case in which an output waveform from the acceleration sensor changes as a result of the robot operating by itself, there is a low probability of the robot being held by the user in the first place. For this reason, by pre-excluding cases in which the robot is operating by itself, incorrect determination of the housing being held by the user may be avoided.

Accordingly, in this aspect, in the case in output a drive instruction is being output to the pair of drive wheels, the robot is operating by itself, and thus it is determined that the housing is not being held by the user. With this arrangement, the possibility of making an incorrect determination that the robot is being held by the user can be reduced.

Also, in the above aspect, for example, when the control circuit determines that the housing is being held by the user, the control circuit may control the weight driver move the weight in a direction towards the user.

According to this aspect, there is provided a weight driving mechanism that causes a weight to move back and forth in a certain direction, and in a case of determining that the housing is being held by the user, the weight is made to move towards the user, thereby causing the center of gravity of the robot to shift to the user side. With this arrangement, the user can be made to feel the robot coming close to the user in the arms of the user. In so doing, according to this aspect, the robot can be made to express friendliness towards the user.

Also, in the above aspect, for example, when the control circuit determines that the housing is being held by the user, the control circuit may determine a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value, the control circuit may align the certain direction in which the weight moves back and forth with the determined movement direction of the housing, and the control circuit may control the weight driver to move the weight in a direction towards the user.

When the user hugs the robot, for example, in some cases the robot is pulled close to the user after being picked up directly upwards, while in other cases the robot is picked up after being pulled close to the user.

According to this aspect, the movement direction of the housing, that is, the direction in which the robot is pulled close before or after the robot is picked up, is determined on the basis of the second value indicating the acceleration in the front-and-back axis direction and the third value indicating the acceleration in the left-and-right axis direction from the acceleration sensor in a sampling period before and after the time at which the first value indicating the acceleration in the up-and-down axis direction from the acceleration sensor exceeded the certain threshold value.

Additionally, this aspect is provided with a weight driving mechanism that causes a weight to move back and forth in a certain direction.

By the above, the certain direction in which the weight moves back and forth is aligned with the determined movement direction of the housing. Furthermore, the weight is made to move in a direction approaching the user.

With this arrangement, in a state in which the user is hugging the robot, the center of gravity of the robot can be shifted to the user side. As a result, the user can be made to better feel the robot coming close to the user in the arms of the user. In so doing, according to this aspect, the robot can be made to express friendliness towards the user.

Also, in the above aspect, for example, the control circuit may control the weight driver to move the weight in a direction towards the user after causing the weight to move in the opposite direction of the direction going towards the user.

In the case of anticipating a child as the user, the weight of the weight cannot be made too heavy in some cases. For example, in such a case, the weight is made to move in a direction going towards the user after causing the weight to move in the opposite direction of the direction going towards the user. With this arrangement, even in the case in which the weight of the weight cannot be made too heavy, the center of gravity of the robot can be shifted to the user side, and the user can be made to better feel the robot coming close to the user in the arms of the user.

Also, in the above aspect, for example, when the control circuit determines that the housing is being held by the user, the control circuit may control the weight driver to move the weight in a direction away from the user.

According to this aspect, in the case of determining that the housing is being held by the user, by causing the weight to move in a direction going away from the user, the center of gravity of the robot shifts to the side opposite the user. With this arrangement, the user can be made to feel the robot trying to pull away from the user in the arms of the user. In so doing, according to this aspect, the robot can be made to express irritation with the hug.

Also, in the above aspect, for example, when the control circuit determines that the housing is being held by the user, the control circuit may determine a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value, the control circuit may align the certain direction in which the weight moves back and forth with the determined movement direction of the housing, and the control circuit may control the weight driver to move the weight in a direction away from the user.

According to this aspect, the movement direction of the housing, that is, the direction in which the robot is pulled close before or after the robot is picked up, is determined on the basis of the second value indicating the acceleration in the front-and-back axis direction and the third value indicating the acceleration in the left-and-right axis direction from the acceleration sensor in a sampling period before and after the time at which the first value indicating the acceleration in the up-and-down axis direction from the acceleration sensor exceeded the certain threshold value.

Additionally, the certain direction in which the weight moves back and forth is aligned with the determined movement direction of the housing. Furthermore, the weight is made to move in a direction going away from the user.

With this arrangement, in a state in which the user is hugging the robot, the center of gravity of the robot can be shifted to the side opposite the user. As a result, the user can be made to better feel the robot trying to pull away from the user in the arms of the user. In so doing, according to this aspect, the robot can be made to express irritation with the hug.

Also, in the above aspect, for example, when the control circuit determines that the housing is being held by the user, the control circuit may cause the drive wheels to rotate, and thereby cause the housing to move in a direction towards the user.

According to this aspect, there is provided a pair of drive wheels that touch the inner circumferential surface of the housing and cause the housing to rotate, and by causing the pair of drive wheels to rotate, the robot is made to proceed towards the user in the state in which the user is hugging the robot. With this arrangement, the user can be made to feel the robot coming close to the user in the arms of the user. In so doing, according to this aspect, the robot can be made to express friendliness towards the user.

Also, in the above aspect, for example, when the control circuit determines that the housing is being held by the user, the control may determine a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value, the control circuit may align a direction in which the housing moves forward due to the rotation of the drive wheels with the determined movement direction of the housing, and the control circuit may cause the drive wheels to rotate, and thereby cause the housing to move in a direction towards the user.

According to this aspect, the movement direction of the housing, that is, the direction in which the robot is pulled close before or after the robot is picked up, is determined on the basis of the second value indicating the acceleration in the front-and-back axis direction and the third value indicating the acceleration in the left-and-right axis direction from the acceleration sensor in a sampling period before and after the time at which the first value indicating the acceleration in the up-and-down axis direction from the acceleration sensor exceeded the certain threshold value.

Additionally, this aspect is provided with a pair of drive wheels that touch an inner circumferential surface of the housing and cause the housing the rotate.

By the above, the direction in which the housing moves forward due to the rotation of the pair of drive wheels is aligned with the determined movement direction of the housing. Furthermore, the pair of drive wheels is made to rotate.

With this arrangement, the robot can be made to proceed towards the user in a state in which the user is hugging the robot. As a result, the user can be made to better feel the robot coming close to the user in the arms of the user. In so doing, according to this aspect, the robot can be made to express friendliness towards the user.

Also, in the above aspect, for example, the control circuit may cause the drive wheels to rotate intermittently.

In the case of anticipating a child as the user, if the pair of drive wheels is made to rotate continually, the load on the user increases. According to this aspect, in such a case, the pair of drive wheels can be made to rotate intermittently rather than making the pair of drive wheels rotate continuously. With this arrangement, the load on the user can be reduced.

Also, in the above aspect, for example, when the control circuit determines that the housing is being held by the user, the control circuit may alternate between a first control that causes a first drive wheel of the drive wheels to rotate in a forward direction while also causing a second drive wheel to rotate in a backward direction, and a second control that causes the first drive wheel of the drive wheels to rotate in the backward direction while also causing the second drive wheel to rotate in the forward direction.

According to this aspect, in the case of determining that the housing is being held by the user, the robot moves around to the left and right in the arms of the user. With this arrangement, the user can be made to feel the robot being in an agitated state in the arms of the user. In so doing, according to this aspect, the robot can be made to express irritation with the hug.

Also, in the above aspect, for example, when the control circuit determines that the housing is being held by the user, the control circuit may determine a movement direction of the housing on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value, the control circuit may align a direction in which the housing moves forward due to a rotation of the drive wheels with the determined movement direction of the housing, and the control circuit alternates between a first control that causes a first drive wheel of the drive wheels to rotate in a forward direction while also causing a second drive wheel to rotate in a backward direction, and a second control that causes the first drive wheel of the drive wheels to rotate in the backward direction while also causing the second drive wheel to rotate in the forward direction.

According to this aspect, the movement direction of the housing, that is, the direction in which the robot is pulled close before or after the robot is picked up, is determined on the basis of the second value indicating the acceleration in the front-and-back axis direction and the third value indicating the acceleration in the left-and-right axis direction from the acceleration sensor in a sampling period before and after the time at which the first value indicating the acceleration in the up-and-down axis direction from the acceleration sensor exceeded the certain threshold value.

Additionally, the direction in which the housing moves forward due to the rotation of the pair of drive wheels is aligned with the determined movement direction of the housing. Furthermore, the pair of drive wheels is made to rotate.

With this arrangement, when the user hugs the robot, the robot can move around to the left and right while in a state in which the forward direction is facing towards the user. As a result, the user can be made to better feel the robot being in an agitated state in the arms of the user. In so doing, according to this aspect, the robot can be made to express irritation with the hug.

Also, in the above aspect, for example, when the control circuit determines that the housing is being held by the user, the control circuit may cause the drive wheels to rotate, and thereby cause the housing to move in a direction away from the user.

According to this aspect, there is provided a pair of drive wheels that touch the inner circumferential surface of the housing and cause the housing to rotate, and by causing the pair of drive wheels to rotate in the case of determining that the housing is being held by the user, the robot is made to move in a direction going away from the user in the state in which the user is hugging the robot. With this arrangement, the user can be made to feel the robot trying to pull away from the user in the arms of the user. In so doing, according to this aspect, the robot can be made to express irritation with the user.

Also, in the above aspect, for example, when the control circuit determines that the housing is being held by the user, the control circuit may determine a movement direction of the housing on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value, the control circuit may align a direction in which the housing moves forward due to a rotation of the drive wheels with the determined movement direction of the housing, and the control circuit may cause the drive wheels to rotate in reverse, and thereby cause the housing to move in a direction away from the user.

According to this aspect, the movement direction of the housing, that is, the direction in which the robot is pulled close before or after the robot is picked up, is determined on the basis of the second value indicating the acceleration in the front-and-back axis direction and the third value indicating the acceleration in the left-and-right axis direction from the acceleration sensor in a sampling period before and after the time at which the first value indicating the acceleration in the up-and-down axis direction from the acceleration sensor exceeded the certain threshold value.

Additionally, this aspect is provided with a pair of drive wheels that touch an inner circumferential surface of the housing and cause the housing the rotate.

By the above, the direction in which the housing moves forward due to the rotation of the pair of drive wheels is aligned with the determined movement direction of the housing. Furthermore, the pair of drive wheels is made to rotate in reverse.

With this arrangement, the robot can be made to proceed in a direction going away from the user in a state in which the user is hugging the robot. As a result, the user can be made to better feel the robot trying to pull away from the user in the arms of the user. In so doing, according to this aspect, the robot can be made to express irritation with the user.

Also, in the above aspect, for example, the control circuit, when the second value indicating the acceleration in the front-and-back axis direction output from the acceleration sensor in a sampling period before and after a time at which the first value indicating the acceleration in the up-and-down axis direction exceeded the certain threshold value has changed to a back direction, provided that a display direction of the display is a front direction of the front-and-back axis direction, the control circuit may determine that the display is facing in an opposite direction of a movement direction of the housing.

According to this aspect, in a case in which the second value indicating the acceleration in the front-and-back axis direction output from the acceleration sensor in a sampling period before and after the time at which the first value indicating the acceleration in the up-and-down axis direction exceeded the certain threshold value has changed to the back direction, provided that a display direction of the display is a front direction of the front-and-back axis direction, the display is determined to be facing in the opposite direction of the movement direction of the housing.

With this arrangement, when the user hugs the robot in a case in which the robot had been moving on the floor proceeding in the opposite direction of the user, it can be determined that the face of the robot is facing in the opposite direction of the user.

Also, in the above aspect, for example, when the control circuit determines that the display is facing in the opposite direction of the movement direction of the housing, the control circuit may determine the movement direction of the housing on a basis of the second value indicating the acceleration in the front-and-back axis direction and the third value indicating the acceleration in the left-and-right axis direction, and the control circuit may align the facing of the display with the movement direction of the housing by causing a first drive wheel of the drive wheels to rotate in a forward direction, while also causing a second drive wheel to rotate in a backward direction.

According to this aspect, in a case of determining that the display is facing in the opposite direction of the movement direction of the housing, the facing of the display is aligned with the movement direction of the housing by the rotation of the pair of drive wheels. With this arrangement, even if the user hugs the robot in the case in which the robot had been moving on the floor proceeding in the opposite direction of the user, the face of the robot can be made to face the user by the rotation of the pair of drive wheels.

Also, in the above aspect, for example, the display may be fitted to a rotating plate provided on the frame, and when the rotating plate is rotated by a rotation driver, and when the control circuit determines that the display is facing in the opposite direction of the movement direction of the housing, the control circuit may determine the movement direction of the housing on a basis of the second value indicating the acceleration in the front-and-back axis direction and the third value indicating the acceleration in the left-and-right axis direction, and the control circuit may control the rotation driver to align the facing of the display with the movement direction of the housing.

According to this aspect, in a case of determining that the display is facing in the opposite direction of the movement direction of the housing, the facing of the display is aligned with the movement direction of the housing by the rotation of the rotating plate. With this arrangement, even if the user hugs the robot in the case in which the robot had been moving on the floor proceeding in the opposite direction of the user, the face of the robot can be made to face the user by moving the rotating plate to which the display is attached.

Also, in the above aspect, for example, the frame may include a rotating plate and a camera is fitted onto the rotating plate, the rotation plate is rotated by a rotation driver, the control circuit may determine a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value, the control circuit may align an imaging direction of the camera with the determined movement direction of the housing, and the control circuit may determine that the housing is being held by the user when an image captured by the camera in accordance with the movement of the housing becomes a black image.

According to this aspect, whether or not the robot is being held by a user is determined while also taking into account a captured image from the camera whose imaging direction is aligned with the movement direction of the housing by the rotation of the rotating plate, and thus the robot being held by a user can be determined more accurately.

Also, in the above aspect, for example, the frame may be fitted with a camera, the control circuit may determine a movement direction of the housing on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value, the control circuit may align an imaging direction of the camera with the movement direction of the housing by causing a first drive wheel of the drive wheels to rotate in a forward direction, while also causing a second drive wheel to rotate in a backward direction, and the control circuit may determine that the housing is being held by the user when an image captured by the camera in accordance with the movement of the housing becomes a black image.

According to this aspect, whether or not the robot is being held by a user is determined while also taking into account a captured image from the camera whose imaging direction is aligned with the movement direction of the housing by the rotation of the pair of drive wheels, and thus the robot being held by a user can be determined more accurately.

A robot according to an aspect of the present disclosure includes:

a housing;

a frame disposed inside the housing;

a display, fitted to the frame, that displays at least part of a face of the robot;

a weight driver, fitted to the frame, that causes a weight to move back and forth in a certain direction;

an acceleration sensor that senses acceleration in three axis directions, an up-and-down axis direction, a front-and-back axis direction, and a left-and-right axis direction; and a control circuit that determines a state of the housing based on acceleration values sensed in the three axis directions, wherein after a first value indicating acceleration in the up-and-down axis direction output from the acceleration sensor to the control circuit is determined to exceed a certain threshold value, when any of the first value indicating the acceleration in the up-and-down axis direction, a second value indicating the acceleration in the front-and-back axis direction, and a third value indicating the acceleration in the left-and-right axis direction is determined to exhibit variation exceeding a certain width for a fixed period, the control circuit causes the weight to move in a movement direction of the housing determined on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value.

In this aspect, after the first value output from the acceleration sensor exceeds a certain threshold value, in a case of determining that any of the first value, the second value, and the third value exhibits variation exceeding a certain width for a fixed period, the movement direction of the housing is determined on the basis of the second value and the third value in a sampling period before and after the time at which the first value exceeded the certain threshold value. Additionally, this aspect is provided with a weight driving mechanism that causes a weight to move back and forth in a certain direction, and causes the weight to move in the determined movement direction of the housing.

For this reason, in a case in which the user hugging the robot causes the first value to exceed the certain threshold value, after which any of the first value, the second value, and the third value exhibits variation exceeding the certain width for a fixed period, the center of gravity of the robot can be shifted in the movement direction of the housing, which is thought to be the direction in which the user pulls close the robot in the sampling period before and after the user picks up the robot.

With this arrangement, in a state in which the user is hugging the robot, the center of gravity of the robot can be shifted to the user side. As a result, the user can be made to better feel the robot coming close to the user in the arms of the user. In so doing, according to this aspect, in the case in which the user hugs the robot, the robot can be made to express friendliness towards the user.

A robot according to an aspect of the present disclosure includes:
 a housing;
 a frame disposed inside the housing;
 a display, fitted to the frame, that displays at least part of a face;
 a drive wheels, fitted to the frame, that contact an inner surface of the housing and cause the housing the rotate;
 an acceleration sensor that senses acceleration in three axis directions of an up-and-down axis direction, a front-and-back axis direction, and a left-and-right axis direction; and
 a control circuit that determines a state of the housing based on acceleration values sensed in the three axis directions, wherein after a first value indicating acceleration in the up-and-down axis direction output from the acceleration sensor to the control circuit is determined to exceed a certain threshold value, when any of the first value indicating the acceleration in the up-and-down axis direction, a second value indicating the acceleration in the front-and-back axis direction, and a third value indicating the acceleration in the left-and-right axis direction is determined to exhibit variation exceeding a certain width for a fixed period, the control circuit causes the drive wheels to rotate and thereby cause the housing to move in a movement direction of the housing determined on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value.

In this aspect, after the first value output from the acceleration sensor exceeds a certain threshold value, in a case of determining that any of the first value, the second value, and the third value exhibits variation exceeding a certain width for a fixed period, the movement direction of the housing is determined on the basis of the second value and the third value in a sampling period before and after the time at which the first value exceeded the certain threshold value. Additionally, this aspect is provided with a pair of drive wheels that touch an inner circumferential surface of the housing and cause the housing the rotate, and causes the pair of drive wheels to rotate to thereby cause the housing to move in the determined movement direction of the housing.

For this reason, in a case in which the user hugging the robot causes the first value to exceed the certain threshold value, after which any of the first value, the second value, and the third value exhibits variation exceeding the certain width for a fixed period, the housing can be made to proceed in the movement direction of the housing, which is thought to be the direction in which the user pulls close the robot in the sampling period before and after the user picks up the robot.

With this arrangement, the robot can be made to proceed towards the user in a state in which the user is hugging the robot. As a result, the user can be made to better feel the robot coming close to the user in the arms of the user. In so doing, according to this aspect, in the case in which the user hugs the robot, the robot can be made to express friendliness towards the user.

A robot according to an exemplary embodiment of the present disclosure is useful as a robot that determines that the robot is being held by a user.

What is claimed is:

1. A robot comprising:
 a housing;
 a frame disposed inside the housing;
 a display, fitted to the frame, that displays at least part of a face of the robot;
 drive wheels, fitted to the frame, that contact an inner surface of the housing and cause the housing to rotate;
 a weight driver, fitted to the frame, that causes a weight to move back and forth in a certain direction;
 an acceleration sensor that senses acceleration in three axis directions, an up-and-down axis direction, a front-and-back axis direction, and a left-and-right axis direction; and
 a control circuit that communicates with the acceleration sensor to determine a state of the housing based on acceleration values sensed by the acceleration sensor in the three axis directions, wherein
 the control circuit is configured to determine that the housing is being held by a user:
 after a first value indicating acceleration in the up-and-down axis direction output from the acceleration sensor to the control circuit is determined to exceed a certain threshold value, and
 when any of the first value indicating the acceleration in the up-and-down axis direction, a second value indicating the acceleration in the front-and-back axis direction, and a third value indicating the acceleration in the left-and-right axis direction exhibit variation exceeding a certain width for a fixed period.

2. The robot according to claim 1, wherein
 after the first value indicating the acceleration in the up-and-down axis direction is determined to exceed the certain threshold value, when any of the first value indicating the acceleration in the up-and-down axis direction, the second value indicating the acceleration in the front-and-back axis direction, and the third value indicating the acceleration in the left-and-right axis direction is determined to exhibit variation that has converged to within the certain width for the fixed period, the control circuit determines that the housing has been placed in a certain location after moving in the up-and-down axis direction.

3. The robot according to claim 1, wherein after the first value indicating acceleration in the up-and-down axis direction is determined to exceed the certain threshold value, even when any of the first value indicating the acceleration in the up-and-down axis direction, the second value indicating the acceleration in the front-and-back axis direction, and the third value indicating the acceleration in the left-and-right axis direction is determined to exhibit variation exceeding the certain width for the fixed period, when a drive instruction is output to the drive wheels, the control circuit determines that the housing is not being held by the user.

4. The robot according to claim 1, wherein when the control circuit determines that the housing is being held by the user,
 the control circuit controls the weight driver to move the weight in a direction towards the user.

5. The robot according to claim 1, wherein when the control circuit determines that the housing is being held by the user,
 the control circuit determines a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value,
 the control circuit aligns the certain direction in which the weight moves back and forth with the determined movement direction of the housing, and
 the control circuit controls the weight driver to move the weight in a direction towards the user.

6. The robot according to claim 4, wherein the control circuit is configured to control the weight drive to move the weight in the direction towards the user after causing the weight to move in an opposite direction of the direction towards the user.

7. The robot according to claim 1, wherein when the control circuit determines that the housing is being held by the user,
 the control circuit controls the weight driver to move the weight in a direction away from the user.

8. The robot according to claim 1, wherein when the control circuit determines that the housing is being held by the user,
 the control circuit determines a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value,
 the control circuit aligns the certain direction in which the weight moves back and forth with the determined movement direction of the housing, and
 the control circuit controls the weight driver to move the weight in a direction away from the user.

9. The robot according to claim 1, wherein when the control circuit determines that the housing is being held by the user,
 the control circuit causes the drive wheels to rotate, and thereby causes the housing to move in a direction towards the user.

10. The robot according to claim 1, wherein when the control circuit determines that the housing is being held by the user,
 the control circuit determines a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value,
 the control circuit aligns a direction in which the housing moves forward due to the rotation of the drive wheels with the determined movement direction of the housing, and
 the control circuit causes the drive wheels to rotate, and thereby causes the housing to move in a direction towards the user.

11. The robot according to claim 9, wherein the control circuit causes the drive wheels to rotate intermittently.

12. The robot according to claim 1, wherein when the control circuit determines that the housing is being held by the user,
 the control circuit alternates between a first control that causes a first drive wheel of the drive wheels to rotate in a forward direction while also causing a second drive wheel to rotate in a backward direction, and a second control that causes the first drive wheel of the drive wheels to rotate in the backward direction while also causing the second drive wheel to rotate in the forward direction.

13. The robot according to claim 1, wherein when the control circuit determines that the housing is being held by the user,
 the control circuit determines a movement direction of the housing on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value,
 the control circuit aligns a direction in which the housing moves forward due to a rotation of the drive wheels with the determined movement direction of the housing, and
 the control circuit alternates between a first control that causes a first drive wheel of the drive wheels to rotate in a forward direction while also causing a second drive wheel to rotate in a backward direction, and a second control that causes the first drive wheel of the drive wheels to rotate in the backward direction while also causing the second drive wheel to rotate in the forward direction.

14. The robot according to claim 1, wherein when the control circuit determines that the housing is being held by the user, the control circuit causes the drive wheels to rotate, and thereby causes the housing to move in a direction away from the user.

15. The robot according to claim 1, wherein
when the control circuit determines that the housing is being held by the user,
the control circuit determines a movement direction of the housing on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value,
the control circuit aligns a direction in which the housing moves forward due to a rotation of the drive wheels with the determined movement direction of the housing, and
the control circuit causes the drive wheels to rotate in reverse, and thereby causes the housing to move in a direction away from the user.

16. The robot according to claim 1, wherein
when the second value indicating the acceleration in the front-and-back axis direction output from the acceleration sensor in a sampling period before and after a time at which the first value indicating the acceleration in the up-and-down axis direction exceeded the certain threshold value has changed to a back direction, provided that a display direction of the display is a front direction of the front-and-back axis direction, the control circuit determines that the display is facing in an opposite direction of a movement direction of the housing.

17. The robot according to claim 16, wherein
when the control circuit determines that the display is facing in the opposite direction of the movement direction of the housing,
the control circuit determines the movement direction of the housing on a basis of the second value indicating the acceleration in the front-and-back axis direction and the third value indicating the acceleration in the left-and-right axis direction, and
the control circuit aligns the facing of the display with the movement direction of the housing by causing a first drive wheel of the drive wheels to rotate in a forward direction, while also causing a second drive wheel to rotate in a backward direction.

18. The robot according to claim 16, wherein
the display is fitted to a rotating plate provided on the frame,
the rotating plate is rotated by a rotation driver, and
when the control circuit determines that the display is facing in the opposite direction of the movement direction of the housing,
the control circuit determines the movement direction of the housing on a basis of the second value indicating the acceleration in the front-and-back axis direction and the third value indicating the acceleration in the left-and-right axis direction, and
the control circuit controls the rotation driver to align the facing of the display with the movement direction of the housing.

19. The robot according to claim 1, wherein
the frame includes a rotating plate and a camera is fitted onto the rotating plate,
the rotation plate is rotated by a rotation driver, the control circuit is configured to determine a movement direction of the housing on a basis of the second value indicating the acceleration in the front-and-back axis direction and the third value indicating the acceleration in the left-and-right axis direction output from the acceleration sensor to the control circuit in a sampling period before and after a time at which the first value indicating the acceleration in the up-and-down axis direction exceeded the certain threshold value,
the control circuit is configured to align an imaging direction of the camera with the determined movement direction of the housing, and
the control circuit is configured to determine that the housing is being held by the user when an image captured by the camera in accordance with the movement of the housing becomes a black image.

20. The robot according to claim 1, wherein
the frame is fitted with a camera,
the control circuit is configured to determine a movement direction of the housing on a basis of the second value indicating the acceleration in the front-and-back axis direction and the third value indicating the acceleration in the left-and-right axis direction output from the acceleration sensor in a sampling period before and after a time at which the first value indicating the acceleration in the up-and-down axis direction exceeded the certain threshold value,
the control circuit is configured to align an imaging direction of the camera with the movement direction of the housing by causing a first drive wheel of the drive wheels to rotate in a forward direction, while also causing a second drive wheel to rotate in a backward direction, and
the control circuit is configured to determine that the housing is being held by the user when an image captured by the camera in accordance with the movement of the housing becomes a black image.

21. A robot, comprising:
a housing;
a frame disposed inside the housing;
a display, fitted to the frame, that displays at least part of a face of the robot;
a weight driver, fitted to the frame, that causes a weight to move back and forth in a certain direction;
an acceleration sensor that senses acceleration in three axis directions, an up-and-down axis direction, a front-and-back axis direction, and a left-and-right axis direction; and
a control circuit that communicates with the acceleration sensor to determine a state of the housing based on acceleration values sensed by the acceleration sensor in the three axis directions, wherein
the control circuit is configured to cause the weight to move in a movement direction of the housing:
after the acceleration sensor outputs to the control circuit a first value indicating acceleration in the up-and-down axis direction and the control circuit determines that the first value exceeds a certain threshold value,
when the control circuit determines that any of the first value indicating the acceleration in the up-and-down axis direction, a second value indicating the acceleration in the front-and-back axis direction, and a third value indicating the acceleration in the left-and-right axis direction exhibit variation exceeding a certain width for a fixed period, and
when the control circuit determines, during a sampling period before and after a time at which the first value indicating the acceleration in the up-and-down axis direction is determined, that the second value indicating the acceleration in the front-and-back axis direction and the third value indicating the acceleration in the left-and-right axis direction output from the acceleration sensor exceeded the certain threshold value.

22. A robot comprising:

a housing;

a frame disposed inside the housing;

a display, fitted to the frame, that displays at least part of a face;

drive wheels, fitted to the frame, that contact an inner surface of the housing and cause the housing the rotate;

an acceleration sensor that senses acceleration in three axis directions, an up-and-down axis direction, a front-and-back axis direction, and a left-and-right axis direction; and a control circuit that communicates with the acceleration sensor to determine a state of the housing based on acceleration values sensed by the acceleration sensor in the three axis directions, wherein the control circuit is configured to cause the drive wheels to rotate and thereby cause the housing to move in a movement direction of the housing:

after the acceleration sensor outputs to the control circuit a first value indicating acceleration in the up-and-down axis direction and the control circuit determines that the first value exceeds a certain threshold value, when the control circuit determines that any of the first value indicating the acceleration in the up-and-down axis direction, a second value indicating the acceleration in the front-and-back axis direction, and a third value indicating the acceleration in the left-and-right axis direction exhibit variation exceeding a certain width for a fixed period, and when the control circuit determines, during a sampling period before and after a time at which the first value indicating the acceleration in the up-and-down axis direction is determined, that the second value indicating the acceleration in the front-and-back axis direction and the third value indicating the acceleration in the left-and-right axis direction output from the acceleration sensor exceeded the certain threshold value.

\* \* \* \* \*